(12) United States Patent
Matsui et al.

(10) Patent No.: US 6,437,778 B1
(45) Date of Patent: Aug. 20, 2002

(54) VIRTUAL SPACE COMMUNICATION SYSTEM, THREE-DIMENSIONAL IMAGE DISPLAY METHOD, AND APPARATUS THEREFOR

(75) Inventors: Kazuki Matsui; Naohisa Kawaguchi; Takashi Ohno; Akinori Iwakawa; Hiroaki Harada, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/333,516

(22) Filed: Jun. 15, 1999

Related U.S. Application Data

(62) Division of application No. 08/712,566, filed on Sep. 11, 1996, now Pat. No. 5,956,028.

(30) Foreign Application Priority Data

Sep. 14, 1995 (JP) ............................................. 7-237214
Nov. 8, 1995 (JP) ............................................. 7-290170

(51) Int. Cl.[7] ............................................. G06T 15/00
(52) U.S. Cl. ............................................. 345/419
(58) Field of Search ............................................. 345/419, 420, 345/426–428, 812, 473–475

(56) References Cited

U.S. PATENT DOCUMENTS

| | | | |
|---|---|---|---|
| 5,287,437 A | * 2/1994 | Deering | 345/427 |
| 5,347,306 A | 9/1994 | Nitta | 395/152 |
| 5,491,743 A | 2/1996 | Shiio et al. | 345/356 |
| 5,736,982 A | 4/1998 | Suzuki et al. | 345/355 |

* cited by examiner

Primary Examiner—Almis R. Jankus
(74) Attorney, Agent, or Firm—Staas & Halsey LLP

(57) ABSTRACT

Plural client computers 10 manipulates by individual users, a data management computer 200, and a host computer 100 are mutually connected through a network NW. The data management computer 200 manages the VRML file expressing a virtual space, and also transfers the VRML file to each client computer 10 through the network NW according to the request from each client computer 10. Each client computer 10 displays the virtual space according to the VRML file, and also displays in inside of the virtual space the object capable of updating the property data by the manipulation of the user. The host computer 100 manages the property data (position, shape, speech text, etc.) of the object changed by the operation inputted by the user at each client computer 10, so that the users of the client computers 10 sharing the same virtual space can communicate with each other through the behavior and speech of the objects in the virtual space.

8 Claims, 47 Drawing Sheets

FIG. 13

| COMMUNICATION TYPE (TRANSFER REQUEST) | OBJECT ID (OBJECT OB1) | UPDATED PROPERTY (POSITION) | DATA LENGTH (NUMBER OF BYTES) | UPDATED DATA(X,Y,Z) |
|---|---|---|---|---|
| 1BYTE | 2BYTES | 1BYTE | 2BYTES | |

FIG. 14

| 1BYTE | 2BYTES | 1BYTE | 2BYTES | |
|---|---|---|---|---|
| COMMUNICATION TYPE (TRANSFER REQUEST) | OBJECT ID (OBJECT OB1) | UPDATED PROPERTY (POSITION) | DATA LENGTH (NUMBER OF BYTES) | UPDATED DATA(X,Y,Z) |

FIG. 21

| 1BYTE | 4BYTES | 2BYTES | VALABLE | 2BYTES | VALABLE |
|---|---|---|---|---|---|
| COMMUNICATION TYPE (UPDATE REQUEST) | ADD. OF CLIENT COMPUTER (1) | DATA LENGTH (LENGTH OF FILE NAME) | FILE NAME (F1) | DATA LENGTH | FILE DATA |

FIG. 23

| COMMUNICATION TYPE (UPDATE REQUEST) | ADD. OF CLIENT COMPUTER (1) | DATA LENGTH (LENGTH OF FILE NAME) | FILE NAME (F1) |
|---|---|---|---|
| 1BYTE | 4BYTES | 2BYTES | VALABLE |

FIG. 25

| IDENTFIER | ADD. OF SECONDARY STORAGE |
|---|---|
| TEXTURE-ID | /data/texture.rgb |

| IDENTFIER | VERSION No. | ADD. OF SECONDARY STORAGE |
|---|---|---|
| TEXTURE-ID | 1 | /data/texture.rgb |

| SPi | SPj | No. | ENTRANCE POSITION COORDINATE |
|-----|-----|-----|------------------------------|
| SP1 | SP2 | 1 | (x1, y1, z1) |
| SP1 | SP2 | 2 | (x2, y2, z2) |
| SP2 | SP3 | 1 | (x3, y3, z3) |
| SP3 | SP4 | 1 | (x4, y4, z4) |
| SP1 | SP4 | 1 | (x5, y5, z5) |
| SP1 | SP5 | 1 | (x6, y6, z6) |
| ⋮ | ⋮ | ⋮ | ⋮ |

COMPLETION OF DATA LOAD

COMPLETION OF DATA LOAD

UNDER DATA LOADING

UNDER DATA LOADING

COMPLETION OF DATA LOAD

COMPLETION OF DATA LOAD

UNDER DATA LOADING

FIG. 45

[ORIGINAL OBJECT]

L-TABLE

| | |
|---|---|
| POLYGON1 | EDGE e1,e2,e3,e4 |
| POLYGON2 | EDGE e1,e4,e6,e2 |
| POLYGON3 | EDGE e1,e2,e7,e8,e9 |
| ... | |

E-TABLE

| | |
|---|---|
| e1 | POINT p1,p2 |
| e2 | POINT p1,p3 |
| e3 | POINT p3,p4 |
| e4 | POINT p1,p4 |
| e5 | POINT p4,p5 |
| ... | |

P-TABLE

| | |
|---|---|
| p1 | (x1,y1,z1) |
| p2 | (x2,y2,z2) |
| p3 | (x3,y3,z3) |
| ... | |

DECIMATION (m=1)

[ROUGH MODEL]

L-TABLE 2

| | |
|---|---|
| POLYGON1 | EDGE e1,e2,e3 |
| POLYGON3 | EDGE e1,e7,e9 |
| ... | EDGES ARE ALSO DECIMATED |

DECIMATE AND RESTRUCTURE

E-TABLE 2

| | |
|---|---|
| e1 | POINT p1,p2 |
| e2 | POINT p1,p3 |
| e3 | POINT p3,p4 |
| e7 | POINT p8,p9 |
| ... | |

RESTRUCTURE

P-TABLE 2

| | |
|---|---|
| p1 | (x1,y1,z1) |
| p2 | (x2,y2,z2) |
| p3 | (x3,y3,z3) |
| ... | |

↑ COMPLETION OF DATA LOAD

↑ UNDER DATA LOADING

VIRTUAL SPACE COMMUNICATION SYSTEM, THREE-DIMENSIONAL IMAGE DISPLAY METHOD, AND APPARATUS THEREFOR

This application is a divisional of application Ser. No. 08/712,566, filed Sep. 11, 1996, now allowed U.S. Pat. No. 5,956,028.

BACKGROUND OF THE INVENTION

1. Field of the Invention

The present invention relates to a virtual space communication system allowing computer users to communicate with each other, in a virtual space constructed in a system configured of plural computers connected through a network. More particularly, it relates to a virtual space communication system using graphical objects (for example, called as abutters) behaving according to manipulation by a user in a virtual space shared by plural computers for realizing communication between computer users through the objects.

The invention also relates to a three-dimensional image display method and a three-dimensional image display apparatus of such virtual space, and to so-called computer graphics, and more particularly to computer graphics handling a three-dimensional space.

2. Description of the Related Art

The so-called virtual space communication system has been proposed for allowing computer users to communicate with each other in a virtual space configured in a system configured by plural computers connected through a network. A configuration of a conventional system is, for example, as shown in FIG. 1.

In FIG. 1, a host computer 100 and plural client computers 10 are connected through a newtork NW. Secondary storages (magnetic disk device, CD-ROM device, etc.) 101 and 20 are connected to the host computer 100 and each client computer 10 respectively, and computer graphics (hereinafter, to b called as CG) data expressing a virtual space (configured by plural objects) is stored in each secondary storage 101 and 20. The host computer 100 is responsible for the following processings necessary for communication between the client computers 10 as well as the management processing of CG data.

In each client computer 10 sharing the virtual space area, the image of the same virtual space is displayed on the basis of the CG data being read out from the secondary storage 20 connected to each. Corresponding to each client computer 10, for example, graphical objects called abutters exist in the virtual space. The abutters behave (act, chat, etc.) in the virtual space according to the manipulation by the user in the client computer 10. The manipulation information (corresponding to the behavior of abutters) having been inputted into one client computer 10 is sent to the host computer 100 through the network NW. The host computer 100 transfers this manipulation information to the other client computers 10 sharing the same virtual space together with the client computer 10 that has transmitted the manipulation information through the network NW. In the other client computers 10 receiving the manipulation information through the network NW, the corresponding abutters behave similarly in the virtual space according to the manipulation information. As a result, among users of the client computers 10 sharing the virtual space, communications can be realized through the behavior (action, chat, etc.) of abutters in the virtual space.

In such virtual space communication system, the host computer and individual client computers share common CG data, and therefore transmission of CG data among computers through the network is not necessary, and the transmission quantity among computers is reduced.

In such conventional virtual space communication system, however, since the host computer is responsible for processings about communications among client computers as well as management processing of CG data, when the number of client computers sharing the virtual space increases or the quantity of CG data to be managed increases, the load is concentrated on the host computer, and processings in the host computer may be difficult.

Or, every time the shared virtual space is extended or switched in each client computer, the recording medium storing the CG data of the extended or switched virtual space such as floppy disk, CD-ROM or the like must be distributed to the users of each client computer by off-line means (mail, hand to hand, etc.). It is hence not flexible enough to extension and switching of virtual space, and the CG data of the virtual space in client computers of each user may differ.

Recently, the CG is used in all fields, and in particular along with the progress of so-called multimedia, it has been stepwisely attempted to apply the CG in communication with remote places through such communication network. For example, data of a three-dimensional solid model is stored in a server installed in a certain place, and the data of the solid model is loaded in a client terminal at a remote place through, for example, the Internet, and is displayed, so that the communication can be realized.

In the system on which the invention is based, first, plural three-dimensional spaces to be drawn are prepared, and in one space of them, the viewpoint can be moved freely, that is, so-called "walk-through" is enabled.

For example, as shown in a schematic diagram in FIG. 2, a certain indoor space (first space SP1) is composed of a set of several solid models OB, and an another indoor space (second space SP2) adjacent to this room is composed of a set of other several solid models OB, and the both spaces SP1, SP2 are mutually connected through an entrance E as a connection point.

Suppose the viewpoint VP moves from the first space SP1 to the second space SP2 through the entrance E by "walk-through," it gives rise to necessity of reading the data of the second space SP2 at the moving destination out of the database, and displaying on the screen. In a case where, however, the data of the solid model of the second space SP2 to be read out is huge in quantity and the communication capacity between the database and the display terminal is small, it causes a long waiting time for switching the screen due to the move from the first space SP1 to the second space SP2. In other words, the waiting time is long from the display of the first space SP1 to the display of the second space SP2.

A block diagram in FIG. 3 shows a structural example of a conventional system for such three-dimensional space display. Hereinafter, the prior art is described in detail below by referring to FIG. 3.

In FIG. 3, reference numeral 51 denotes a three-dimensional database (hereinafter called 3D database), in which data of solid matter (hereinafter called objects) for constructing the three-dimensional space is stored. However, as shown in the schematic diagram in FIG. 2, when the three-dimensional space is divided into plural sections (divided into two sections, first space SP1 and second space SP2, in the example in FIG. 2), the data of objects in each space SP1, SP2 is managed as one data group.

Reference numeral 52 is a reader for reading out the data relating to the space in which the viewpoint is located at the present, from the 3D database 51. The data being read out from the 3D database 51 by this reader 52 is given to a 3D drawing unit 53.

In the 3D drawing unit 53, on the basis of the data being read out by the reader 52, and according to the viewpoint information given from a viewpoint information set unit 54, that is, the information showing which orientation is seen from which position, geometrical calculation, color calculation and others are executed on each object, and the results are written in a 3D frame buffer 55.

By repeating such operation to draw individual objects, three-dimensional images of objects are sequentially drawn on the 3D frame buffer 55, and soon use one three-dimensional image is completed and displayed on a monitor 56.

Using such conventional system, the case of moving between plural three-dimensional spaces (hereinafter called 3D spaces) as shown in FIG. 2 is disclosed. Suppose several solid models, that is, objects OB are arranged in each 3D space (first space SP1 and second space SP2 in the example in FIG. 2). For example, the current viewpoint VP is located in the first space SP1, and it is supposed that walk-through is attempted in a certain orientation along a path P.

When the viewpoint VP moves from the first space SP1 to the other second space SP2, the space is switched and the three-dimensional image displayed in the monitor 56 is also switched, and at this time it is necessary to read out the information of the second space SP2 in which the viewpoint VP is to be located next from the 3D database 51 anew, and drawing the image in the 3D frame buffer 55. Generally, the data quantity of a set of solid models is very large, and it takes a very long time to read into the 3D frame buffer 55. In the actual world, it is possible to move the viewpoint VP smoothly from one room to other room, that is, from the first space SP1 to the second space SP2, but in the three-dimensional image display technique using the conventional system as described above, the viewpoint cannot be moved smoothly in the boundary of one room and other (for example, the door), and a waiting time occurs.

In the system on which the invention is based, secondly, there are plural objects for constructing one three-dimensional space.

Supposing the number of objects for constructing one three-dimensional space to be N, in the conventional technique, data of N number of objects is stored in the 3D database 51, and the reader 52 reads it out sequentially in the unit of each object, and the 3D drawing unit 53 operates geometrical calculation and color calculation on each object according to the viewpoint information given from the viewpoint information set unit 54, and writes the result in the 3D frame buffer 55, and by repeating such operation, one picture is completed.

Conventionally, therefore, as the object data were sequentially written into the 3D frame buffer 55, individual objects were sequentially displayed in the monitor 56, or after all object data were written in the 3D frame buffer 55, all objects were displayed together in the monitor 56.

In the former case, the user viewing the monitor 56 did not know how long he or she must wait because there was no information about the waiting time until one picture is completed or about how far the drawing is advanced at the moment, and was hence formed to wait while twirling his or her thumbs.

In the latter case, until the drawing is completed in the 3D frame buffer 55, the screen display on the monitor 56 is swept, or the former displaying state is kept in still image, and hence the same problem occurs.

Generally, the data quantity of the three-dimensional solid model becomes larger when the shape is complicated, and therefore when the communication capacity between the database system (server) storing the solid model data and the display terminal (client) is small, as the communication time is extended, it takes an extremely long time for moving from the space being drawn to other space. Hence, the problems to be solved are how to shorten the moving wait time and how to make the user feel the waiting time short.

In the invention, it is possible to "walk through" plural three-dimensional spaces, and when the viewpoint enters a certain space for the first time, the data of solid mode in the space is loaded from the database. Therefore, the problems to be solved are to how to make the user feel the waiting time short when switching the display, and how to inform the user of the information about the screen to be displayed next promptly.

SUMMARY OF THE INVENTION

It is hence a first object of virtual space communication system of the invention to provide a virtual space communication system free from concentration of load on the host computer.

It is a second object of virtual space communication system of the invention to provide a virtual space communication system capable of flexibly extending or switching the virtual space.

To achieve the first object, the virtual space communication system of the invention comprises plural client computers manipulated by individual users, a first management computer, and a second management computer, which are mutually connected through a network, wherein the first management computer manages the data expressing a virtual space, and provides the data to the client computers through the network according to a request from each client computer, each client computer displays an image with objects variable in property data having added in the virtual space on the basis of the data provided from the first management computer, and the second management computer manages the property data of the objects changed on the basis of the manipulation input at each client computer, thereby allowing the user of each client sharing the virtual space to communicate through the behavior of the objects in the virtual space.

In such virtual space communication system, the data expressing the virtual space and the property data of the objects variable on the basis of the manipulation input at each client computer are managed by being dispersed into the first and second computers. Therefore, processing about data management is prevented from being concentrated on a specific computer.

From the standpoint of managing the property data of the objects frequently changed by manipulation input at each client computer, separately from management of data expressing the virtual space which is not switched frequently, in this virtual space communication system, update of property data of objects corresponding to the manipulating input of the client computers is provided to the second management computer through the network, and the second management computer notifies the updating property data and the updated property data to the other client computer sharing the virtual space.

From the standpoint of creating the image data integrating the data expressing the virtual space managed by different management computers and the property data of each object in individual client computers, in this virtual space communication system, each client computer has means for generating the data provided from the first management computer and image data expressing the virtual space including the objects on the basis of the property data of the objects to be managed by the second management computer, so that the image is displayed on the basis of the image data.

To achieve the second object, the virtual space communication system of the invention, in each virtual space communication system described above, sends the data expressing the virtual space created by each client computer to the first management computer through the network, and updates the content of the data expressing the virtual space managed by the first management computer on the basis of the received data.

In such virtual space communication system, the data expressing the virtual space managed by the first management computer can be updated from each client computer. Therefore, the virtual space shared by each client computer can be extended or switched flexibly.

When the data expressing the virtual space is updated by any client computer, this update can be notified to other client computers sharing the same virtual space, and, from this standpoint, when the content of the data expressing the virtual space managed by the first management computer is updated, the second management computer notifies the updating of the content of the data expressing the virtual space to the other client computers sharing the virtual space, on the basis of the notification from the client computer that has created the data expressing the virtual space.

From the standpoint of not transferring data of relatively large data quantity such as texture image and data of objects used frequently as far as possible on the network, in each abovementioned virtual space communication system, the data expressing the virtual space managed by the first management computer includes an identifier for identifying the image for constructing a part of the virtual space, and each client computer holds the data expressing the image identifier by the identifier in the secondary storage, and reads out the data identified by the identifier contained in the data from the secondary storage when displaying the image of the virtual space on the basis of the data provided from the first management data through the network.

Moreover, in the virtual space communication system, from the standpoint that each client computer can build up the virtual space by the latest data, the data expressing the virtual space managed by the first management computer includes version data expressing the updating history of the data identified by the identifier, and each client computer holds the version data expressing the updating history of the data identifier by the identifier held in the secondary storage, and when displaying the image of the virtual space on the basis of the data provided from the first management computer through the network, the data identified by the identifier is read out from the secondary storage when the updating history expressed by the version data of the data identified by the identifier stored in the secondary storage is not older than the updated data expressed by the version data included in the data provided from the first management computer.

On the other hand, in the three-dimensional image display method and apparatus therefor of the invention, it is enabled to "walk through" plural three-dimensional spaces, and when the viewpoint enters a certain space for the first time, the data of the solid model in that space is loaded from the database. Therefore, the problems to be solved are how to make the user feel the waiting time short when switching the display, and how to inform the user of the information about the screen to be displayed next promptly.

It is a first object of the three-dimensional image display method and apparatus therefor of the invention to shorten the waiting time necessary for switching the screen occurring when the viewpoint is changed from a certain space to other space as in the case above.

It is a second object of the three-dimensional image display method and apparatus therefor of the invention to improve the displaying state during waiting time necessary for displaying the space in which the viewpoint is newly moved, when the viewpoint is changed from a certain space to other space as in the case above.

To solve the problems, in the three-dimensional image display method and apparatus therefor of the invention, the distance between the walking-through viewpoint position and movable place to other space (for example, entrance such as door) is always calculated, and when the distance is less than a predetermined value, the data in the space corresponding to the objective entrance is read out preliminarily from the database as predictive reading.

This predictive reading process is executed simultaneously as other processing than the processing for changing the displaying state of the image for walk-through along with the move of the viewpoint. Therefore, the viewpoint can be moved even during processing of predictive reading.

Thus, as the viewpoint approaches a certain entrance, the data in the space corresponding to the entrance is read preliminarily. It is hence required to predict, to a certain extent, the space to which the viewpoint moves next on the basis of the information of approaching the entrance, and calculation is operated for this purpose. When the viewpoint position approaches the entrance to a certain extent, the space to which the viewpoint moves next is predicted, and reading of the data in that space is started as predictive reading, so that the waiting time accompanied by switching screen when moving the space is shortened.

Also to solve the above problems, in the three-dimensional image display method and apparatus therefor of the invention, on the basis of the above invention, it is intended to predict not only the distance between the current viewpoint position and the entrance, but also the space to which the viewpoint moved next by adding the orientation of visual field.

To solve the problems, moreover, in the three-dimensional image display method and apparatus therefor of the invention, prepared two-dimensional image data (hereinafter 2D image) is first displayed on the screen of the displaying means, and the objects are sequentially loaded in the same manner as in the prior art, and until the drawing is over, that is, until display of perfect 3D image is enabled, the prepared 2D image is displayed on the screen, and when all 3D drawings are completed, the 3D image is displayed on the screen.

Herein, the prepared 2D image may be arbitrary. However, in particular, by transforming the final result of 3D image to be displayed next (the 3D image at the time of switching, hereinafter this image is called initial 3D image) into two dimensions and preparing as 2D image, it is expected to have such an effect that the user may not know the change from 2D image to 3D image.

Further to solve the problems, in the three-dimensional image display method and apparatus therefor of the invention, same as in the above invention, the initial 3D image is first prepared as 2D image, and this 2D image is processed by filtering effect to suppress color such as "fog effect". Only in the first time, such filtering processed image is displayed. That is, only in the first time, the 2D image transformed from the initial 3D image is displayed as a color suppressed image, and thereafter the 3D image is sequentially overlaid and displayed on the 2D image.

In this case, since the 3D image is displayed in the natural color, the color suppressed portion in the screen is not processed as 3D image, and the portion displayed in deep color is the object already processed as 3D image, which can be clearly recognized by the user. Hence, the user knows instantly how far the 3D drawing is advanced.

To solve the problems, still more, in the three-dimensional image display method and apparatus therefor of the invention, the content of the 3D frame buffer (three-dimensional image storing means) is processed by filtering effect having color suppression effect (for example, fog effect) same as in the above embodiment, and it is written back in the 3D frame buffer and displayed on the screen. At this time, the same process is repeated at a certain predetermined time interval, or along with the step of object drawing in the 3D drawing unit (three-dimensional image drawing means). The degree of color suppression is stepwise decreased along with the increase in the number of times of processing, and color suppression is none when the 3D drawing is completed.

Also to solve the problems, in the three-dimensional image display method and apparatus therefor of the invention, by rearranging the data sequence in the database storing the 3D objects, the objects can be read out in a desired sequence, for example, in the sequence nearer to the viewpoint or in the sequence further from the viewpoint.

Generally, when displaying three-dimensional image, it is natural to see sequentially from the object closer to the viewpoint. Therefore, by calculating the distance between the viewpoint position and each object, the objects closer to the viewpoint are sequentially displayed. For this purpose, from the viewpoint position information, the distance to each object in the database is calculated, and by sorting it in the ascending order (or descending order), the sequence position of object data in the database is updated according to the result, or a flag indicating the sequence is set up. According to the sequence order or the order indicated by flag, the data is read out sequentially from the database and displayed.

To solve the problems, also, in the three-dimensional image display method and apparatus therefor of the invention, the data is read out and displayed sequentially from rough shape data to fine shape data of 3D objects. This requires to prepare data in multiple stages from rough shape to fine shape concerning each object, and register it in the database.

Further to solve the problems, in the three-dimensional image display method and apparatus therefor of the invention, with the same object as in the invention above, rough shape data is obtained by calculation in a stage after reading out the object data from the database, and sequentially displayed as 3D image. In this case, it is not necessary to store the rough shape data preliminarily in the database.

The above and further objects and features of the invention will more fully be apparent from the following detailed description with accompanying drawings.

BRIEF DESCRIPTION OF THE DRAWINGS

FIG. 13 is a diagram showing data structure of update request of position used in move processing of object in virtual space;

FIG. 14 is a diagram showing data structure of update notification of position used in move processing of object in virtual space;

FIG. 21 is a diagram showing a data structure example of update request of VRML file issued from a client computer;

FIG. 23 is a diagram showing a data structure example of update notification of VRML file transferred from a client computer to host computer;

FIG. 25 is a diagram showing a structure example of data identifier table used in the processing shown in FIG. 24;

FIG. 27 is a diagram showing a structure example of data identifier table used in the processing shown in FIG. 26;

FIG. 33 is a schematic diagram showing a structure example of table in which information of entrance for connecting spaces mutually is registered.

FIG. 45 is a schematic diagram showing table generating method by LOD generating unit;

DESCRIPTION OF THE PREFERRED EMBODIMENTS

Figure 1:
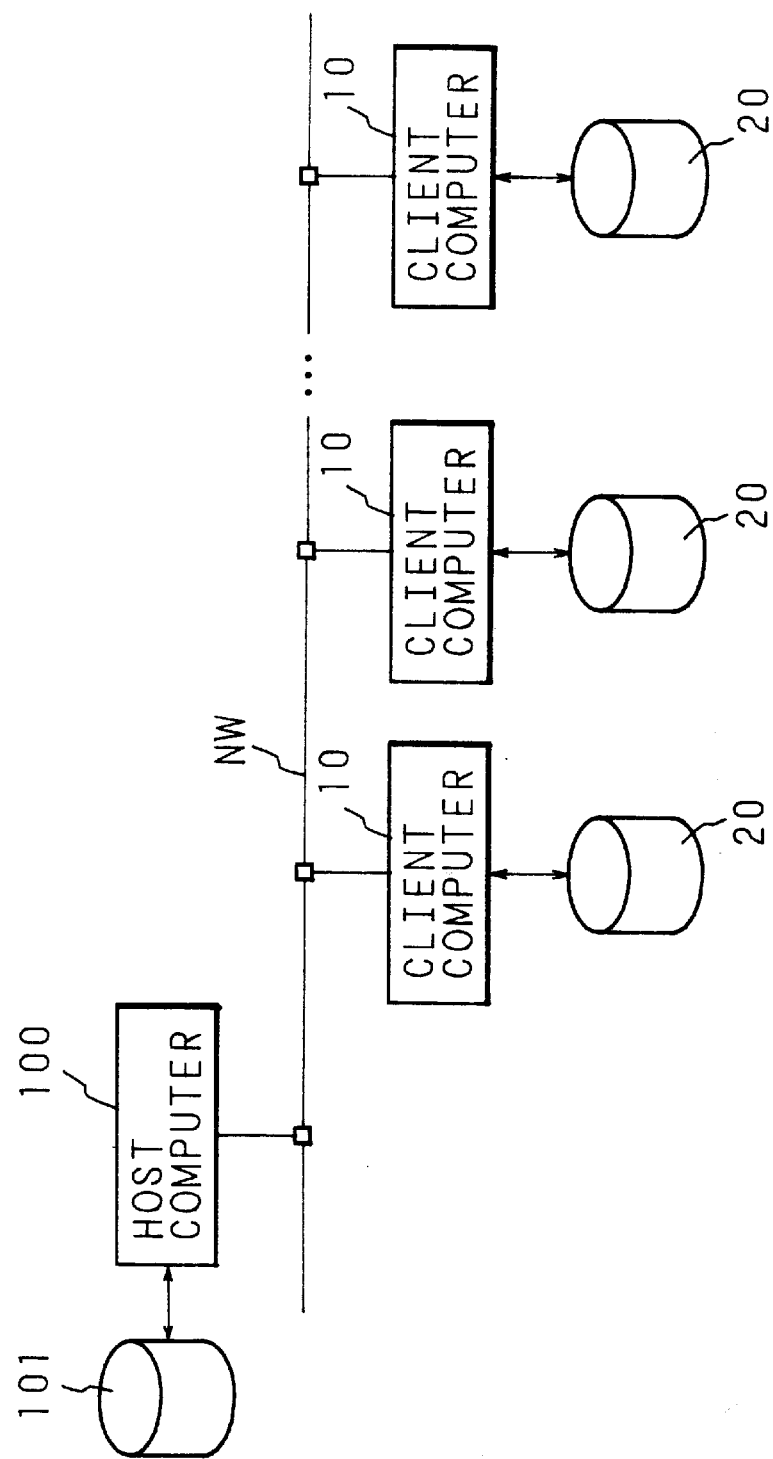
FIG. 1 is a block diagram showing a basic configuration example of a conventional virtual space communication system.
Figure 2:
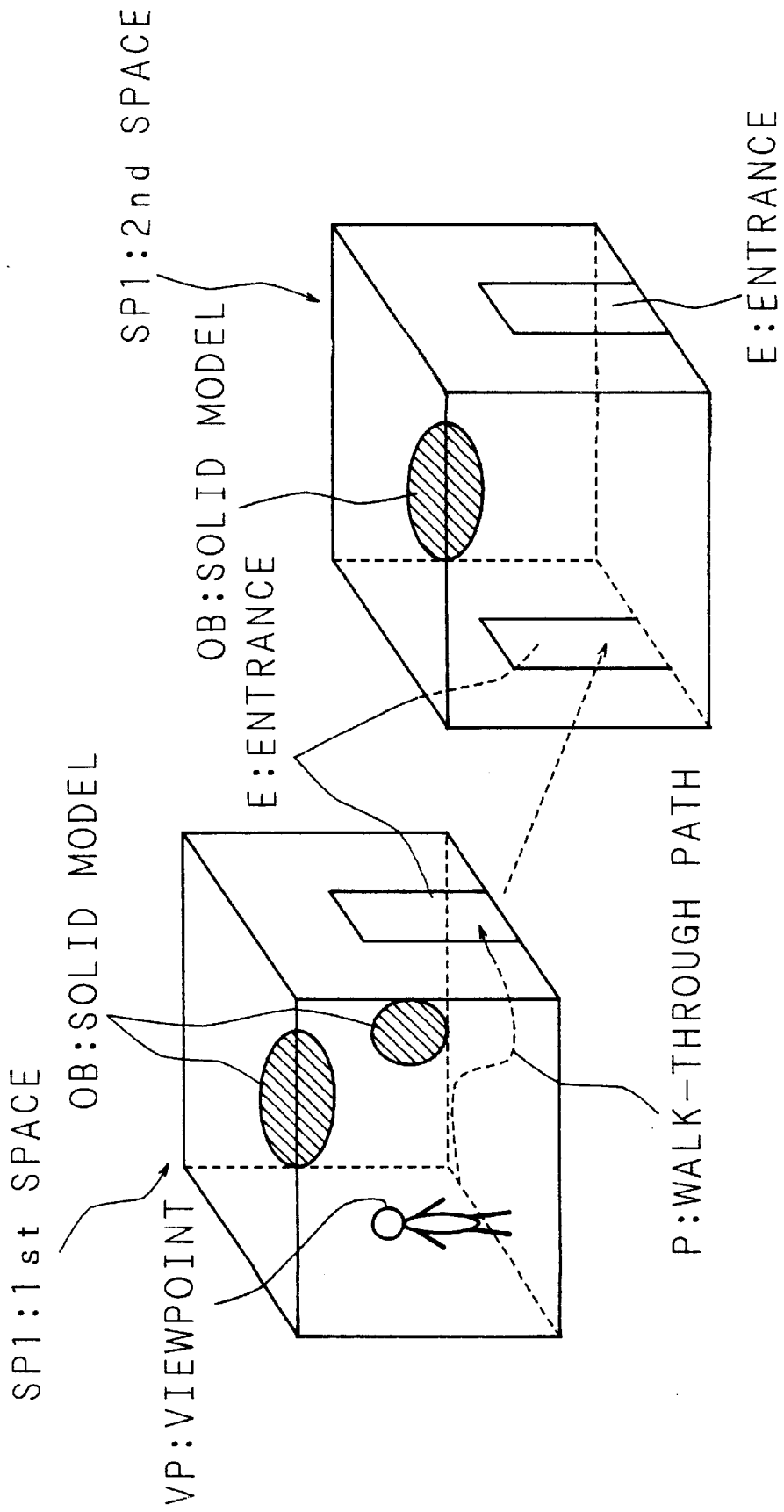
FIG. 2 is a schematic diagram of a three-dimensional space on which the three-dimensional image display method and apparatus therefor of the invention are based.

Referring now to the drawings, preferred embodiments of virtual space communication system, three-dimensional image display method, and apparatus therefor of the invention are described in detail below.

[First embodiment of virtual space communication system of the invention]

Figure 4:
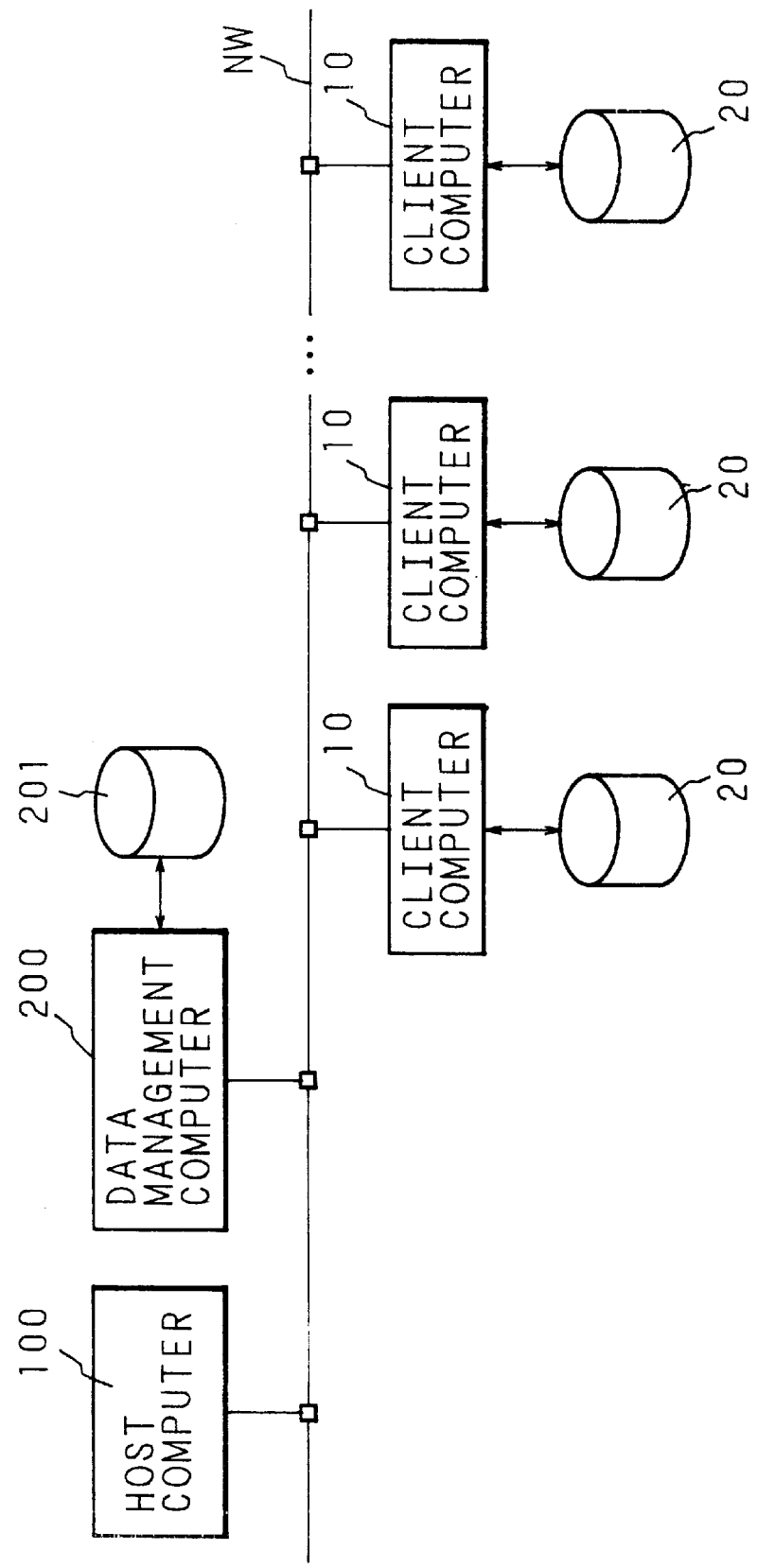
FIG. 4 is a block diagram showing a basic configuration of an embodiment of a virtual space communication system of the invention.

The virtual space communication system of the invention is described below by referring to a block diagram in FIG. 4 showing its entire system configuration example.

In FIG. 4, a host computer 100, a data management computer 200, and plural client computers 10 are connected through a network NW. The host computer 100 manages communications between the client computers 10. The data management computer 200 manages and processes CG data, and a secondary storage 201 storing CG data is connected thereto. In each client computer 10, in the same way as in the conventional system, a secondary storage 20 storing computer graphics (CG) data is connected.

Figure 5:
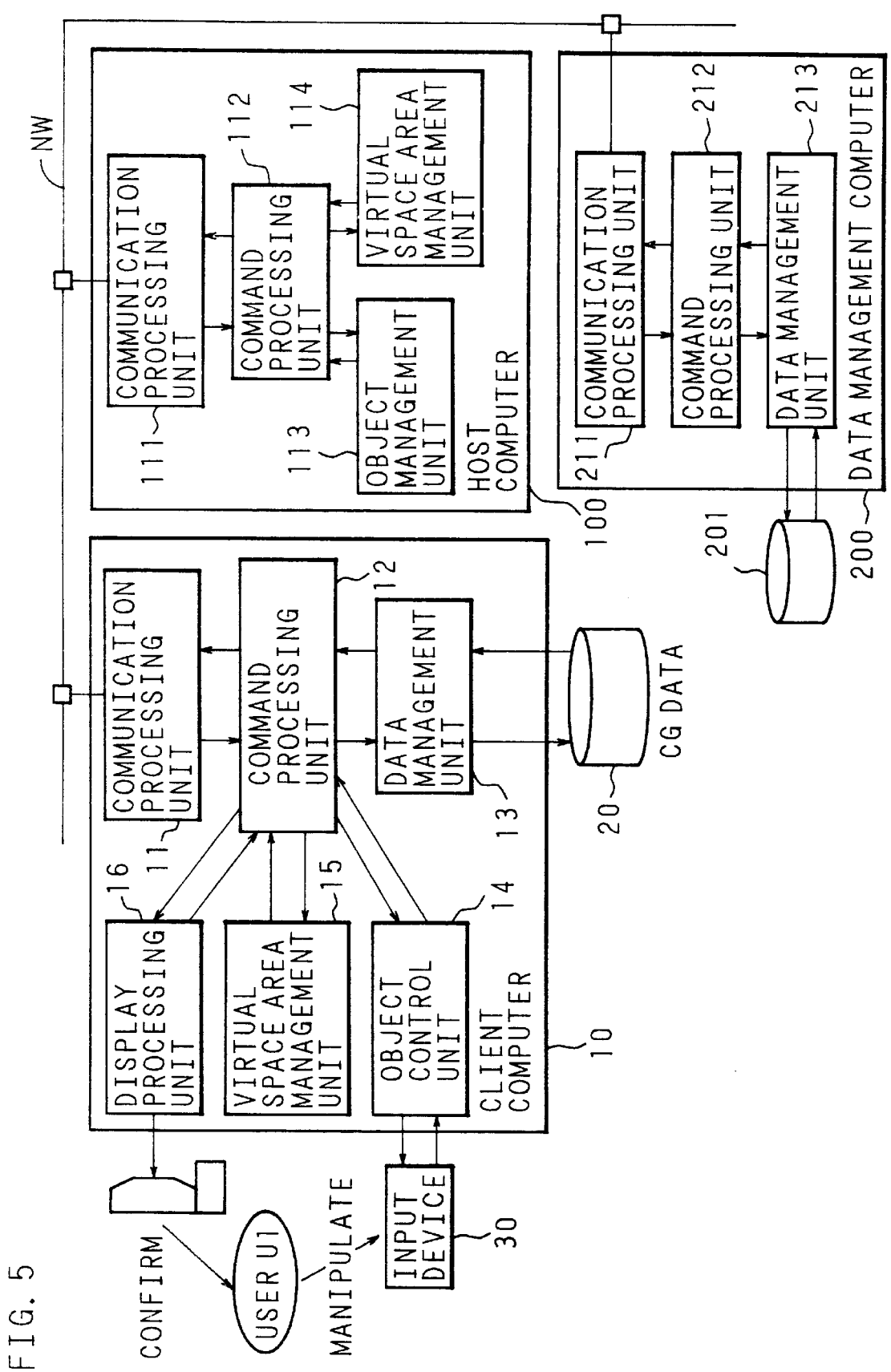
FIG. 5 is a block diagram showing configuration of client computers, data management computer, and host computer included in the virtual space communication system.

The host computer 100, data management computer 200 and each client computer 10 are configured, for example, as shown in FIG. 5.

In FIG. 5, the host computer 100 comprises a communication processing unit 111, a command processing unit 112, an object management unit 113 and a virtual space are table management unit 114. The communication processing unit 111 receives information from the network NW and sends out information to the network NW. The command processing unit 112 requests processing to each unit on the basis of the command inputted from the network NW. The object management unit 113 manages properties and behavior of objects (abutters) which is an incarnations of the users determined corresponding to each client computer 10. The virtual space area table management unit 114 manages updating and other processing of the virtual space area table showing the relation between each virtual space (area) that can be configured in the system and the objects existing in the virtual space.

Each client computer 10 comprises a communication processing unit 11, a command processing unit 12, a data management unit 13, an object control unit 14, a virtual space area management unit 15 and a display processing unit 16. The data management unit 13 is connected to a secondary storage 20 such as magnetic disk drive, CD-ROM drive or the like, and manages the data to be written into the secondary storage 20 and the data to be read out from the secondary storage 20. The object control unit 14 is connected to an input device (including keyboard unit, microphone, etc.) 30, and manages properties and others of objects in the shared virtual space on the basis of the information (position, speech text, action, etc.) about behavior (properties) of the abutters corresponding to the manipulation information inputted from the input device 30 and the information from the command processing unit 12. The display processing unit 16 is connected to a display unit 40, and displays each object constructing the virtual space in the display unit 40 and the objects (abutters) acting in the virtual space in the display unit 40 according to the CG data.

The communication processing unit 11 of each client computer 10 receives information from the network NW and sends out information to the network. The command processing unit 12 requests processing to each unit on the basis of the command provided through the network NW.

Moreover, the virtual space area management unit 15 manages properties and others of each object in the virtual space shared with other client computers. The virtual space area management unit 15 has an object table as described below for the purpose of management.

The data management computer 200 comprises a communication processing unit 211, a command processing unit 212, and a data management unit 213. The data management unit 213 is connected to a secondary storage 201 in which CG data is stored, and manages and processes the CG data defining the virtual space. The communication processing unit 211 receives information from the network NW and sends out information to the network NW, in the same way as the one in the host computer 100 and each client computer 10. The command processing unit 212 also requests processing to each unit on the basis of the command provided through the network NW, in the same way as the one in the host computer 100 and each client computer 10.

As the data management computer 200, for example, the WWW (World Wide Web) server computer is used. As the format of the data defining each object construction the virtual space, for example, VRML (Virtual Reality Modeling Language) is used.

Figure 6:
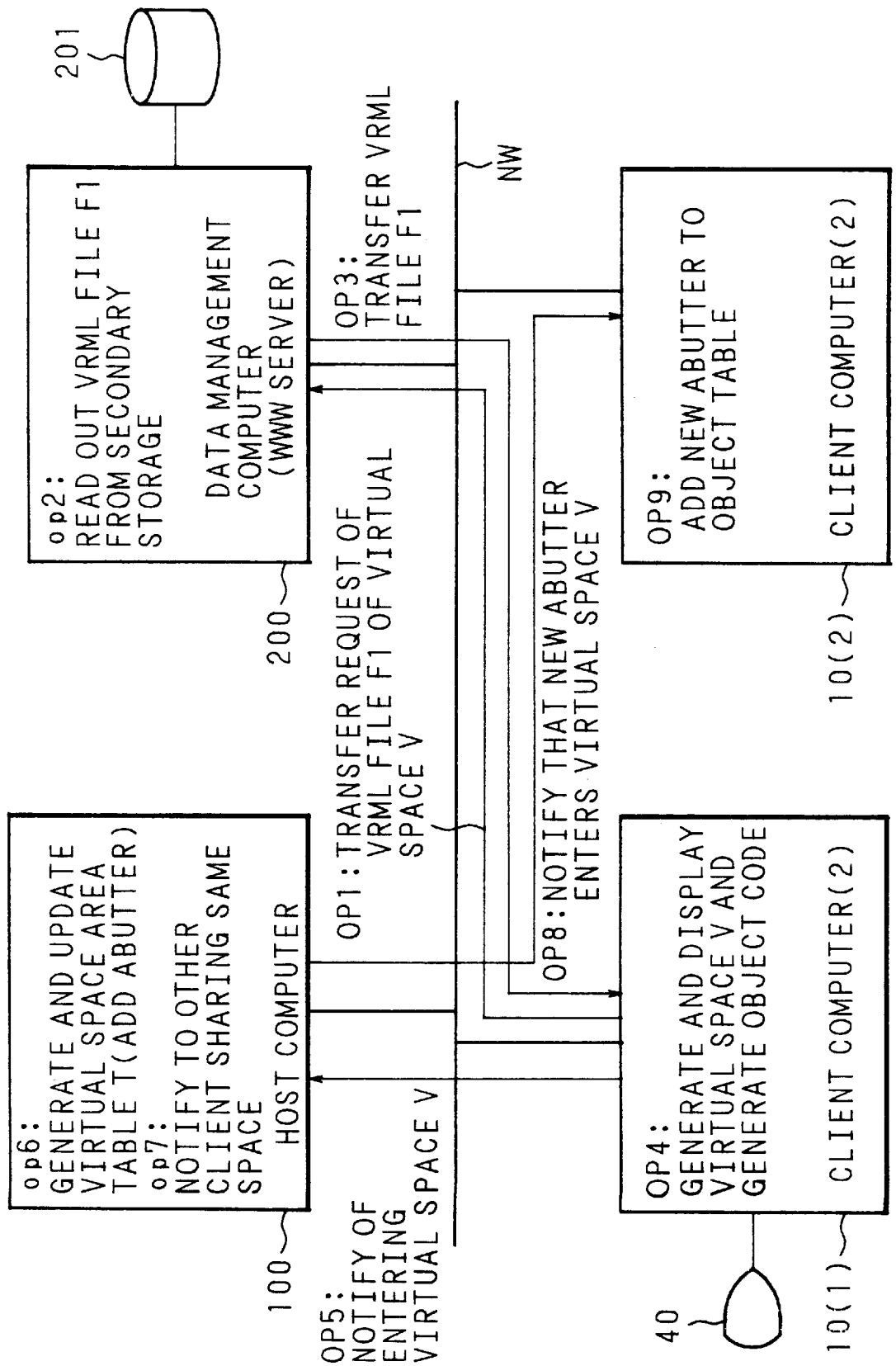
FIG. 6 is a diagram showing procedure of processing for entering into the virtual space from the client computer.

In such virtual space communication system, when participating in communication in an existing virtual space from a certain client computer, it is processed, for example, in the procedure shown in FIG. 6.

In FIG. 6, a transfer request of VRML file F1 describing the virtual space V into which the user desires to participate is transmitted from the client computer 10 (1) of the user to the data management computer 200 through the network NW (OP1). In the data management computer 200, responding to the transfer request, the requested VRML file F1 is read out from the secondary storage 201 (OP2). The VRML file F1 read out is transferred to the client computer 10 (1) which has issued the transfer request from the data management computer 200 through the network NW (OP3). When the client computer 10 (1) receives the VRML file F1 describing the desired virtual space V from the network NW, this VRML file F1 is interpreted, and the virtual space V is generated, and the image of the virtual space V is displayed on the screen of the display unit 40 (OP4). Besides, the objects (abutters) corresponding to other client computers already existing in this virtual space V, and the object (abutters) corresponding to the user (client computer 10 (1)) newly participating in the virtual space V are listed, and an object table is generated. This object table is constructed, for example, as shown in FIG. 7.

Figure 7:
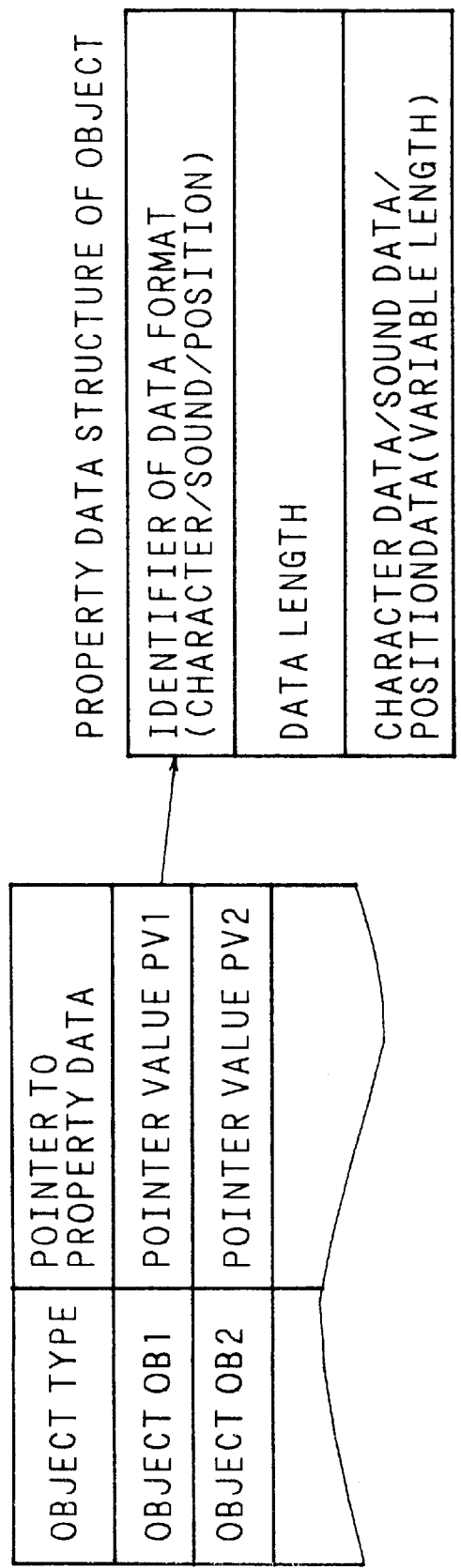
FIG. 7 is a diagram showing a configuration example of an object table.

In FIG. 7, in the object table, object OB1, object OB2, ... which exist in the virtual space V, and pointer value PV1, pointer value PV2, ... which identify the storing position of property data of each object are described so as to correspond to each other. The structure of property data of each object is a combination of identifier (character/sound/position) expressing the data format of the property data, its data length, and data (character data/sound data/position data).

When such object table is generated in the client computer 10 (1), this client computer 10 (1) notifies to the host computer 100 through the network NW that the object corresponding to the client computer 10 (1) has entered the virtual space V (OP5). The host computer 100 receiving such notification updates the corresponding virtual space area table T by adding a new object to the virtual space area table T showing the relation of each virtual space (area) and objects existing in the virtual space (OP6). This virtual space area table is constructed, for example, as shown in FIG. 8.

Figure 8:
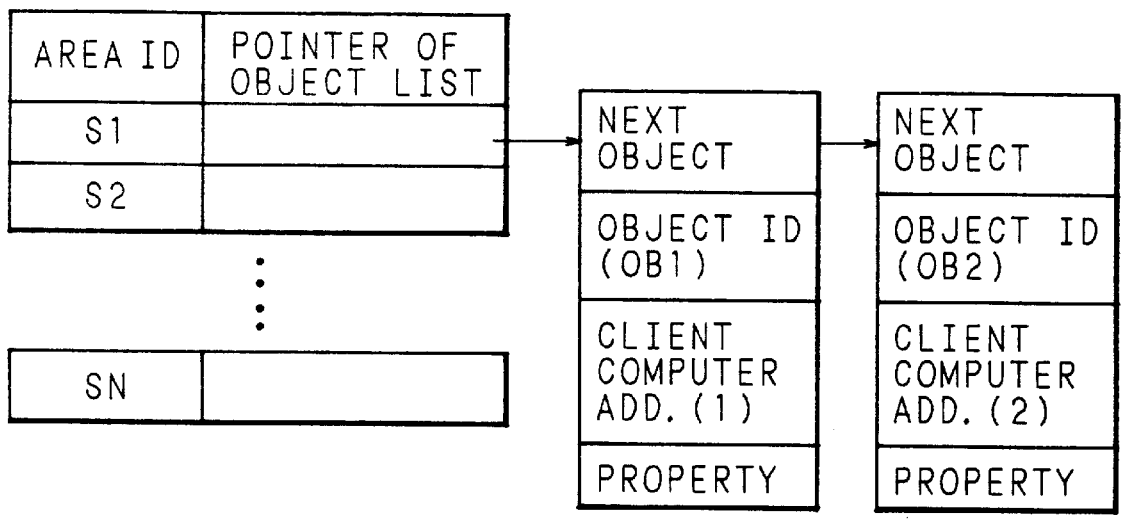
FIG. 8 is a diagram showing a configuration example of a virtual space region table.

In FIG. 8, in the virtual space area table, the objects existing (shard) in areas (virtual spaces) S1, S2, ... are described in a list form. The data relating to each object is composed of the pointer value indicating the position of next object, object ID identifying the object, address identifying the client computer manipulating the object, and property data showing the position of object and others.

In the host computer 100, when the virtual space area table is updated as described above, it is notified that the new object is added to the virtual space V to other client computer sharing the virtual space V in which the new object has entered, for example, client computer 10 (2), through the network (OP7, OP8). The client computer 10 (2), receiving the notification, adds the new object to its own object table (see FIG. 7) (OP9).

Figure 9:
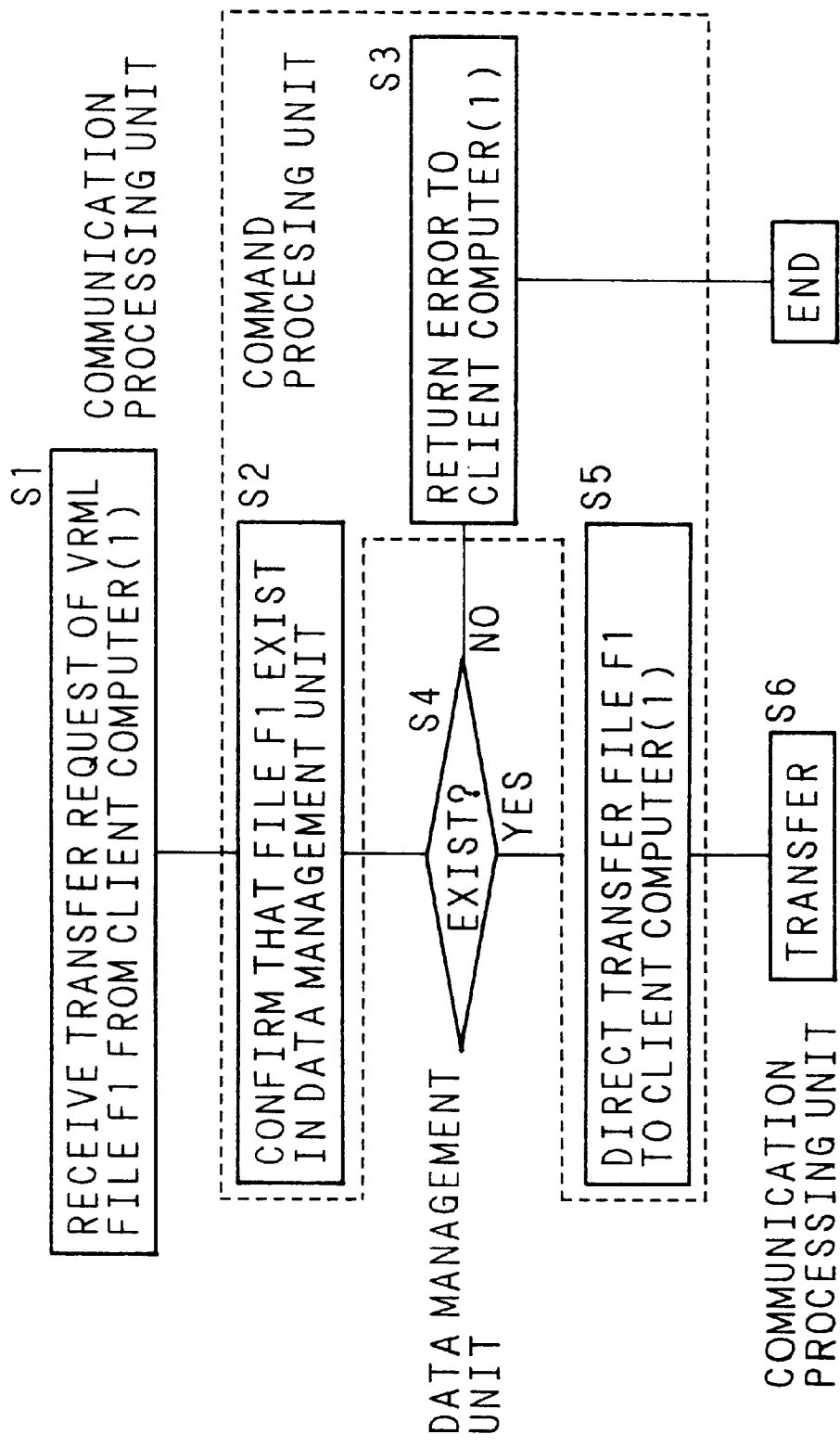
FIG. 9 is a diagram showing processing procedure of a data management computer responding to transfer request of file from a client computer.

In processing according to this procedure, processing (OP2 in FIG. 6) responding to the transfer request of VRML file in the data management computer 200 is concretely executed, for example, according to the procedure shown in FIG. 9.

In FIG. 9, the communication processing unit 211 receives a transfer request R1 of VRML file F1 from the client computer 10 (1) through the network NW (step S1). The transfer request R1 is provided to the command processing unit 212, and the command processing unit 212 inquires the data management unit 213 whether the requested file F1 is present in the secondary storage 201 or not (step S2). As a result, when the file F1 is present in the secondary storage 201 (step S4), the command processing unit 212 instructs the communication processing unit 211 to transfer the file F1 being read-out from the secondary storage 201 by the data management unit 213 to the client computer 10 (1) requesting the transfer (step S5). Consequently, the communication processing unit 211 sends out the file F1 read out from the secondary storage 201 to the network NW as the data addressed to the client computer 10 (1) according to the instruction from the command processing unit 212 (step S6).

On the other hand, when the file F1 which is the object of the transfer request R1 from the data management unit 213 is not present in the secondary storage 201 (step S4), the command processing unit 212 instructs the communication processing unit 211 to return an error signal to the client computer 10 (1) issuing the transfer request R1 (step S3).

Figure 10:
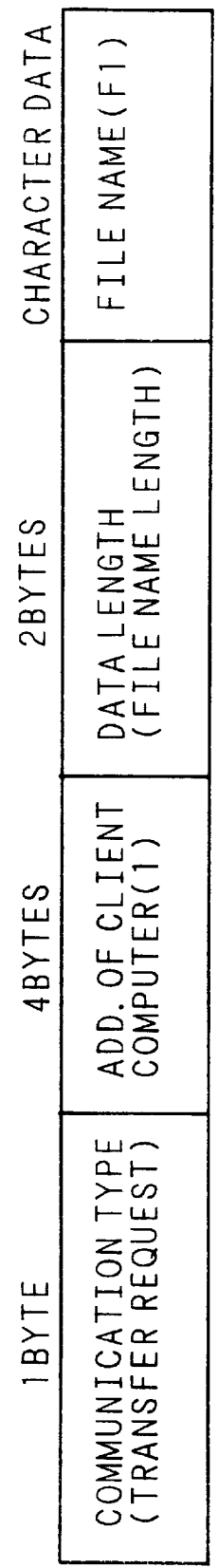
FIG. 10 is a diagram showing a data structure of transfer request issued from a client computer in the processing procedure in FIG. 9.

The format of the transfer request R1 issued by the client computer 10 (1) is, for example, as shown in FIG. 10.

In FIG. 10, there is a series concatenated structure of communication type data (1 byte) showing transfer request, address (4 bytes) for identifying the client computer 10 (1) that has issued the transfer request, data length data (2 bytes) expressing the length of the file name, and file name (character data).

Figure 11:
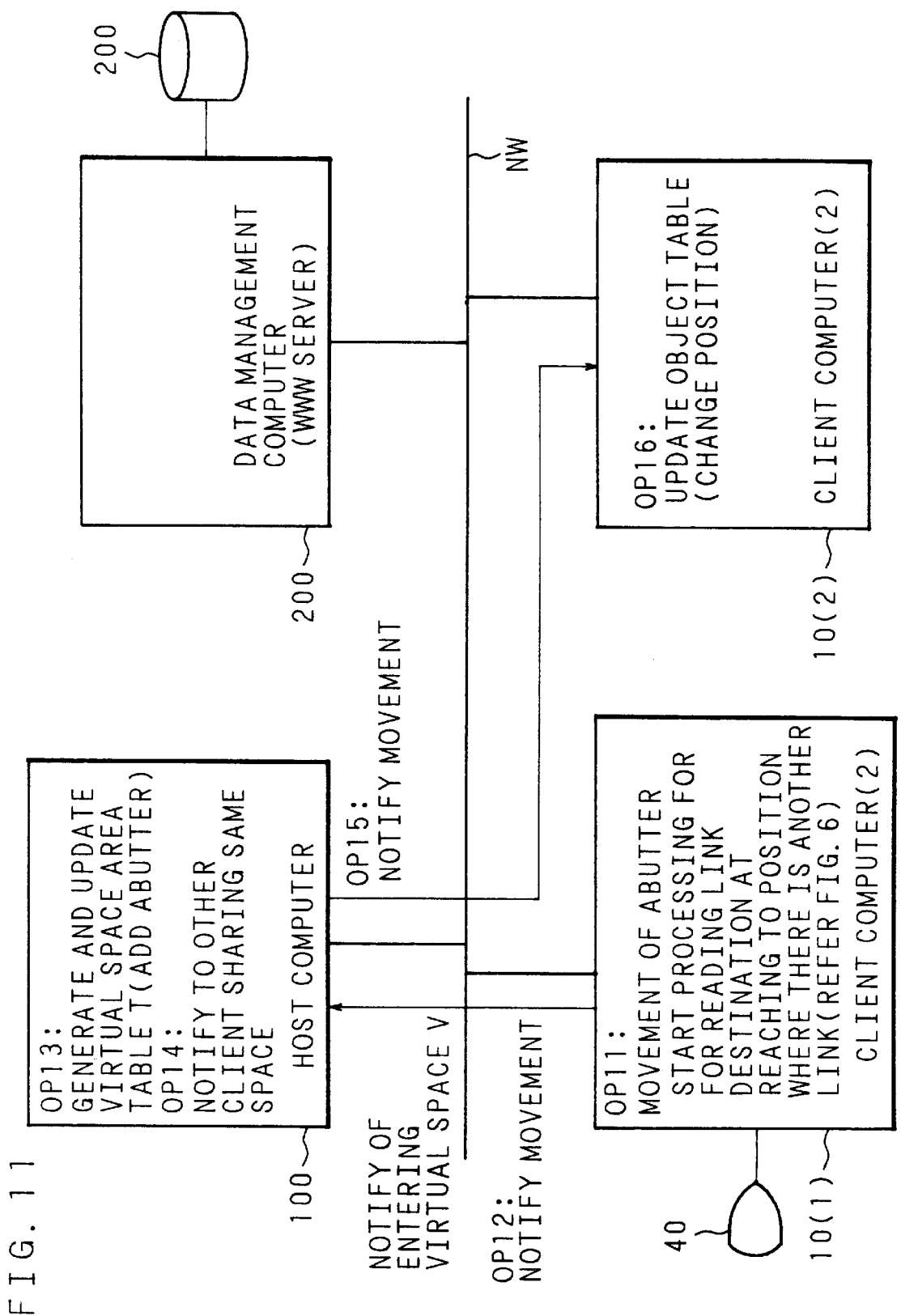
FIG. 11 is a diagram showing processing procedure accompanied by move of object in virtual space.

In a certain computer, when manipulated to move the object (abutter) in the virtual space, the process is executed, for example, in the procedure shown in FIG. 11.

In the client computer 10 (1), when the object (abutter) corresponding to the client computer 10 (1) is moved in the virtual space V by input operation using the input device 30 (OP11), the movement of the object is notified to the host computer 100 from the client computer 10 (1) through the network NW (OP12). Receiving this notification, the host computer 100 updates the position data of the property data of the object in the virtual space area table possessed inside according to the movement (OP13). Referring to the virtual space area table, the movement of the object is notified from the host computer 100 to other client computer sharing the same virtual space V, for example, the client computer 10 (2) (OP4, OP5). Receiving this notification, in the client computer 10 (2), the position data of the property data of this moving object in the object table (see FIG. 7) is updated corresponding to the movement (OP16). In consequence, the object corresponding to the client computer 10 (1) moves according to the updated property data (position data) on the display screen of the other client computer 10 (2) sharing the virtual space V. That is, when the object is moved in the virtual space V by manipulation in the client computer 10 (1), the object is moved in the virtual space V in all other client computers sharing the same virtual space V.

Figure 12:
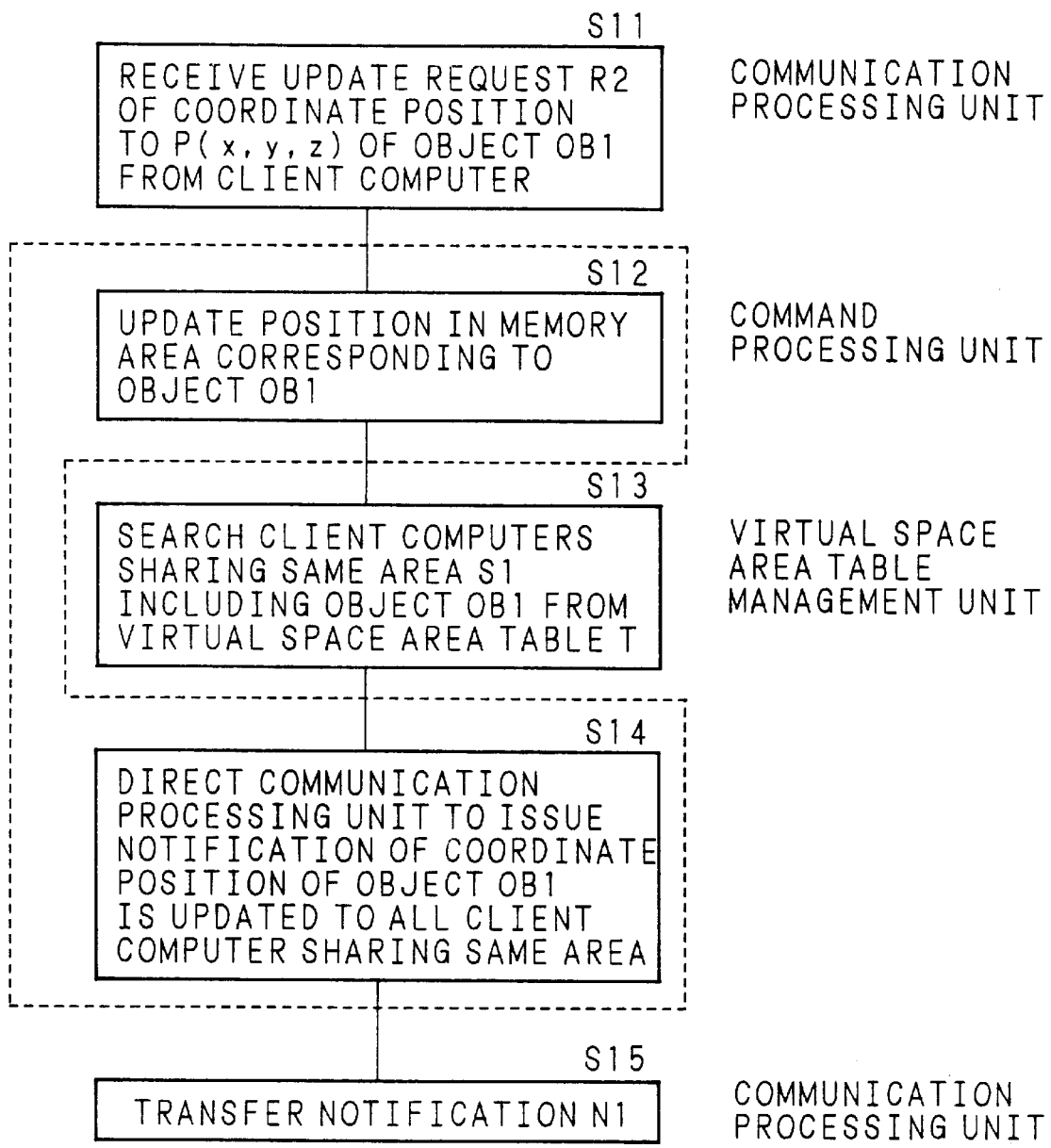
FIG. 12 is a diagram showing processing procedure in a host computer accompanied by move of object in virtual space.

In such processing procedure, the processings of OP13 and OP14 for notifying the updating of the virtual space area table and movement of object in the host computer 100 is executed, for example, in the procedure shown in FIG. 12.

In FIG. 12, the communication processing unit 111 receives a update request R2 (move) of the corresponding object OB1 to coordinate position P (x, y, z) from the client computer 10 (1) through the network NW (step S11). Responding to this update request R2, the command processing unit 112 updates the position data of the property data of the object OB1 in the virtual space area table to P (x, y, z) (step S12). The virtual space area table management unit 114, referring to the virtual space area table, investigates client computers sharing the same area as the area (virtual space) containing the object OB1 (step S13). According to the result, the command processing unit 112 gives notification N1 to notice that the coordinate position of the object OB1 has been updated to all client computers sharing the same area, to the communication processing unit 111 (step S14). Receiving this notification N1, the communication processing unit 111 sends the notification N1 to all client computers sharing the same area (step S15).

The format of the update request R2 issued by the client computer 10 (1) is, for example, as shown in FIG. 13.

In FIG. 13, there is a series concatenated structure of communication type data (1 byte) showing the data of update request, object ID (2 bytes) identifying the object OB1 to be updated, updated property ID (1 byte) showing the type of property to be updated, data length data (2 bytes) showing the length of data, and update data (x, y, z). The format of the notification N1 issued from the host computer 100 is, for example, as shown in FIG. 14. In FIG. 14, all other items than the communication type data showing the notification are same as in the update request R2 shown in FIG. 13.

By updating the property data of each object on the virtual space (area) configured in a system constructed of plural client computers 10, host computer 100 and data management computer 200, each user of the client computer can communicate with each other. In this case, update of data of each property is done, in principle, according to the procedure shown in FIG. 11, in the same way as in the case of position data which is one of the property data. More specifically, the procedure is shown in FIG. 15.

Figure 15:
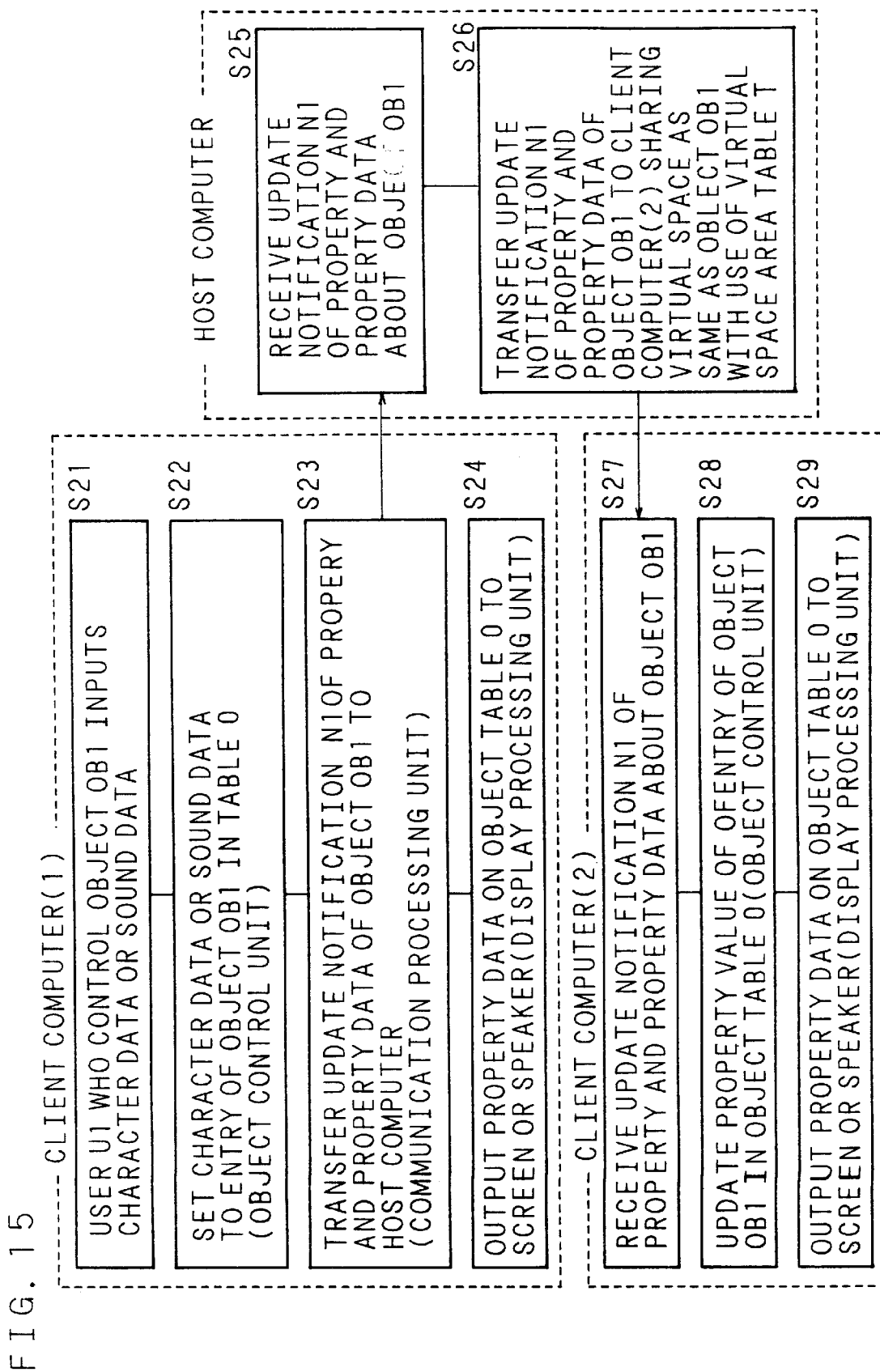
FIG. 15 is a diagram showing processing procedure for updating property of object in virtual space.

In FIG. 15, in the client computer 10 (1), the user U1 controlling the object OB1 inputs character data or voice data corresponding to speech text, for example, by using the input device 30 (step S21). The object control unit 14 sets the input information (voice data or character data) in the entry of the object OB1 in the object table (see FIG. 7) as the property data (step S22). Therefore, the communication processing unit 11, receiving a request from the command processing unit 12, transmits the property update notification N2 of the object OB1 and its property data (character data or voice data) to the host computer 100 through the network NW (step S23). The display processing unit 16 displays the characters (expressing the speech text) on the basis of the property data of the object OB1 in the object table on the display screen of the display unit 40 so as to correspond to the object OB1, or produces the voice corresponding to the speech text from a speaker attached to the display unit 40 (step S24).

In this way, the update notification N2 and property data transmitted to the host computer 100 are received by the communication processing unit 111 of the host computer 100 (step S25). The virtual space area table management unit 114, referring to the virtual space area table (see FIG. 8), searches for other client computer 10 (2) sharing the same virtual space as the object OB1. According to the request from the command processing unit 112, the communication processing unit 111 transmits the received property update notification N2 of the object OB1 and its property data to the client computer 10 (2) (step S26).

In the client computer 10 (2), the communication processing unit 11 receives the property update notification N2 of the object OB1 and its property data transmitted from the host computer 100 through the network NW (step S27). The object control unit 14 updates the property data set in the entry of the object OB1 in the object table to the received property data according to the property update notification N2 of the object OB1 (step S28). The display processing unit 16 displays the characters (expressing the speech text) on the display screen of the display unit 40 corresponding to the object OB1, on the basis of the property data of the object OB1 in the object table, or produces the voice corresponding to the speech text from the speaker attached to the display unit 40 (step S29). As result, the user U2 of the client computer 10 (2) obtains the information from the user U1 of the client computer 10 (1), by reading the speech text displayed on the display screen corresponding to the object OB1, or by hearing the voice corresponding to the speech text produced from the speaker.

According to such processing, the information inputted from each client computer can be transmitted to the users of other client computers sharing the same virtual space through the behavior of the object. As a result, communications can be realized among users of plural client computers.

Figure 16:
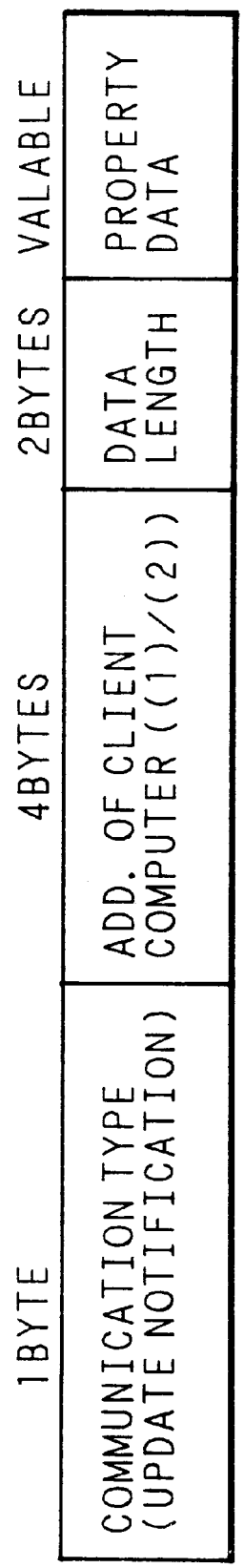
FIG. 16 is a diagram showing data structure of update notification used in property updating processing of object in virtual space.

The format of the property update notification N2 of the object is, for example, as shown in FIG. 16. In FIG. 16, there is a series concatenated structure of communication type data (1 byte) showing the update notification, address (4 bytes) for identifying the client computer updated in the property of the object, data length (2 bytes) of updated property data, and updated property data (variable length).

Figure 17:
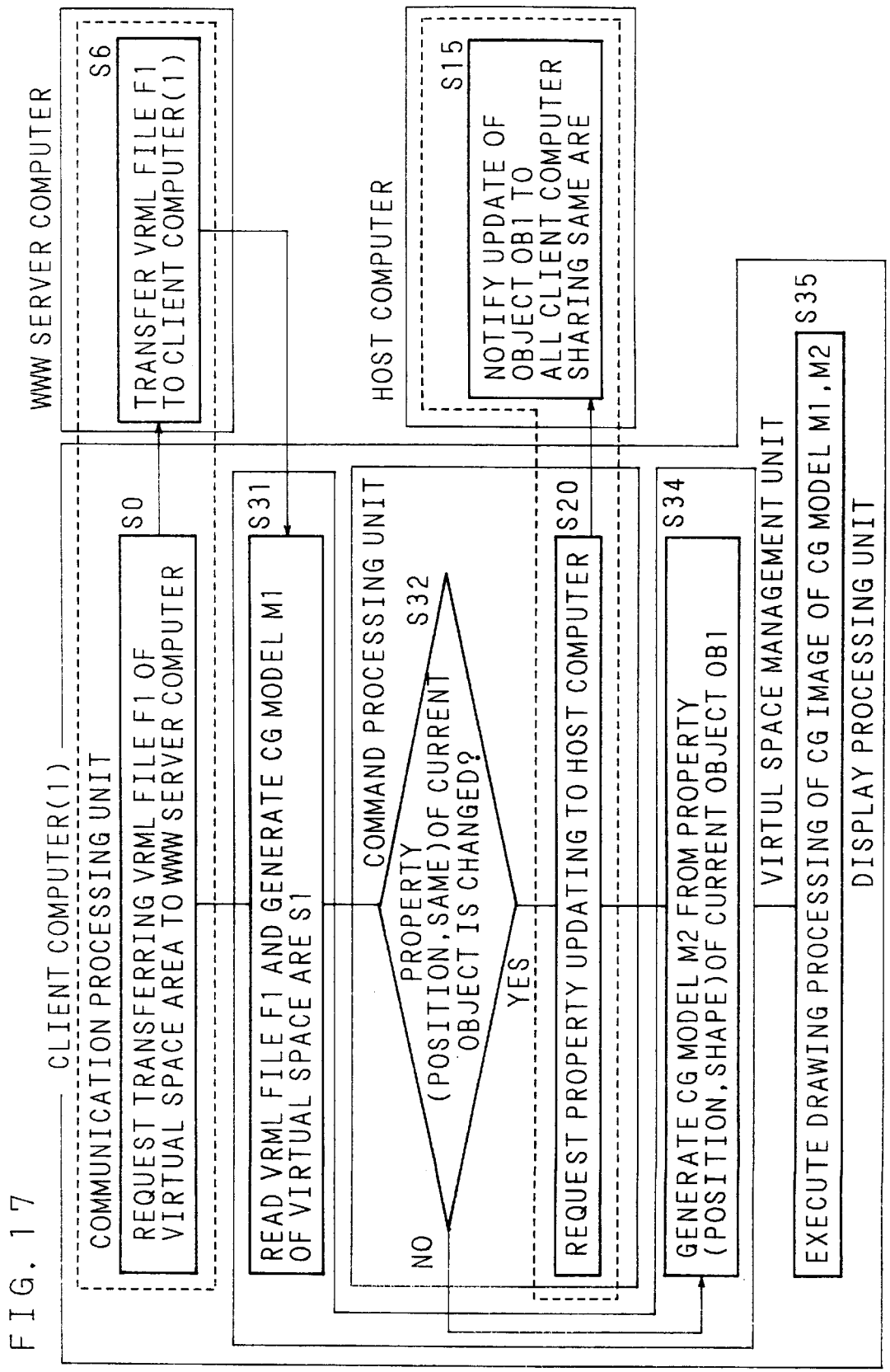
FIG. 17 is a diagram showing processing procedure for displaying virtual space and objects by CG image on a client computer.

The client computer 10 integrates the VRML file describing the virtual space and the property data of the object, and generates a CG (computer graphics) image of the virtual space in which the object is present. This processing is done, for example, in the procedure shown in FIG. 17.

For instance, between the client computer 10 (1) and the data management computer 200, reading process of VRML file defining the virtual space area is executed according to the operations OP1, OP2, OP3 in FIG. 6. That is, in FIG. 17, the client computer 10 (1) sends a transfer request of VRML file F1 defining the virtual space area S1 to the data management computer 200 through the network NW (step S0). Receiving this transfer request, the data management computer 200 reads out the requested VRML file F1 from the secondary storage 201 according to the procedure shown in FIG. 9, and transfers the read VRML file F1 to the client computer 10 (1) (step S6).

The client computer 10 (1), after the communication processing unit 11 sends out the transfer request, receives the VRML file F1 from the data management computer 200, and the virtual space area management unit 15 reads the received VRML file F1, and generates a CG model M1 of the virtual space area S1 on the basis of the file data (step S31).

The command processing unit 12 judges whether the property (position, shape, etc.) of the current object OB1 is changed by the input operation of the user or not (step S32). When changed, according to the request of the command processing unit 12, the communication processing unit 11 sends out a update request of property data of the object OB1 to the host computer 100 (step S20). Receiving this update request of the object OB1, the host computer 100 notifies the update of the property (position, shape, etc.) of the object OB1 to all client computers sharing the same virtual space area S1 according to the processing procedure shown in FIG. 12 (step S15).

The virtual space area management unit 15 of the client computer 10 (1) further generates a CG model M2 relating to the object (human, animal, etc., called abutter) from the current property (position, shape, etc.) of the object OB1 (step S34). Afterwards, the CG model M1 generated from the VRML file F1 and the CG model M2 generated on the basis of the property data of the object OB1 are presented to the display processing unit 16. The display processing unit 16 processes drawing of CG image by using the CG models M1 and M2. As a result, the CG image in which the specific object OB1 exists in the virtual space area S1 is displayed by property data on the screen of the display unit 40.

The VRML file defining the virtual space area is described, for example, as follows.

```
                     SEPARATOR {
                     PERSPECTIVECAMERA {
(Viewpoint →    POSITION          0 10 50
information) →  ORIENTATION       0 0 1 0
(Clipping →     NEARDISTANCE      10
information) →  FARDISTANCE       100
                     }
                     }
                     SEPARATOR {
(Color →        MATERIAL     {DIFFUSECOLOR 0.5 0.7 0.3}
information)
(Shape →        CUBE         {WIDTH 100 HEIGHT 30 DEPTH 40}
information)
```

Figure 18:
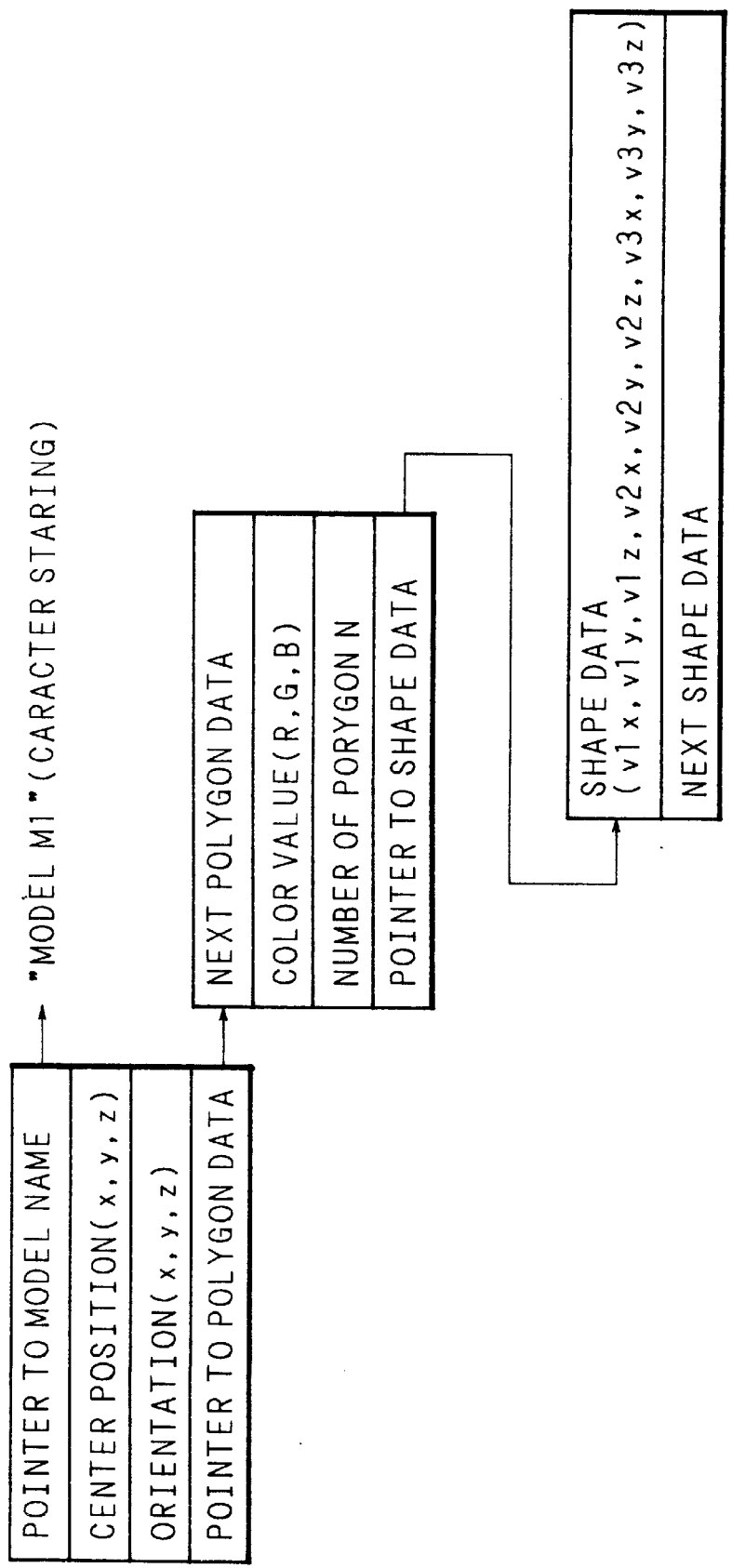
FIG. 18 is a diagram showing an example of CG model structure.

The CG models M1, M2 generated on the basis of the VRML file and property data of object are, for example, as shown in FIG. 18. That is, the position, orientation, surface structure, shape, color and others of the object (abutter) constructing the virtual space are described in a list form.

In the first embodiment of the virtual space communication system of the invention, moreover, the user can create a new virtual space in the client computer, and this virtual space can be shared with other client computers, which is described below.

Figure 19:
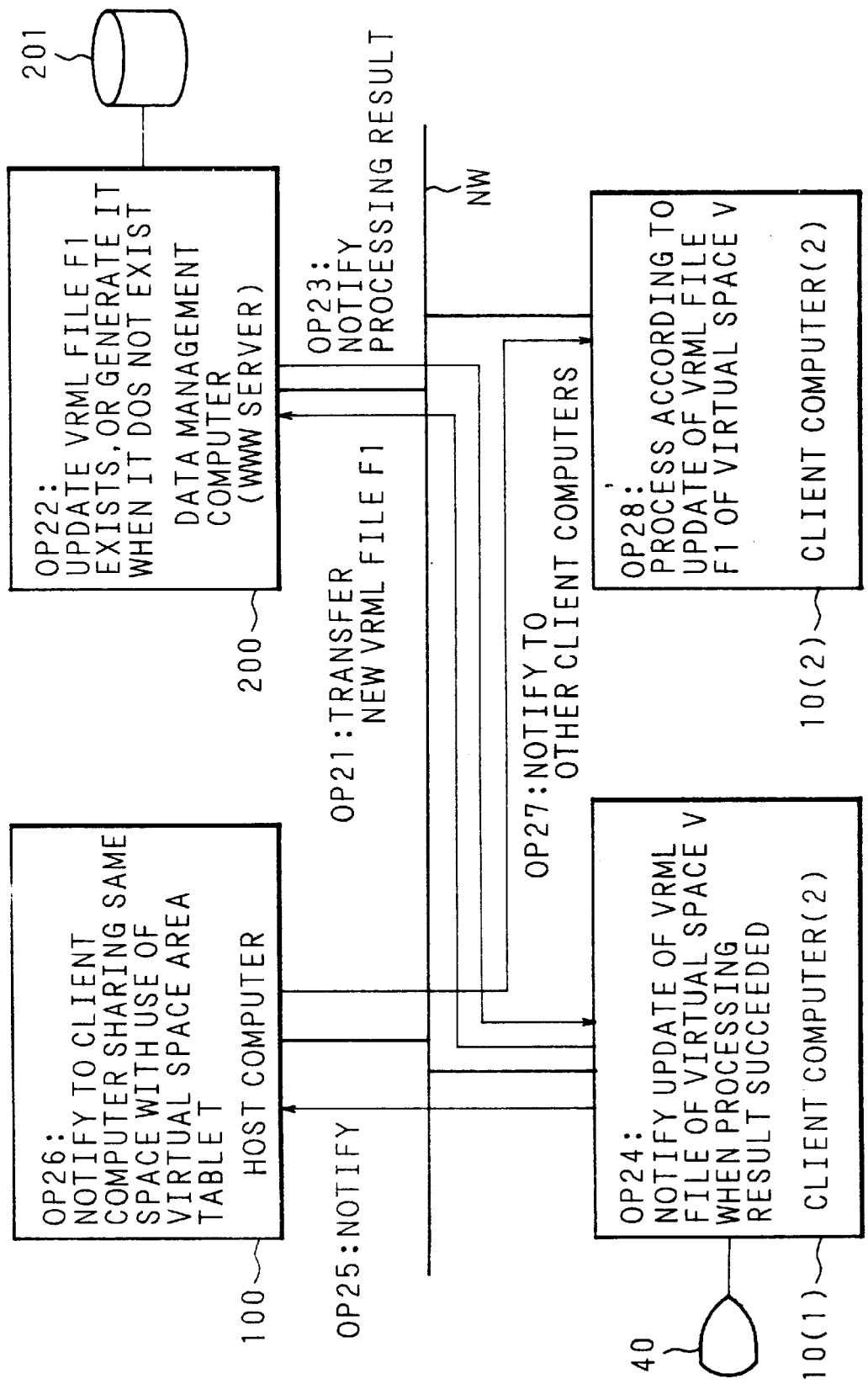
FIG. 19 is a diagram showing processing procedure for updating VRML file expressing virtual space by a client computer.

This processing is done, for example, in the procedure shown in FIG. 19.

In FIG. 19, the VRML file F1 defining a new virtual space area created in the client computer 10 (1) is transmitted to the data management computer 200 through the network NW (OP21). The data management computer 200 receiving the VRML file F1 checks whether a VRML file having the same file name as this file name F1 is present in the secondary storage 201 or not. When present, the content of the VRML file is updated to the content of the received file. When not present, the received VRML file F1 is newly registered (created) (OP22). The processing result is sent from the data management computer 200 to the client computer 10 (1) which has transmitted the new VRML file (OP23).

The client computer 10 (1) receiving the processing result in the data management computer 200 recognizes that the updating of the VRML file F1 is allowed on the basis of the processing result, and notifies to the host computer 100 that the VRML file F1 defining the virtual space V has been updated (OP24, OP25). Receiving this notification, the host computer 100 refers to the virtual space area table (see FIG. 8), and notifies to other client computer 10 (2) sharing the virtual space V described in this VRML file F1 that this VRML file F1 has been updated (OP26, OP27).

In each client computer 10 (2) thus notified of updating of VRML file F1, the fact is notified to the user as message. When the user wishes to communicate in the updated virtual space, the updated VRML file F1 is downloaded into the client computer 10 (2) from the data management computer 200 by the operation of the user (OP8). Or when the user does not wish to communicate in the updated virtual space, the user may not operate to download the updated VRML file F1. In this case, the virtual space before updating is maintained in the client computer 10 (2).

Figure 20:
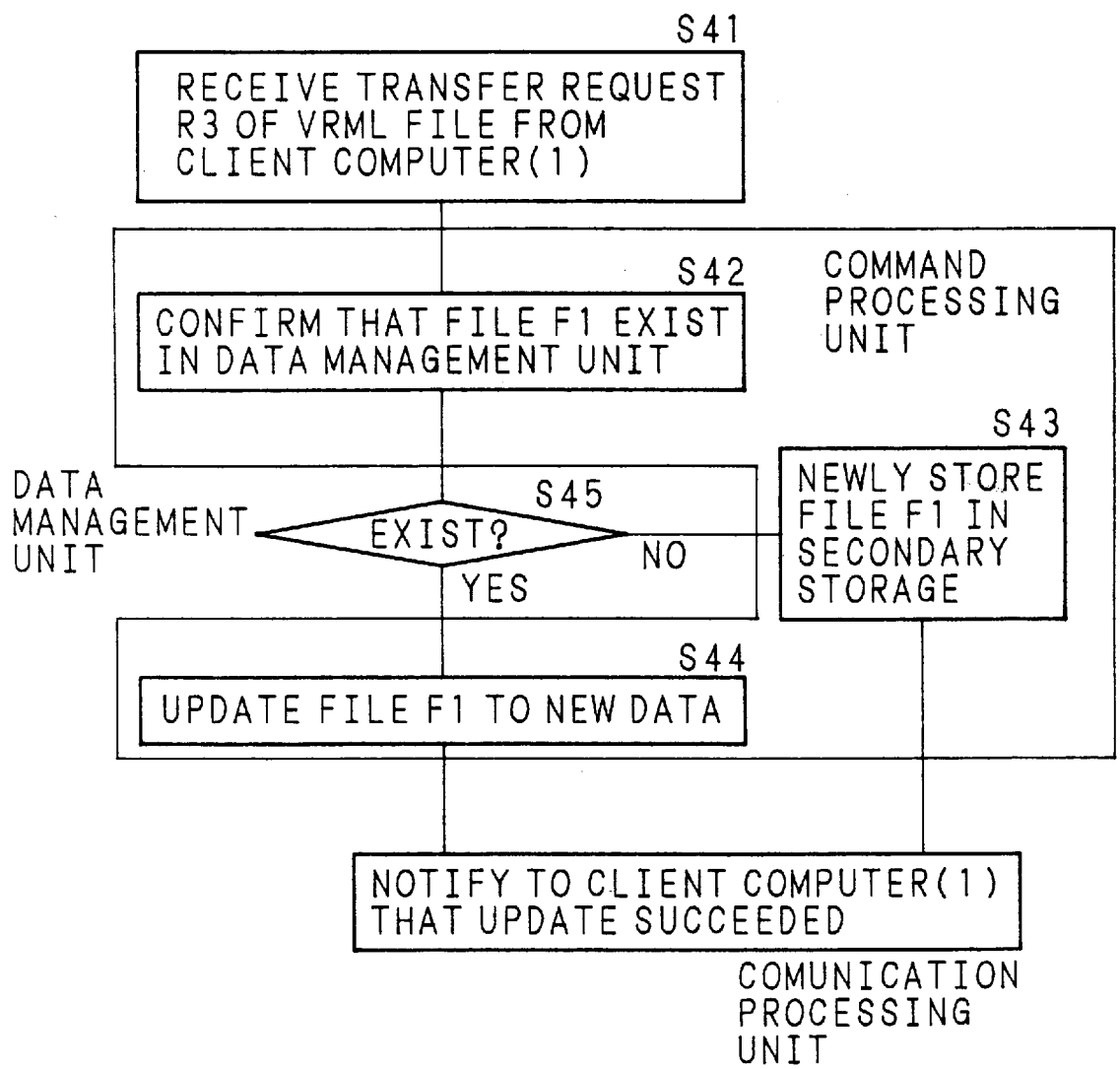
FIG. 20 is a diagram showing processing procedure of data management computer when updating of VRML file is requested from a client computer.

In such processing, in the data management computer 200, specifically, the process (OP22) is executed in the procedure, for example, shown in FIG. 20.

In FIG. 20, the communication processing unit 211 receives an update request R3 of VRML file F1 from the client computer 10 (1) (step S41). The command processing unit 212 inquires the data management unit 213 whether the requested file F1 is present in the secondary storage 201 or not (step S42). When the data management unit 213 recognizes the presence of the file F1 (step S45), the command processing unit 212 updates the file F1 according to the update request R3 (step S44). On the other hand, when the data management unit 213 recognizes that the file F1 of update request R3 is not present in the secondary storage 201 (step S45), the command processing unit 212 registers (stores) the file F1 of update request R3 in the secondary storage (step S43).

When updating or new registration of the file F1 of update request R3 is completed in this way, the communication processing unit 211 notifies, by the request from the command processing unit 212, to the client computer 10 (1) that the file F1 of update request R3 has been successfully updated, as the processing result (step S46).

The format of the update request R3 is, for example, as shown in FIG. 21.

In FIG. 21, there is a series concatenated structure of communication type data (1 byte) showing the update request, address (4 byte) for identifying the client computer issuing the update request, data length (2 bytes) of file name, file name (variable length), data length (2 bytes) of data for describing the virtual space, and data for describing the virtual space (variable length).

Figure 22:
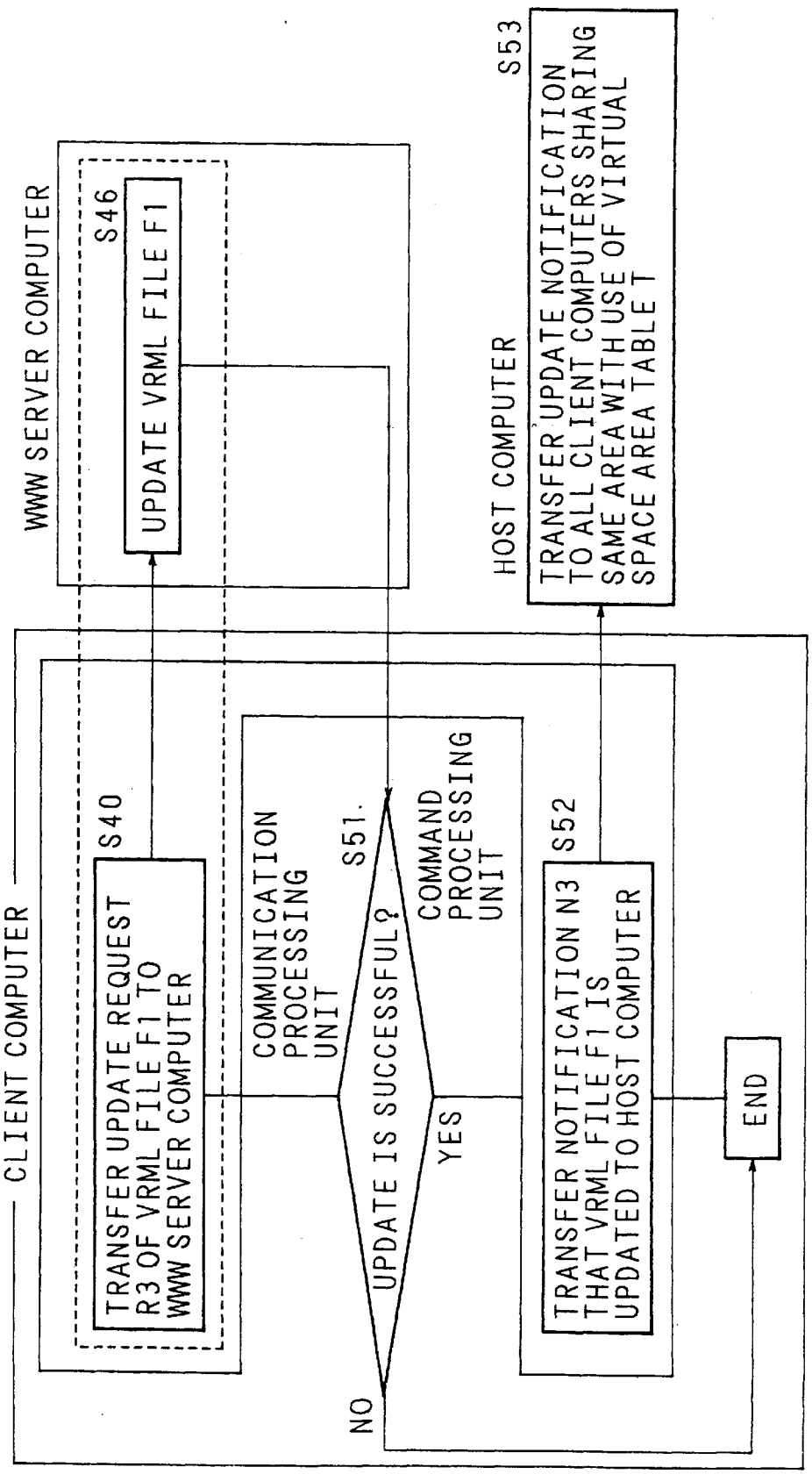
FIG. 22 is a diagram showing processing procedure of a client computer receiving a message of successful updating of VRML file from data management computer.

In this updating processing of the file, processing in the client computer 10 (1) for issuing updated request is executed specifically according to the procedure shown, for example, in FIG. 22.

In FIG. 22, the update request R3 of VRML file F1 is transmitted from the communication processing unit 11 to the data management computer 200 (step S40). The data management computer 200 which has received the update request R3 updates the VRML file F1 according to the procedure shown in FIG. 20. That the updating is done successfully is notified to the client computer 10 (1) as the processing result (step S46). When the communication processing unit 11 of the client computer 10 (1) receives the processing result from the data management computer 200 and the command processing unit 12 confirms the successful updating of the file F1 (step S51), the communication processing unit 11 sends the notification N3 of updating of VRML file F1 to the host computer 100 by the request of the command processing unit 12 (step S52).

When the host computer 100 receives the update notification N3 from the client computer 10 (1) through the network NW, as mentioned above, the update notification N3 is transmitted to the other client computers sharing the virtual space area defined by the VRML file from the host computer 100 (step S53).

The format of update notification N3 is, for example, as shown in FIG. 23. In FIG. 23, there is a series concatenated structure of communication type data (1 byte) showing the update notification, address (4 bytes) for identifying the client computer issuing the update notification, data length (2 bytes) of updated file, and updated file name (variable length).

Of the CG data expressing the virtual space, CG data of relatively large quantity such as texture image and CG data of object that is used frequently may be preliminarily stored in the secondary storages 20 and 201 of each client computer 10 and data management computer 200. In this case, to form the CG image corresponding to the virtual space, each client computer executes the processing according to the procedure, for example, shown in FIG. 24.

Figure 24:
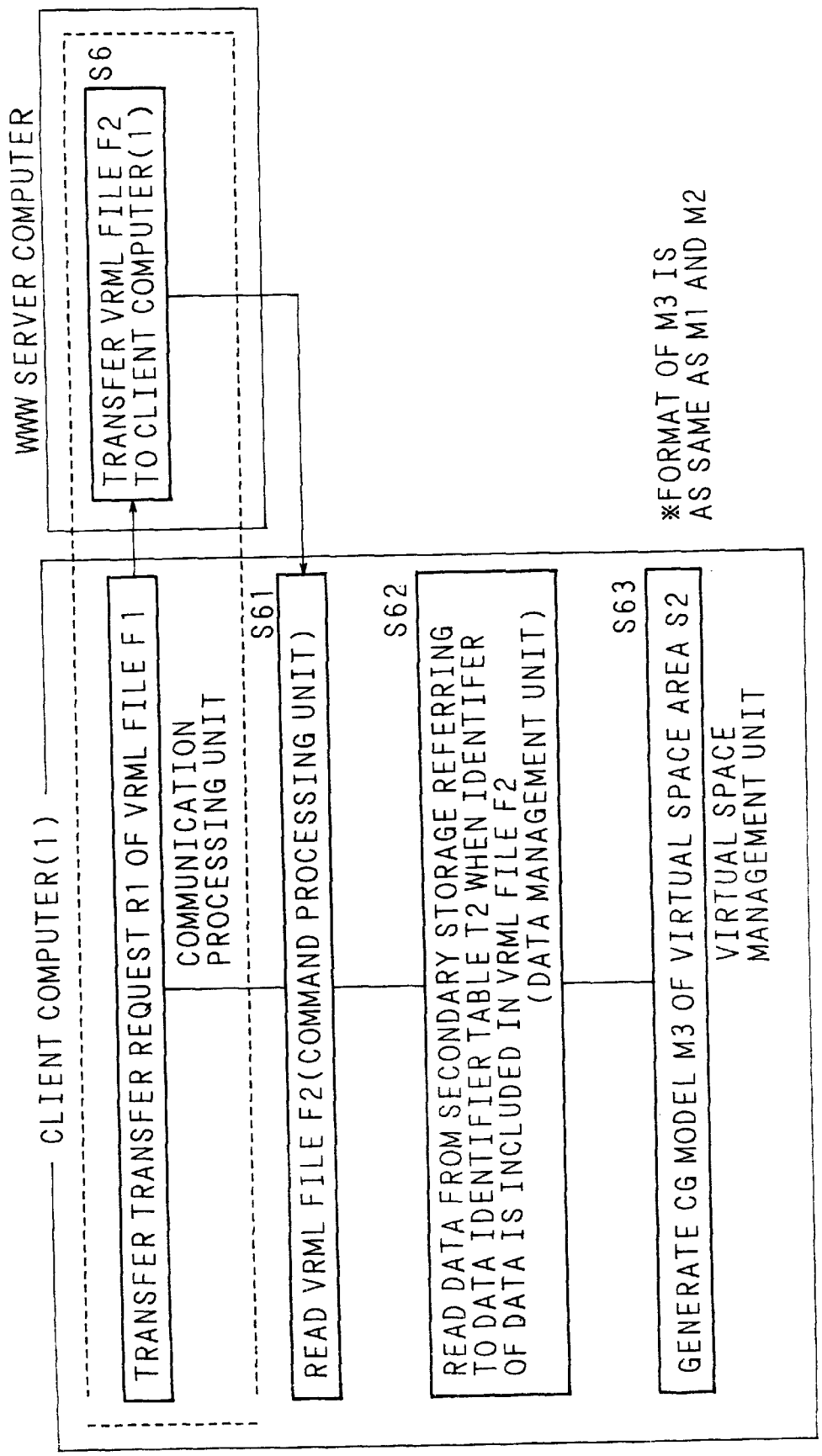
FIG. 24 is a diagram showing processing procedure for generating CG data expressing virtual space on the basis of VRML file supplied from data management computer and CG data possessed by client computer, in client computer.

In FIG. 24, a transfer request R1 of VRML file F2 defining the virtual space area is sent from the communication processing unit 11 of the client computer 10 to the data management computer 200 (step S0). When the data management computer 200 receives the transfer request R1 from the client computer 10, the data management computer 200 executes the processing according to the procedure shown in FIG. 9, and transfers the VRML file F2 of this transfer request R1 to the client computer 10 which has transmitted the transfer request R1 (step S6).

The communication processing unit 11 of the client computer 10 receives the VRML file F2 from the data management computer 200, and the command processing unit 12 reads the received VRML file F2 (step S61). Herein, when the VRML file F2 contains an identifier for identifying the data (for example, texture image data), the data management unit 13 refers to the data identifier table, and reads out the data identified by the identifier from the secondary storage 20. On the basis of the VRML file F2 received by the virtual space area management unit 15 and the data being read out from the secondary storage 20, a CG model M3 expressing the virtual space area S2 is generated. By drawing processing of the display processing unit 16 on the basis of the CG model M3, the virtual space area S2 is displayed on the screen of the display unit 40.

The CG data such as texture image data corresponding to the identifier that can be contained in the VRML file F2 is managed by using the data identifier table. The data identifier table shows the relation between the identifier (for example, TEXTURE-ID) identifying the data and the storing address (for example, /DATA/TEXTURE.RGB) of the corresponding data in the secondary storage 20 as shown in FIG. 25.

The VRML file containing such identifier identifying the data is described, for example, as follows.

|  |  |  |
|---|---|---|
|  | SEPARATOR  { |  |
|  | PERSPECTIVECAMERA  { |  |
| (Viewpoint → | POSITION | 0 10 50 |
| information) → | ORIENTATION | 0 0 1 0 |
| (Clipping → | NEARDISTANCE | 10 |
| information) → | FARDISTANCE | 100 |
|  | } |  |
|  | } |  |
|  | SEPARATOR  { |  |
| (Color → | MATERIAL | {DIFFUSECOLOR 0.5 0.7 0.3} |
| information) |  |  |
| (Shape → | CUBE | {WIDTH 100 HEIGHT 30 DEPTH 40} |
| information) |  |  |
| (Texture → | TEXTURE2 TEXTURE-ID | {FILENAME |
| information) | "FILE://DATA TEXTURE. RGB"} |  |

In this way, since the CG data of large information quantity such as texture image and CG data of object that is used frequently are stored in the secondary storage 20 of each client computer 10, the quantity of data to be downloaded through the network NW is reduced, and the processing in the client computer is alleviated.

When the CG data identified by the identifier is updated in other client computer, the CG image corresponding to the virtual space can be obtained by using the latest CG data. In this case, in order to form the CG image corresponding to the virtual space, each client computer executes the process according to the procedure, for example, shown in FIG. 26.

Figure 26:
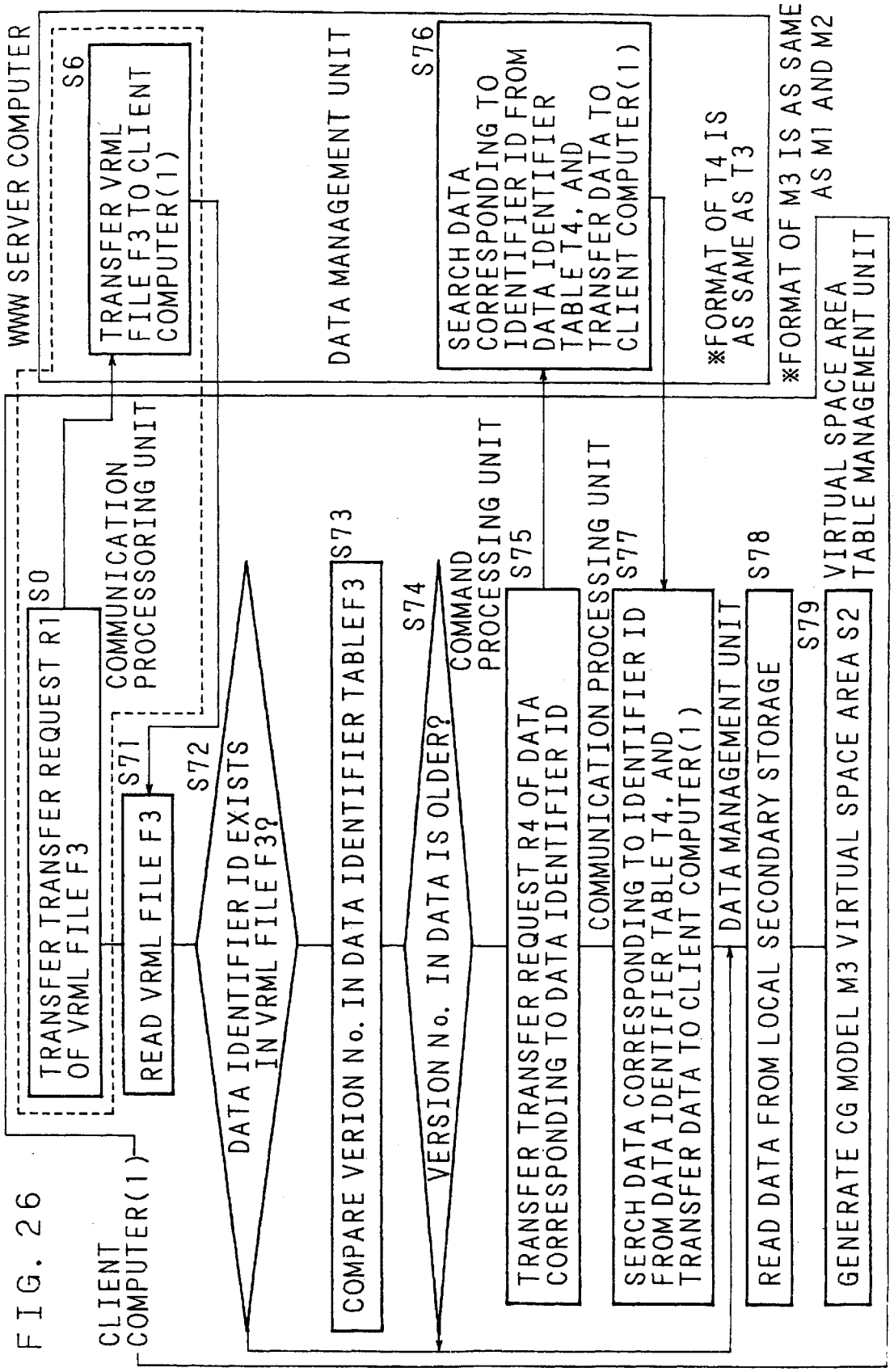
FIG. 26 is a diagram showing other processing procedure for creating CG data expressing virtual space on the basis of VRML file supplied from data management computer and CG data possessed by client computer, in client computer.

In FIG. 26, a transfer request R1 of VRML file F3 defining the virtual space area is sent from the communication processing unit 11 of the client computer 10 to the management computer 200 (step S0). Receiving this transfer request R1 from the client computer 10, the data management computer 200 executes the processing according to the procedure shown in FIG. 9, and transfers the VRML file F3 of this transfer request R1 to the client computer 10 which has issued the transfer request R1 (step S6).

The communication processing unit 11 of the client computer 10 receives the VRML file F3 from the data management computer 200, and the command processing unit 12 reads the received VRML file F3 (step S71). When a data identifier is detected in the VRML file F3 (step S72), the version number of the data identified by the data identifier written in the VRML file F3 and the version number of the corresponding data shown in the data identifier table T3 of the client computer 10 are compared with each other (step S73).

The version number is incremented every time the data is updated in the client computer 10 or data management computer 200. When the data is updated in the client computer, the version number of the data identifiers table T3 of the client computer is updated. This updating is notified to the data management computer 200. On the other hand, when the data is updated in the data management computer 200, or updating of data is notified to the client computer or data management computer 200, the version number of the data identifier table T4 of the data management computer 200 is updated.

The data identifier tables T3 and T4 of each client computer 10 and data management computer 200 are, for example, as shown in FIG. 27. That is, the identifier (TEXTURE-ID), storing address (/DATA/TEXTURE,RGB) of data identified by the identifier, and the version number (1) of the data identified by the identifier are described.

In this case, when the version number written in the data identifier table T3 of the client computer 10 is found to be smaller than the version number of the data written in the VRML file F3 (the data of the client computer 10 is older) (step S74), by the request from the command processing unit 12, the communication processing unit 11 sends a transfer request R4 of data identified by the data identifier ID written in the VRML file F3 to the data management computer 200 (step S75).

When the data management computer 200 receives the abovementioned transfer request R4 from the client computer 10, the data corresponding to the identifier included in the transfer request R4 is read out from the secondary storage 201 by referring to the data identifier table T4. The read data (which should be the latest version) and its latest version number are transferred from the data management computer 200 to the client computer 10 which has issued the transfer request R4 (step S76).

When the communication processing unit 11 of the client computer 10 receives the data identified by the data identifier ID and its version number from the data management computer 200, the command processing unit 12 updates the version number of the data identified by the data identifier ID in the data identifier table T3 to the received latest version number (step S77). The received data is stored (downloaded) in the secondary storage 20. Thereafter the data management unit 13 reads out the data (CG data) identified by the data identifier ID from the secondary storage 20 by referring to the data identifier table T3 (step S78). The virtual space area management unit 15 generates a CG model M3 expressing the virtual space area S2 on the basis of the received VRML file F3 and CG data read out from the secondary storage 20. The CG image of the virtual space area S2 corresponding to the CG model M3 is displayed in the display unit 40 of the client computer 10.

Figure 28:
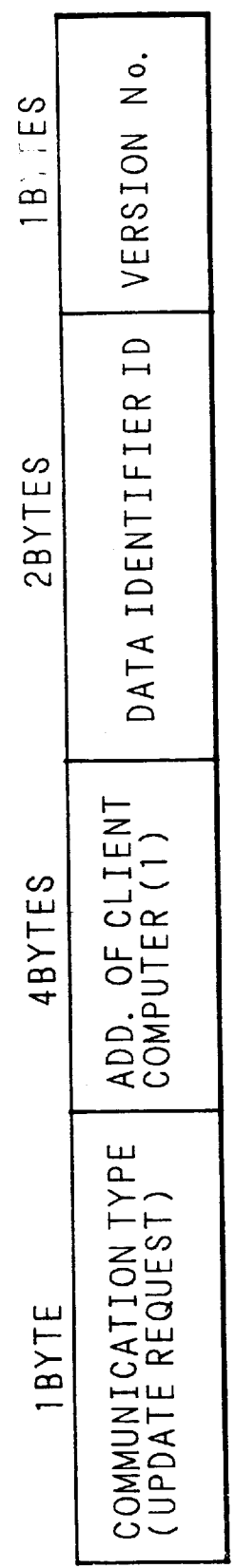
FIG. 28 is a diagram showing a data structure example of transfer request issued from a client computer in the processing shown in FIG. 26.

The format of the transfer request R4 is, for example, as shown in FIG. 28. In FIG. 28, there is a series concatenated structure of communication type data (1 byte) showing the transfer request, address (4 bytes) for identifying the client computer issuing the transfer request, identifier ID (2 bytes) of data of the transfer request, and version number (1 byte) of the data of the transfer request.

The VRML file including the identifier for identifying such data as mentioned above and version number of the data is described, for example, as follows.

|  | SEPARATOR { | |
|---|---|---|
|  | PERSPECTIVECAMERA { | |
| (Viewpoint → information) → | POSITION | 0 10 50 |
|  | ORIENTATION | 0 0 1 0 |
| (Clipping → information) → | NEARDISTANCE | 10 |
|  | FARDISTANCE | 100 |
|  | } | |
|  | } | |
|  | SEPARATOR { | |
| (Color → information) | MATERIAL | {DIFFUSECOLOR 0.5 0.7 0.3} |
| (Shape → information) | CUBE | {WIDTH 100 HEIGHT 30 DEPTH 40} |
| (Texture → information) | TEXTURE2 TEXTURE-ID:1 {FILENAME "FILE://DATA TEXTURE. RGB"} | |
|  | (Texture ID and version number) | |

In this way, by managing the updating state of the data by the version number, when the data identified by the identifier ID is updated by other client computer or data management computer, the CG image expressing the virtual space can be generated by always using the latest data.

[Second embodiment of virtual space communication system of the invention]

Figure 29:
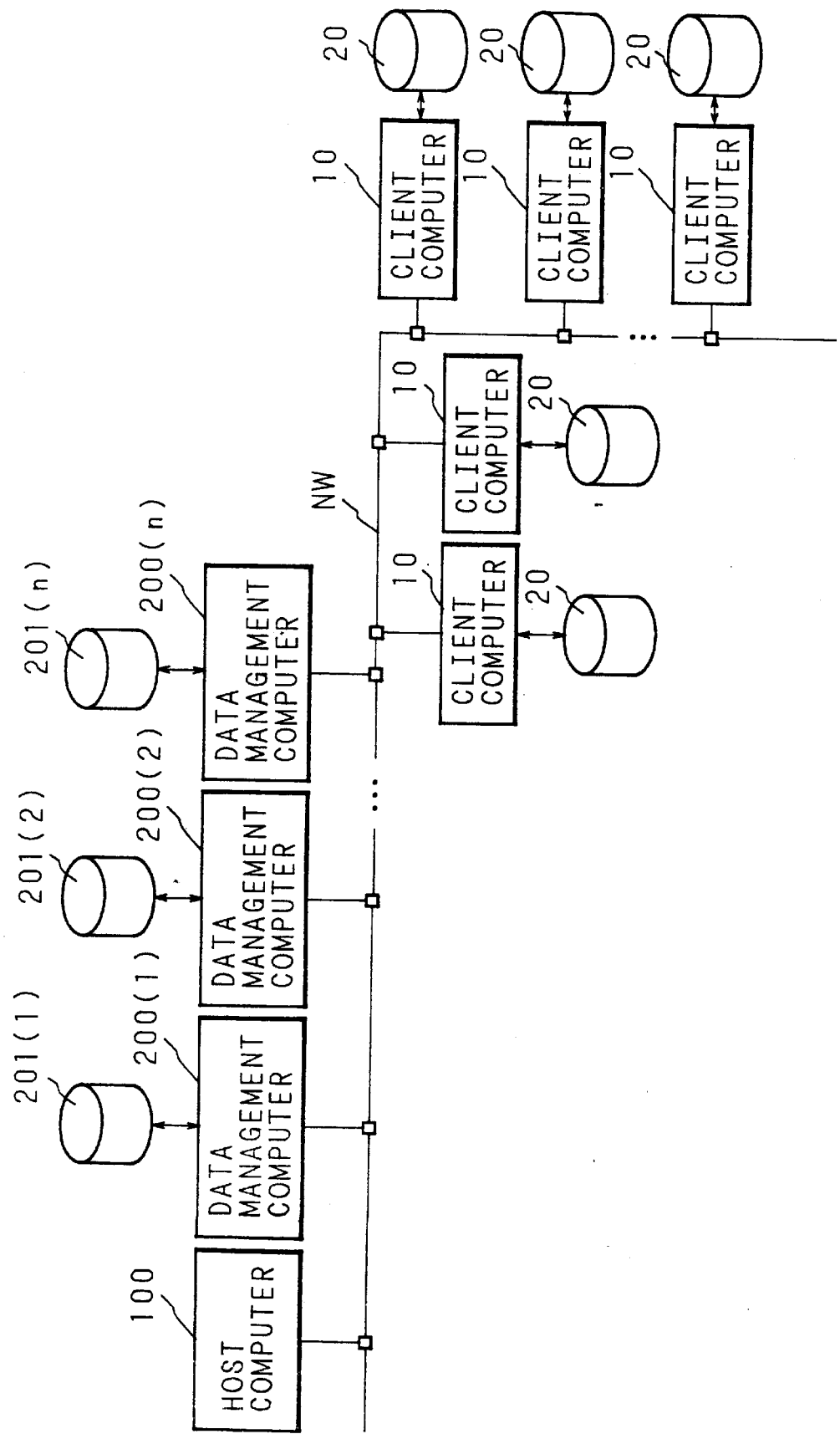
FIG. 29 is a block diagram showing a basic configuration example of other embodiment of virtual space communication system of the invention.

In the first embodiment of the virtual space communication system of the invention described above, the data management computer 200 managing the CG data expressing the virtual space is only one in the network NW (see FIG. 4), but, as shown in FIG. 29, plural data management computers 200 (1), 200 (2), . . . , 200 (n) can be provided in the network NW. In this case, there are plural providers of virtual space (operators of data management computers), so that virtual spaces full of variety can be provided to each client computer.

According to the virtual space communication system of the invention described herein, since the data expressing the virtual space and the property data of the object are managed by distributing them into first and second management computers, so that concentration of management processing on a specific computer can be avoided.

Also according to the virtual space communication system of the invention, the data expressing the virtual space managed by the first management computer can be updated from each client computer, and the virtual space shared by the client computers can be extended or switched flexibly.

Next, the three-dimensional image display method and apparatus therefor of the invention are described below by referring to the drawings showing embodiments.

[First embodiment of three-dimensional image display method and apparatus therefor of the invention]

In the first embodiment of three-dimensional image display method and apparatus therefor of the invention, in short, the distance between a walking-through viewpoint position and a movable place to other space (for example, door, hereinafter called entrance) is always calculated, and when the distance becomes less than a predetermined value, reading of data in the space connected to the entrance from the database (hereinafter called predictive reading) starts.

This predictive reading processing is executed simultaneously in other processing than various processes necessary for processing for updating displaying state due to move of the viewpoint by walk-through (hereinafter called viewpoint moving process). Therefore, viewpoint moving process is done also during execution of predictive reading.

Figure 32:
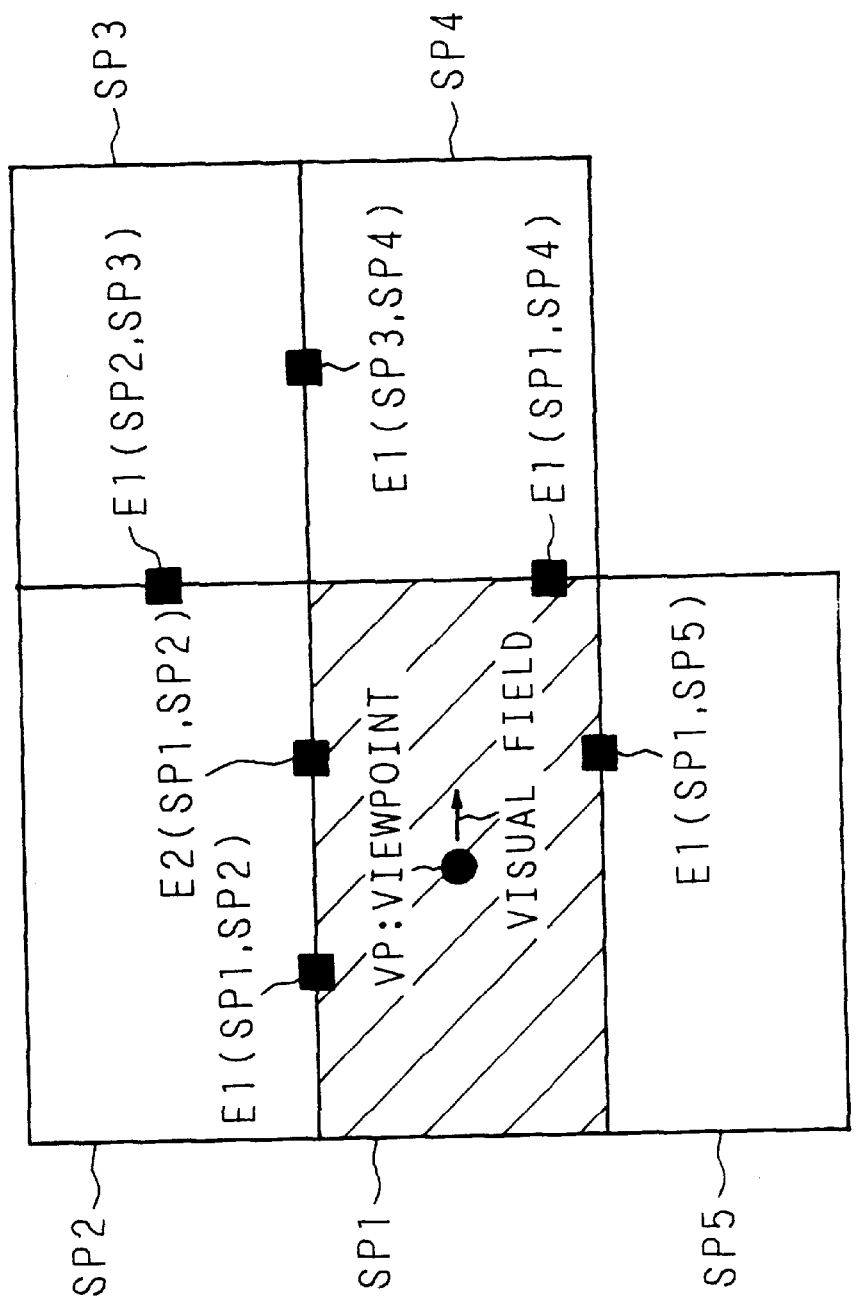
FIG. 32 is a schematic diagram showing an example of space handled by a three-dimensional image display method and apparatus therefor of the invention.

FIG. 32 is a schematic diagram showing an example of space handled by the three-dimensional image display method and apparatus therefor of the invention, in which a first space SP1 to a fifth space SP5 are present, and each one has a connection point (entrance) with at least one other space. As shown in FIG. 32, the space in which the viewpoint VP is currently located is supposed to be first space SP1, and other spaces connecting with the first space SP1 directly or indirectly are second space SP2, third space SP3, and so forth, and each entrance is described as Ek (SPi, SPj). In SPi and SPj, the space names that can be moved directly through the entrance are described, and when there are plural entrances in which SPi and SPj are identical, they are distinguished by subscript k of 2 or more. Incidentally, the current viewpoint is located in the first space SP1, and hence SPi=SP1.

Moreover, the current time is supposed to be t and the current viewpoint position is e(t). The distance between the current position e(t) of the viewpoint VP and the space in which the viewpoint VP is located currently, that is, all entrance Ek (SP1, SPj) included in the first space SP1 is calculated at predetermined time intervals, and predictive reading of data in the space is started in the space SPj where the value of the distance becomes smaller than the predetermined threshold.

When, however, the viewpoint VP is later departed from the space SPj, in other words, the distance between the viewpoint VP and the entrance Ek (SP1, SPj) becomes larger than the threshold, predictive reading of data about the space SPj is interrupted.

By such processing, when the viewpoint VP approaches a certain entrance, predictive reading of data in other space connected through the entrance is started. This makes use of the benefit that the space to which of the viewpoint VP moves next can be predicted to a certain extent on the basis of the information of approaching the entrance, and as the predictive reading of data in the space is started from the moment when the viewpoint VP approaches the entrance connected with other space, the waiting time for switching the screen when the viewpoint VP actually enters into the space can be shortened.

Figure 3:
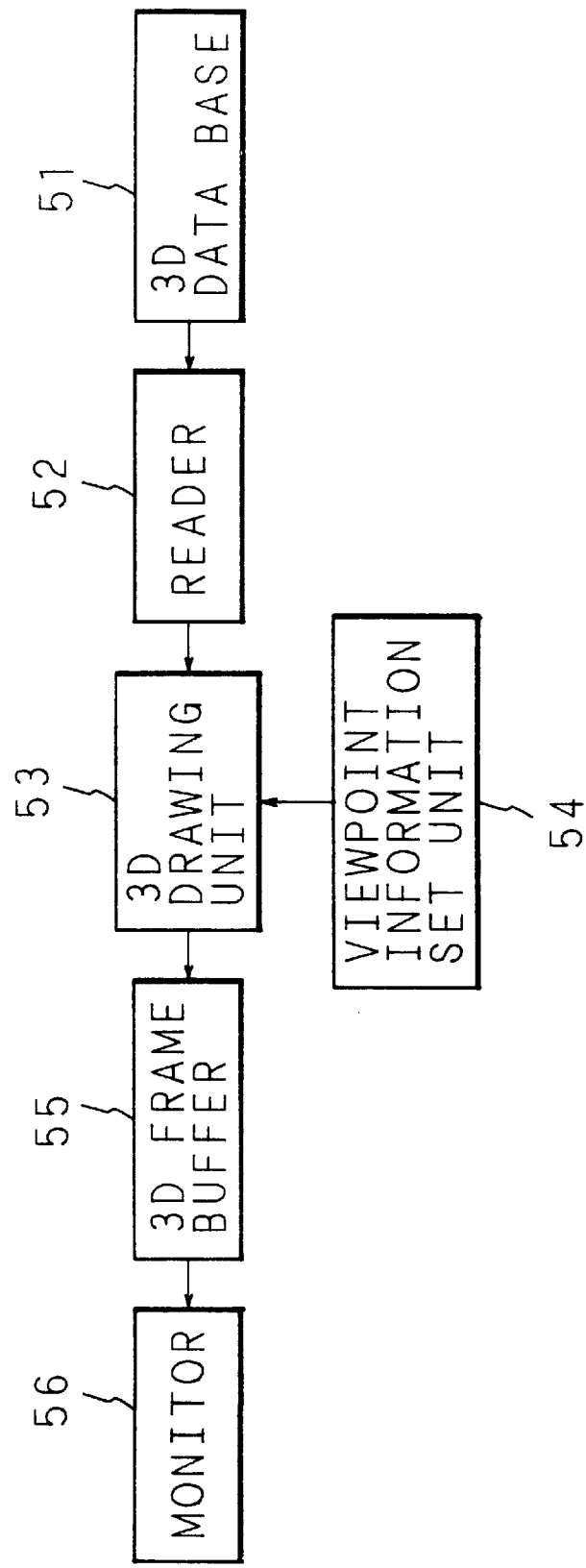
FIG. 3 is a block diagram showing a conventional system configuration example.
Figure 30:
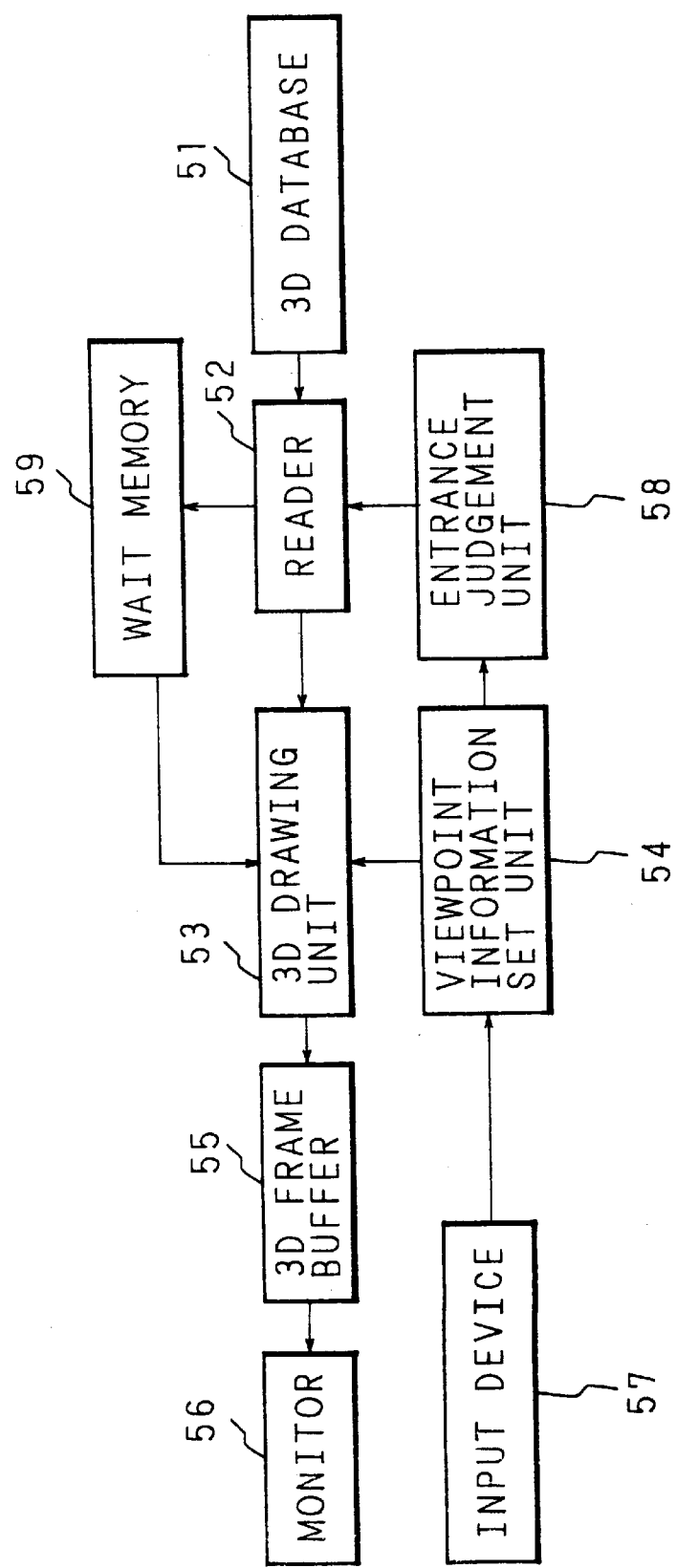
FIG. 30 is a block diagram showing a system configuration example of first embodiment and second embodiment of three-dimensional image display apparatus of the invention.
Figure 31:
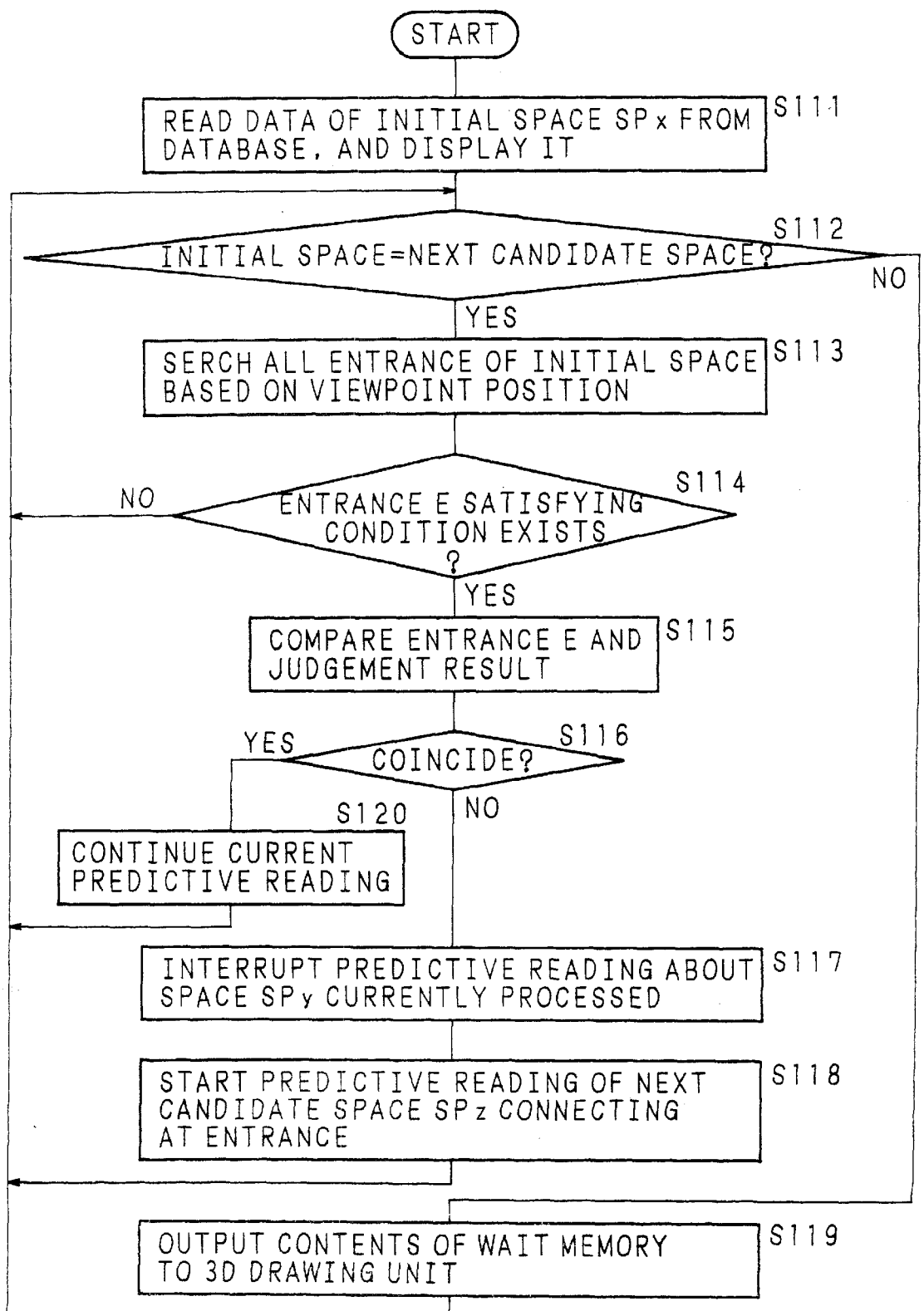
FIG. 31 is a flowchart showing predictive reading procedure of three-dimensional image display method and apparatus therefor of the invention.

The detail is described below by referring to the block diagram showing a system configuration example of the three-dimensional image display device of the invention in FIG. 30, a flowchart showing the procedure of predictive reading of the invention in FIG. 31, and the abovementioned schematic diagram in FIG. 32. In FIG. 30, same reference numerals as in FIG. 3 showing the prior art represent same or corresponding parts.

In FIG. 30, reference numeral 51 denotes a three-dimensional database (3 D database hereinafter) functioning as storing means, in which geometrical model data of solid model constructing a three-dimensional space (3 D object hereinafter) is stored. However, as shown in the schematic diagram in FIG. 32, when the three-dimensional space is divided into plural sections (in the example in FIG. 32, divided into five spaces from first space SP1 to fifth space SP5), the data of 3 D object in each one of spaces SP1, SP2, . . . is managed as one data group.

The 3 D database 51 in the three-dimensional image display apparatus of the invention corresponds to the data management computer 200 in the virtual space communication system of the invention, and, for example, the WWW (World Wide Web) server computer is used. In the three-dimensional image display method and apparatus therefor of the invention, too, as the format of the data defining each object constructing the virtual space, for example, VRML (Virtual Reality Modeling Language) is used.

Reference numeral 52 is a reader functioning as reading means, functioning as three-dimensional drawing means, for reading out data in one space unit from the 3 D database 51, and transferring to a 3 D drawing unit 53. The reader 52, aside from reading out the data about the space in which the viewpoint VP is currently located from the 3 D database 51 and giving it to the 3 D drawing unit 53 in the same way as in the prior art, further reads out the data in other space different from the space in which the viewpoint VP is currently located, from the 3 D database 51 and gives it to a wait memory 59 described below, according to the instruction given from an entrance judgment unit 58 described later. These two processes can be executed parallel.

In the 3 D drawing unit 53, on the basis of the data read out by the reader 52, and according to the viewpoint information given from a viewpoint information set unit 54, that is, the information showing from which position one is seeing, three-dimensional graphics calculations, that is, geometrical calculation, color calculation and others are done on each object, and the results are written into a 3 D frame buffer 55 functioning as three-dimensional image storing means.

By repeating the operation of drawing individual objects in the 3 D frame buffer 55, one three-dimensional image is completed on the 3 D frame buffer 55, and is displayed on a monitor 56 functioning as displaying means.

In the viewpoint information set unit 54, information showing the current viewpoint position is given from an input device 57 as inputting means. The input device 57 is given, for example, the position information of the pointer on the screen of the monitor 56, or the position information obtained from the so-called head mounting display, and the viewpoint information set unit 54 sets the viewpoint information according to such information, that is, the current viewpoint position, orientation of sight line, and others in the 3 D drawing unit 53.

The viewpoint position information inputted from the input device 57 into the viewpoint information set unit 54 is given to the 3 D drawing unit 53 as information of the current viewpoint position, and is also fed to the entrance judgment unit 58 functioning as predicting means. The entrance judgment unit 58 generates, as described above, information showing which entrance is closest from the current viewpoint position, that is, to which space the viewpoint VP is most likely to move next, and gives it to the reader 52. As a result, in the same way as mentioned above, the reader 52 gives the data of the space in which the viewpoint VP is located currently to the 3 D drawing unit 53 by reading out it from the 3 D database 51, and simultaneously reads out the data of the space to which the viewpoint VP is judged to be most likely to move next (hereinafter called next candidate space) from the 3 D database 51, and gives it to the wait memory 59 functioning as temporary storing means, thereby starting the process of predictive reading.

Meanwhile, the data given to the wait memory 59 is held temporarily, and is given to the 3 D drawing unit 53 when the viewpoint actually moves to the space (next candidate space). Later, however, when the distance between the entrance and the viewpoint VP becomes more than the predetermined value, in other words, when the next candidate space disappears, the process of predictive reading is interrupted. Or when the next candidate space is switched to other space, predictive reading is executed on the new next candidate space.

The actual processing procedure is described below while referring to the flowchart in FIG. 31 and the schematic diagram in FIG. 32. In addition, FIG. 33 is a schematic diagram showing the construction of the table in which the information of the entrance for mutually connecting the spaces is registered.

Suppose, preliminarily, that data of solid models in the unit of spaces SP1, SP2, . . . are stored together in the 3 D database 51, and that the information about entrance mutually connecting the spaces SP1, SP2, . . . are registered as table as shown in FIG. 33.

At first, in the same way as in the prior art, the data of the space in which the viewpoint VP is currently located (hereinafter call initial space SPx, and first space SP1 in this example) is read out from the 3 D database 51 by the reader 52, and is displayed on the screen of the monitor 56 (step S111). The entrance judgment unit 58 judges whether the current viewpoint position is the next candidate space SPy or not from the viewpoint position information given from the viewpoint information set unit 54 (step S112). Note that the next candidate space SPy is the space to which the viewpoint VP is most likely to move next as discussed later.

When the both coincide with each other at step S112, the process jumps to step S119 mentioned below. When both do not coincide with each other, the entrance judgment unit 58 searches all entrances included in the initial space SPx (the first space SP1 has four entrances E1 (SP1, SP2), E2 (SP1, SP2), E1 (SP1, SP5), E1 (SP1, SP4)) sequentially according to the current location of the viewpoint VP. The distance between the current position e(t) of the viewpoint VP and the position of each entrance of the initial space SPx (first space SP1) is calculated in the entrance judgment unit 58, and whether it is lower than the threshold or not is judged (step S114).

More specifically, as shown in FIG. 33, since position coordinates of entrances are preliminarily registered in the table, and the entrance judgment unit 58 calculates the Euclidean distance between the coordinate values and the current position e(t) of the viewpoint VP, and searches an entrance smaller than the predetermined threshold, and picks up the entrance of the smallest value when a plurality are found. As a processing result at this step S114, when there is not entrance satisfying the condition, the process is set back to step S112. When an entrance satisfying the condition is found, the entrance is compared with the entrance of the result of the previous judgment (step S115). When both coincide with each other, the current predictive reading continues (step S120), and then the process is put back to step S112. When both do not coincide with each other, it means that the next candidate space is switched, and the predictive reading about the next candidate space SPy (second space SP2) being read predictively so far is stopped (step S117), and predictive reading of a new next candidate space SPz to be connected with the initial space SPx at entrance E is started (step S118). Thereafter, the process returns to step S111.

When the initial space and next candidate space coincide with each other at step S112, it means that the viewpoint VP has moved to the next candidate space, and therefore the content of the wait memory 59 is given to the viewpoint information set unit 54, and is drawn in the 3 D frame buffer 55 (step S119). As a result, the image of the next candidate space can be promptly displayed on the screen of the monitor 56 relatively.

As the processing procedure of predictive reading after step S111 is repeated at predetermined time interval, in the first embodiment of the three-dimensional image display method and apparatus therefor of the invention, since the data of the space to which the viewpoint position is most likely to move next (next candidate space) is preliminarily read out from the 3 D database 51 by the reader 52 and is stored in the wait memory 59, when the viewpoint actually moves to other space, the data of the space can be drawn in the 3 D frame buffer 55 from the wait memory 59 faster than drawing in the 3 D frame buffer 55 by reading out it from the 3 D database 51.

[Second embodiment of three-dimensional image display method and apparatus therefor of the invention]

A second embodiment of the three-dimensional image display method and apparatus therefor of the invention is described below, and the basic system configuration is same as in the first embodiment of the three-dimensional image display method and apparatus therefor of the invention shown in FIG. 30, and only the method of predicting and judging the next candidate space by the entrance judgment unit 58 differs.

In the second embodiment of the three-dimensional image display method and apparatus therefor of the invention, the space to which the viewpoint moves, that is, the next candidate space is predicted in consideration of not only the current position e(t) of the viewpoint, but also the information about orientation of visual field. In the same way as in the first embodiment, when reading of data from the 3 D database 51 is started from a certain moment, reading of data from the 3 D database 51 is interrupted when the position of the entrance disappears from the visual field on a later moment.

Figure 34:
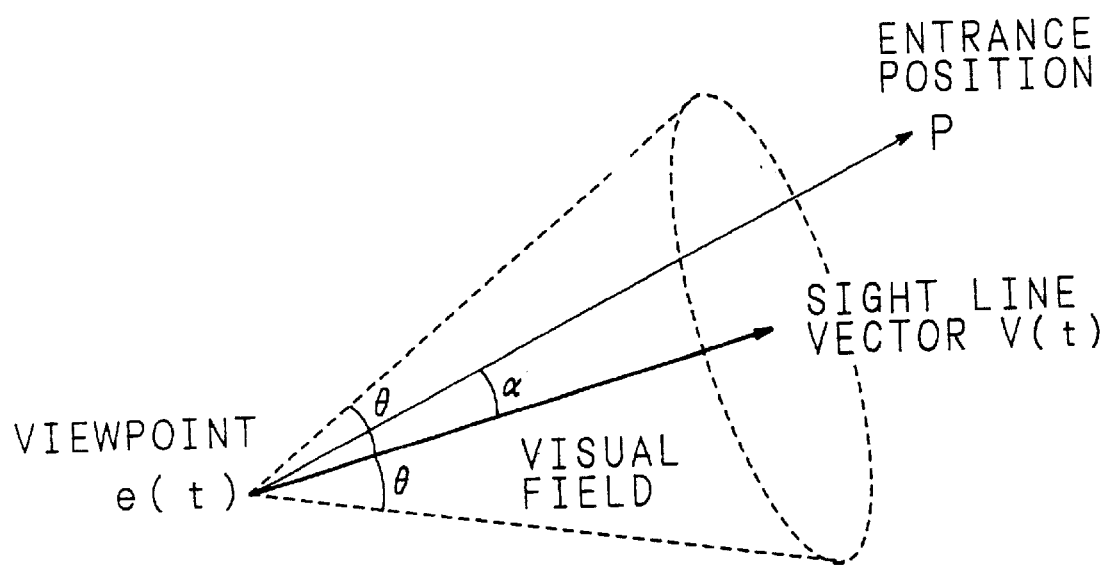
FIG. 34 is a schematic diagram showing a relation between sight line vector and entrance position.

In the detailed description below, since the basic processing is in the same way as in the first embodiment of the three-dimensional image display method and apparatus therefor, only the judging method by the entrance judgment unit 58 is described below by referring to the schematic diagram in FIG. 34 showing the relation between the sight line vector and entrance position.

In the entrance judgment unit 58, assuming a conical visual field set at an angle width θ with the sight line orientation as the central axis, it is judged whether an entrance is present within this conical visual field or not. More specifically, as shown in the schematic diagram in FIG. 34, the sight line vector passing through the current viewpoint position e(t) =(ex. ey, ez) is expressed in a three-dimensional vector of V(t).

At first, the entrance judgment unit 58 calculates to judge whether there is any entrance or not in a slender conical visual field spreading by an angle of θ to the three-dimensional vector V(t). The entrance judgment unit 58, when there is no entrance in the visual field, does not read predictively as there is no next candidate space, and when plural entrances are present in the visual field, the entrance of the smallest distance to the viewpoint VP is selected, and this entrance is read predictively.

Supposing the position coordinates of a certain entrance to be P (x, y, z), whether the entrance is present or not within the conical visual field of angle θ can be judged by checking whether the angle α of the vector linking the current position e(t) of the viewpoint and the point coordinates P and the three-dimensional vector V(t) (hereinafter V) is less than θ or not.

Herein, the angle α is determined as the outer product of the three-dimensional vector Q linking e and P and the three-dimensional vector V.

*Vector Q=vector P-vector e=(x-ex, y-ey, z-ez)* sin α=(absolute value of outer product of vector Q and vector V)/(length of vector Q)*(length of vector V)

When sin α< sin θ, then point P is present within the visual field angle.

When plural entrances satisfying these conditions are found, the one of the smallest length of vector Q is selected as the next candidate space. When this calculation is done on all entrances at step S113 in the flowchart in FIG. 32, it is possible to find an entrance existing in the visual field range of angle θ to the viewpoint position and viewpoint orientation at a certain time.

The first embodiment and second embodiment of the three-dimensional image display method and apparatus therefor of the invention are the techniques for shortening the time itself required for writing necessary data into the 3 D frame buffer 55 from the moment of judging the move of the viewpoint position from one space to other space, by predictive reading of reading the data for displaying a new space from the 3 D database 51 into the wait memory 59 preliminarily, when switching the screen when the viewpoint moves from one space to other space.

In spite of this, it takes a certain time until the image is actually displayed on the screen of the monitor 56 even when the data of the wait memory 59 is transferred to the 3 D drawing unit 53 and drawn in the 3 D frame buffer 55, and nothing is displayed on the screen in this period, or the previous displaying state or still image is kept, and the user has to wait while twirling his or her thumbs. Considering such circumstance, in the following embodiments, it is intended to eliminate the wasteful time for the user by devising the displaying state until the perfect 3 D image is displayed on the screen of the monitor 56.

[Third embodiment of three-dimensional image display method and apparatus therefor of the invention]

According to a third embodiment of the three-dimensional image display method and apparatus therefor of the invention, in short, two-dimensional image data (hereinafter called 2 D image) is prepared, and this prepared 2 D image is displayed until the 3 D image is ready to be displayed in the monitor. When the 3 D drawing is completed, it is displayed on the monitor screen.

In this case, the prepared 2 D image may be basically arbitrary. For example, a message "Wait for a while" may be used, or an interesting image for the user may be used. In particular, however, in the case where the two-dimensional image (2 D image) transformed from the 3 D image of a new space (hereinafter this image is called initial 3 D image) when the image is switched from the image in one space to the image in other space, that is, the final result of the image planned for drawing in the 3 D drawing unit 53 to be displayed next is prepared and displayed in the first place, it may be expected to have an effect of the user not knowing when 2 D image is changed to 3 D image.

In this case, it is essential that the viewpoint position information used in calculation of 3 D image should be given in advance. That is, when the viewpoint position moves from one space to other space, it is evident that the viewpoint position moves through an entrance connecting the two spaces. In this case, when the display of the initial state of the 3 D image entering a certain space through a certain entrance, that is, the initial 3 D image is designed to be started from a uniquely predetermined viewpoint position, it is easy to prepare the corresponding 2 D image.

In other example, it may be expected that the user may feel the waiting time short by displaying some information about the 3 D image to be displayed next, for example, explanation or comment by characters or graphic information, in a form of 2 D image. Similarly, by preparing music, guide voice or other data, a same effect may be expected by voice output.

Figure 35:
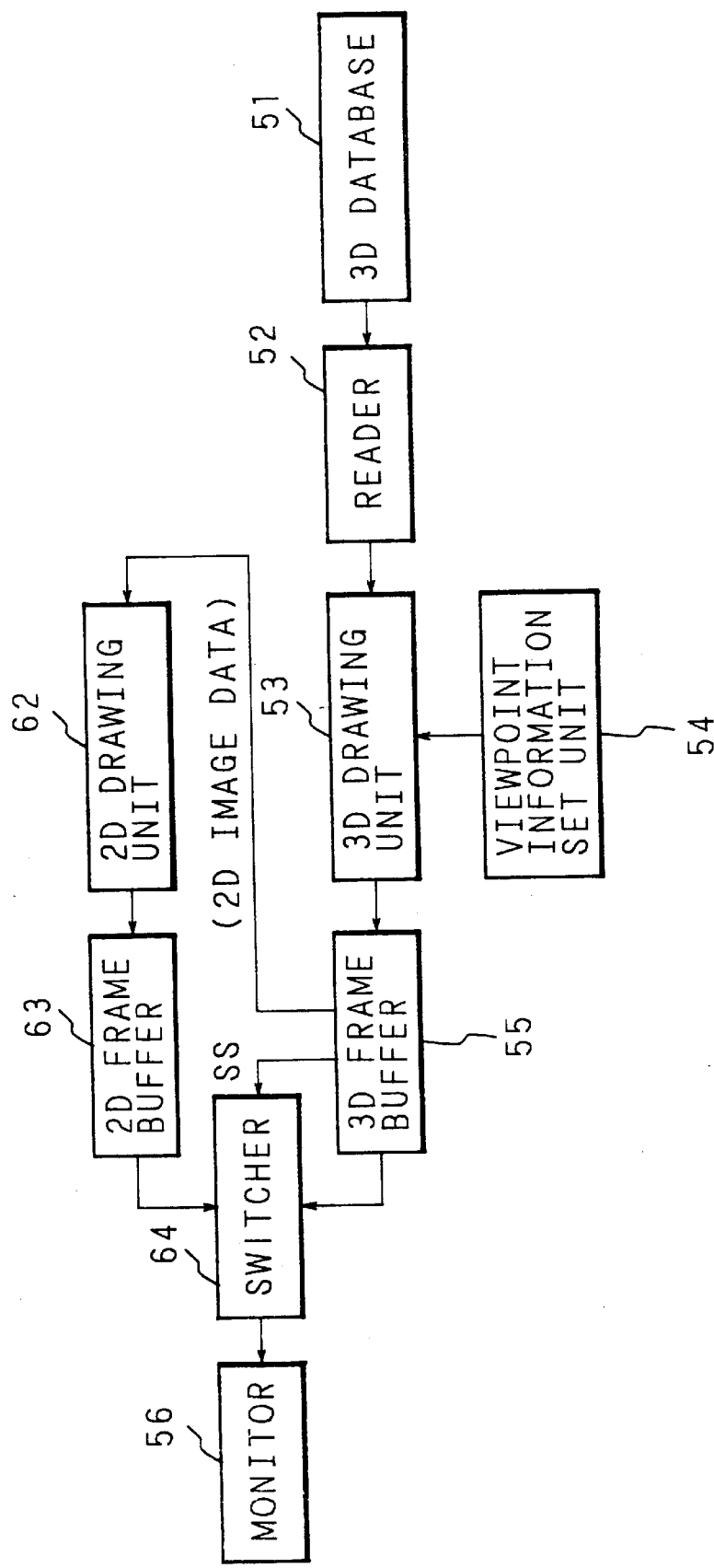
FIG. 35 is a block diagram showing a system configuration example of third embodiment of three-dimensional image display apparatus of the invention.
Figure 36A:
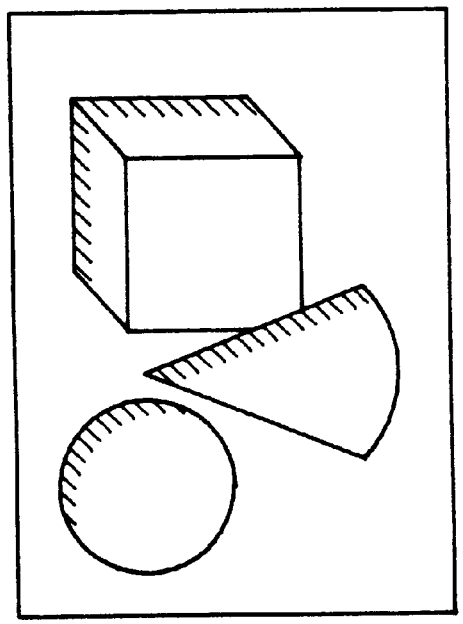
FIG. 36A and FIG. 36B are schematic diagrams of screen displaying states of the third embodiment of three-dimensional display method and apparatus therefor of the invention.
Figure 36B:
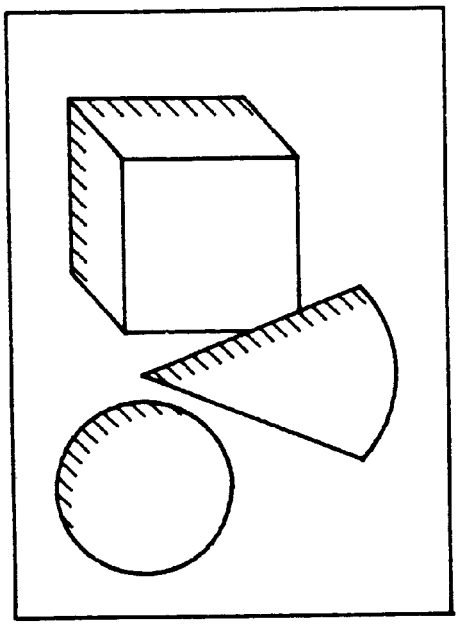

The detail is described below by reference to a block diagram in FIG. 35 showing a system configuration example of the third embodiment of the three-dimensional image display apparatus of the invention and schematic diagrams in FIG. 36A and FIG. 36B showing displaying states. In FIG. 35, same reference numerals as in FIG. 30 relating to the first embodiment of the three-dimensional image display method and apparatus therefor of the invention refer to same or corresponding parts.

In FIG. 35, reference numeral 51 denotes a three-dimensional database (3 D database), which stores data of solid matters constructing the three-dimensional space (hereinafter called objects), in the same way as in the first and second embodiments of the three-dimensional image display method and apparatus therefor of the invention, and moreover in the third embodiment, it also stores the data of 2 D image transformed two-dimensionally from the initial 3 D image of seeing each space from each entrance.

Reference numeral 52 is a reader for reading out data about the space in which the viewpoint VP is currently located from the 3 D database 51. The data read by this reader 52 from the 3 D database 51 is given to the 3 D drawing unit 53. When the space is switched, the 2 D image corresponding to the initial 3 D image is read out at first from the 3 D database 51 by the reader 52, and is transferred to a 2 D drawing unit 62 which functions as two-dimensional image drawing means.

In the 3 D drawing unit 53, on the basis of the data being read out by the reader 52, and according to the viewpoint information given from the viewpoint information set unit 54, that is, the information showing from which position one is seeing, geometrical calculation, color calculation and others are executed on each object, and the results are written in the 3 D frame buffer 55. The image written in the 3 D frame buffer 55 is sent out to a switcher 64 functioning as switching means.

The 2 D drawing unit 62 draws data of 2 D image corresponding to the initial 3 D image given when the space is switched, in a 2 D frame buffer 63 functioning as two-dimensional image storing means. The image written in the 2 D frame buffer 63 is given to the switcher 64.

To the switcher 64, a switching signal SS is given from the 3 D frame buffer 55. This switching signal SS is given to the switcher 64 when drawing of 3 D image in the 3 D frame buffer 55 is over in case of space switching, and, in response, the switcher 64 switches the output signal to the monitor 56 from the output signal of the 2 D frame buffer 63 to the output signal of the 3 D frame buffer 55.

The operation of the third embodiment of the three-dimensional image display apparatus of the invention is as follows. Suppose the viewpoint is located in a certain space, then, in the same way as in the prior art, the data read out by the reader 52 from the 3 D database 51 is drawn in the 3 D frame buffer 55 by the 3 D drawing unit 53 according to the position information given from the viewpoint information set unit 54, and the image of the space is displayed on the screen of the monitor 56. In this state, the switcher 64 is ready to put out the output signal from the 3 D frame buffer 55 to the monitor 56.

When the space is switched in this state, the data for displaying the initial 3 D image is ready out by the reader 52 from the 3 D database 51 according to the viewpoint information given from the viewpoint information set unit 54. The data for displaying the initial 3 D image contains data of 2 D image, and it is transferred to the 2 D drawing unit 62 through the 3 D frame buffer 55. According to the data of the transferred 2 D image, the 2 D drawing unit 62 first draws the 2 D image in the 2 D frame buffer 63. Besides, as the initial 3 D image begins to be supplied to the 3 D frame buffer 55, a switching signal SS is outputted, and the switcher 64 is in a state of outputting the output signal of the 2 D frame buffer 63 to the monitor 56, and the content of the 2 D frame buffer 63, that is, the 2 D image two-dimensionally transformed from the initial 3 D image is displayed on the screen of the monitor 56, as shown in FIG. 36A, as a still image.

Next, the reader 52 reads out data of one object from the top of the 3 D database 51, and transfers it to the 3 D drawing unit 53. The 3 D drawing unit 53 calculates for drawing three-dimensional image according to the viewpoint position information preset as initial state when the space is switched and the object data being read out from the 3 D database 51, and draws it in the 3 D frame buffer 55.

The reader 52, when completing reading of all data of one space from the 3 D database 51, sends a completion signal to the 3 D drawing unit 53. The 3 D drawing unit 53, when completing drawing calculation of the final object, sends a switching signal SS to the switcher 64. In response, the switcher 64 switches the output to the monitor 56 from the output signal of the 2 D frame buffer 63 to the output signal of the 3 D frame buffer 55. At this moment, the 2 D image as still image being displayed so far on the screen of the monitor 56 is switched to the initial 3 D image as shown in FIG. 36B.

In this way, according to the third embodiment of the three-dimensional image display method and apparatus therefor of the invention, when the viewpoint position is moved to other space and the space is switched, some other two-dimensional image is displayed immediately, and later when the initial 3 D image to be actually displayed is ready, the 3 D image is displayed. Therefore, the possibility of forcing the user to wait wastefully is reduced.

In particular, until the initial 3 D image is displayed, its two-dimensional image is displayed as still image, the user may not know when the 2 D image is changed to 3 D image.

To display the two-dimensional image until the initial 3 D image is displayed, it is essential that the viewpoint position information for use in calculation of 3 D image should be given in advance. That is, when the viewpoint position is changed from a certain space to other space, it is evident that the viewpoint position moves by passing through an entrance connecting the two spaces, and it is hence enough to prepare 2 D images of spaces as seen from all entrances. In this case, there is no practical problem when the central position of entrance is fixed as the viewpoint position information.

Alternatively, for example, nine images may be prepared in the combinations of the middle, right side and left side in the lateral direction of the entrance, and the middle, upper side and lower side in the vertical direction, and the data of the 2 D image drawn from the viewpoint position closes to the viewpoint information given from the viewpoint information set unit 54 may be read out from the 2 D database 61. It is also effective to set at least two viewpoint positions for the adult and the child, that is, upper and lower viewpoint positions in the middle of the lateral direction of the entrance.

[Fourth embodiment of three-dimensional image display method and apparatus therefor of the invention]

In a fourth embodiment of the three-dimensional image display method and apparatus therefor of the invention, in the same way as in the third embodiment, the 2 D image transformed two-dimensionally from the initial 3 D image is prepared, and this 2 D image (initial 3 D image) is processed by color suppression by filtering process such as "fog effect" as mentioned below. Only for the first time, the image processed by fog effect is displayed. That is, in the first display only, the 2 D image (two-dimensional image of the initial 3 D image) is displayed in color suppressed state, and thereafter the 3 D images are sequentially overwritten on the 2 D image.

In such technique, the 3 D image is displayed in the original color, and therefore the portion suppressed in color on the screen is an unprocessed 3 D image, and the portion displayed in deep color is an already processed object of 3 D drawing, which can be clearly known to the user. Hence, the user instantly understands how far the 3 D drawing is advanced.

As an actual example of fog effects, the following calculation method is considered. Suppose one pixel in the 3 D frame buffer is expressed by three primaries, red (R), green (G) and blue (B). In this case, using a constant k which is in a range of 0 or more and 1 or less, pixel values r, g, b of $r=R*k, \ g=G*k, \ b=B*k$ are obtained by calculation, and made as one pixel (r, g, b), and a simple fog effect is obtained.

Not limited to such fog effect, of course, other processing technique may be employed when the pixel values lowered from the original pixel values can be easily obtained by operation.

Figure 37:
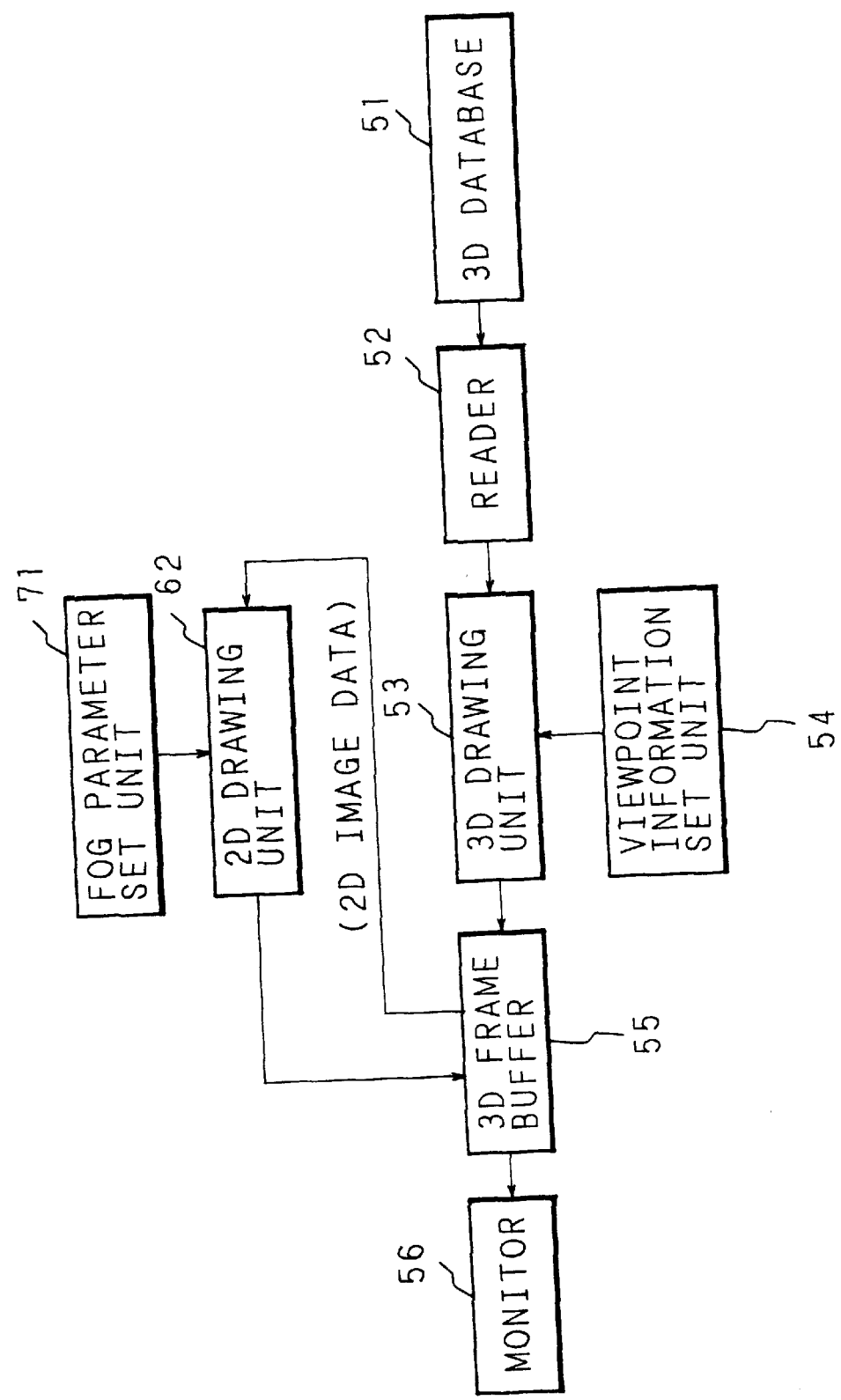
FIG. 37 is a block diagram showing a system configuration example of fourth embodiment of three-dimensional image display apparatus of the invention.
Figure 38C:
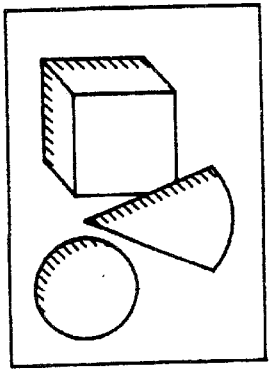
FIG. 38A, FIG. 38B and FIG. 38C are schematic diagrams of screen displaying states of the fourth embodiment of three-dimensional image display method and apparatus therefor of the invention.
Figure 38B:
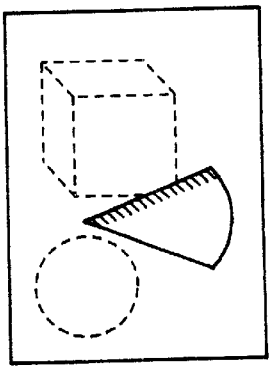
Figure 38A:
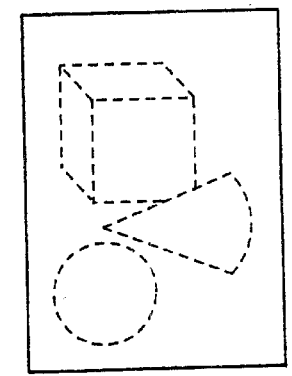

The fourth embodiment of the three-dimensional image display apparatus of the invention is concretely described below while referring to a block diagram in FIG. 37 showing a system configuration example and schematic diagrams in FIG. 38A, FIG. 38B and FIG. 38C showing the displaying states.

In FIG. 37, reference numeral 51 is a three-dimensional database (3 D database), which stores data of solid matters or objects constructing the three-dimensional space, in the same way as in the first and second embodiments of the three-dimensional image display method and apparatus therefor of the invention, and moreover in the fourth embodiment, in the same way as in the third embodiment, it also stores the data of 2 D image transformed two-dimensionally from the initial 3 D image of seeing each space from each entrance.

Reference numeral 52 is a reader for reading out data relating to the space in which the viewpoint is currently located from the 3 D database 51. The data read by this reader 52 from the 3 D database 51 is given to the 3 D drawing unit 53. When the space is switched, the data of the 2 D image corresponding to the initial 3 D image is read out from the 3 D database 51 by the reader 52, and is transferred to the 2 D drawing unit 62.

In the 3 D drawing unit 53, on the basis of the data read out by the reader 52, and according to the viewpoint information given from the viewpoint information set unit 54, that is, the information showing from which position one is seeing, geometrical calculation, color calculation and others are executed on each object, and the results are written into the 3 D frame buffer 55. The image written in the 3 D frame buffer 55 is sent and displayed in the monitor 56.

The 2 D drawing unit 62 draws the data of 2 D image corresponding to the initial 3 D image given when the space is switched in the 3 D frame buffer 55. To the 2 D drawing unit 62, a fog parameter set unit 71 functioning as filtering intensity setting means is connected. In the fog parameter set unit 71, an arbitrary fog parameter in a range of 0 or more to 1 or less can be set.

The operation of the fourth embodiment of the three-dimensional image display apparatus of the invention is as follows. Suppose the viewpoint is located in a certain space, then, in the same way as in the prior art, the data ready by the reader 52 from the 3 D database 51 is drawn by the 3 D drawing unit 53 in the 3 D frame buffer 55 according to the position information given from the viewpoint information set unit 54, and the image in the space is displayed on the screen of the monitor 56.

When the space is switched in such state, the data for displaying the initial 3 D image is read out by the reader 52 from the 3 D database 51 according to the viewpoint information given from the viewpoint information set unit 54. The data for displaying the initial 3 D image includes data of 2 D image, and it is transferred to the 2 D drawing unit 62 through the 3 D frame buffer 55.

As mentioned above, meanwhile, a parameter for fog effect, that is, fog parameter k ($0 \leq k < 1$) is preset in the fog parameter set unit 71. The 2 D drawing unit 62 multiples each pixel value (R, G, B) of the 2 D image by the fog parameter k set in the fog parameter set unit 71 to obtain new pixel values (r, g, b), and writes the result into the 3 D frame buffer 55. The image written in the 3 D frame buffer 55 is displayed on the screen of the monitor 56. This displaying state is shown in FIG. 38A. Herein, the 2 D image suppressed in color corresponding to the fog parameter k set in the fog parameter set unit 71 is displayed.

Consequently, the reader 52 reads out the data of one object from the top of the 3 D database 51, and transfers it to the 3 D drawing unit 53. The 3 D drawing unit 53 calculates for drawing three-dimensional image on the basis of the viewpoint position information preset as initial state, when the space is switched, and the object data being read out from the 3 D database 51, and draws it in the 3 D frame buffer 55. In this way, when drawing of one object in the 3 D frame buffer 55 is completed, as shown in FIG. 38B, only the image of that object is clearly displayed on the screen of the monitor 56.

Thereafter, similarly, the reader 52 reads out data of other objects sequentially from the 3 D database 51, and draws into the 3 D frame buffer 55, and soon reading of all data of one space and drawing into the 3 D frame buffer 55 are completed. In this state, as shown in FIG. 38C, a clear initial 3 D image is displayed on the screen of the monitor 56.

Thus, according to the fourth embodiment of the three-dimensional image display method and apparatus therefor of the invention, when the viewpoint position is moved to other space and the space is switched, until the initial 3 D image is displayed, its two-dimensional image in the same way as in the third embodiment is further suppressed in color by fog parameter and is displayed, and then the actually displayed initial 3 D image is sequentially superposed and displayed. Therefore the user easily knows how far the drawing of 3 D image is progressed.

[Fifth embodiment of three-dimensional image display method and apparatus therefor of the invention]

A fifth embodiment of the three-dimensional image display method and apparatus therefor of the invention is described below, and in the fifth embodiment, the data being read out from the database is processed by filtering process (for example, fog effect) for suppressing color in the same way as in the fourth embodiment, and is put back to the 3 D frame buffer 55 and displayed on the screen. At this time, at a certain predetermined time interval, or along with the step of object drawing in the 3 D drawing unit 53, such process as mentioned above is repeated. At the same time, as the number of times of color suppressing process advances, the fog parameter is increased from 0 or nearly 0 stepwisely to nearly 1, and when the 3 D drawing is completed, no color suppression is made, that is, the fog parameter is set to 1. In other words, the fog parameter k is controlled to be 0 initially, increasing in gradual steps as the processing is advanced, and to be 1 finally.

According to the fifth embodiment of the three-dimensional image display method and apparatus therefor of the invention, the color of display of the 3 D drawing result is initially pale, and as the 3 D drawing is advanced, the color becomes deep. By this screen effect, the user intuitively knows how far the 3 D drawing is advanced.

Figure 39:
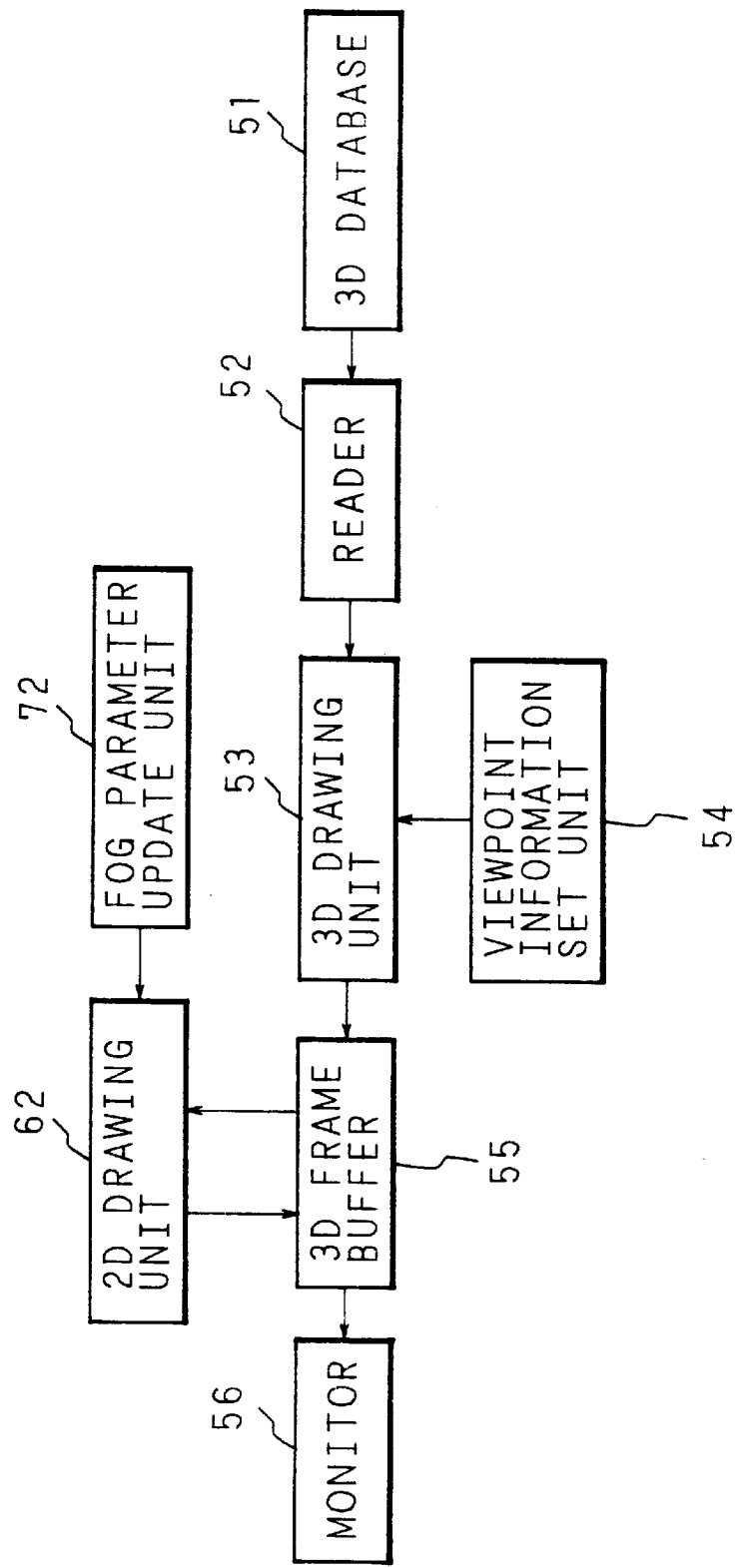
FIG. 39 is a block diagram showing a system configuration example of fifth embodiment of three-dimensional image display apparatus of the invention.
Figure 40C:
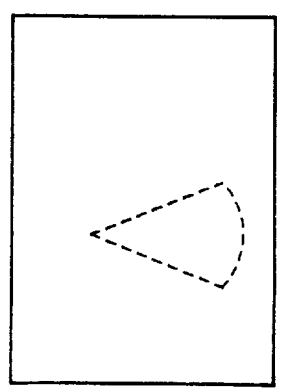
FIG. 40A, FIG. 40B, and FIG. 40C are schematic diagrams of screen displaying states of the fifth embodiment of three-dimensional image display method and apparatus therefor of the invention.
Figure 40B:
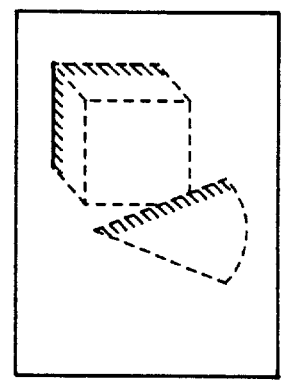
Figure 40A:
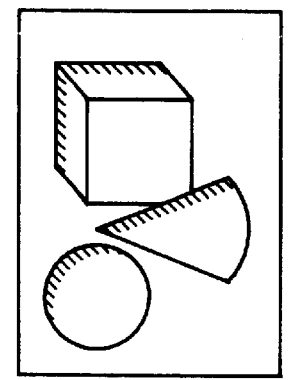

The fifth embodiment of the three-dimensional image display apparatus of the invention is concretely described below while referring to a block diagram of FIG. 39 showing a system configuration example and schematic diagrams in FIG. 40A, FIG. 40B and FIG. 40C showing the displaying states.

In FIG. 39, reference numeral 51 is a three-dimensional database (3 D database), which stores data of solid matters or objects constructing the three-dimensional space, in the same way as in the first and second embodiments of the three-dimensional image display method and apparatus therefor of the invention.

Reference numeral 52 is a reader for reading out data relating to the space in which the viewpoint is currently located from the 3D database 51. The data read by this reader 52 from the 3D database 51 is given to the 3 D drawing unit 53.

In the 3 D drawing unit 53, on the basis of the data read out by the reader 52, and according to the viewpoint information given from the viewpoint information set unit 54, that is, the information showing from which position one is seeing, geometrical calculation, color calculation and others are operated on each object, and the results are written into the 3 D frame buffer 55. The image written in the 3 D frame buffer 55 is temporarily transferred to the 2 D drawing unit 62.

The 2 D drawing unit 62 is connected with a fog parameter update unit 72 functioning as filtering intensity updating means. The 2 D drawing unit 62 suppresses the color of the image drawn in the 3 D frame buffer 55 according to the fog parameter set at that moment in the fog parameter update unit 72, and draws the result again in the 3 D frame buffer 55. The fog parameter update unit 72 updates the fog parameter k in gradually steps in a range from 0 to 1.

The operation of the fifth embodiment of the three-dimensional image display apparatus of the invention is as follows. Suppose the viewpoint is located in a certain space, then, in the same way as in the prior art, the data read by the reader 52 from the 3 D database 51 is drawn by the 3 D drawing unit 53 in the 3 D frame buffet 55 according to the position information given from the viewpoint information set unit 54, and the image in the space is displayed on the screen of the monitor 56.

When the space is switched in such state, the data for displaying the initial 3 D image is read out by the reader 52 from the 3 D database 51 according to the viewpoint information given from the viewpoint information set unit 54, and is drawn in the 3 D frame buffer 55 by the viewpoint information set unit 54, while the result is transferred to the 2 D drawing unit 62. More specifically, the reader 52 reads out the data of one object from the beginning of the 3 D database 51, and transfers it to the 3 D drawing unit 53. The 3 D drawing unit 53 calculates for drawing three-dimensional image on the basis of the view-point position information preset as initial state when the space is switched, and the object data being read out from the 3 D database 51, and draws it in the 3 D frame buffer 55.

The 3 D image drawn in the 3 D frame buffer 53 is transferred to the 2 D drawing unit 62 at a predetermined time interval, or every time one object is drawn in the 3 D frame buffer 55. For example, suppose the data on the 3 D frame buffer 53 is transferred to the 2 D drawing unit 62 according to the number of objects already drawn in the 3 D frame buffer 55.

To the 2 D drawing unit 62, the fog parameter update unit 72 is connected, and this fog parameter update unit 72 sequentially updates the fog parameter k as follows. That is suppose the fog parameter k initially set in the fog parameter update unit 72 to be k0. Further supposing the update constant to be d (herein set at d=(1−k0)/N), the fog parameter k is updated as follows every time the result is transferred to the 2 D drawing unit 62 by drawing and processing one object by the 3 D drawing unit 53.

$$k = k - d$$

By thus updating the fog parameter, starting initially from k=k0, when all objects are processed, k=1 is obtained. The fog effect is expressed by using this fog parameter k. More specifically, when the 3 D drawing unit 53 draws and processes one object, the 2 D drawing unit 62 temporarily reads out the content of the 3 D frame buffer 55 at this moment as the update timing, and multiplies the pixel values of the image (R, G, B) by the fog parameter k updated by the fog parameter update unit 72 to convert into pixel values (r, g, b), which are written back into the 3 D frame buffer 55.

In this way, when drawing of the first object into the 3 D frame buffer 55 is complete, as shown in FIG. 40A, only the image of the first object is displayed on the screen of the monitor 56 with a color suppressed fog effect.

Thereafter, similarly, the reader 52 reads the data of other objects sequentially from the 3 D database 51, and draws into the 3 D frame buffer 55, and when drawing of next object in the 3 D frame buffer 66 is over, as shown in FIG. 40B, the images of the first object and next object are displayed on the screen of the monitor 56 with a color suppressed fog effect, however, in a deeper color than the display of the first object only.

Soon reading of all data of one space and drawing into 3 D frame buffer 55 will be complete. In this state, as shown in FIG. 40C, a clear initial 3 D image is displayed on the screen of the monitor 56.

Thus, according to the fifth embodiment of the three-dimensional image display method and apparatus therefor of the invention, when the viewpoint position is moved to other space and the space is switched, until the initial 3 D image is displayed in a complete state, the display changes stepwisely from the color suppressed state by fog parameter to the complete state every time each object is displayed. Hence, the user visually sees how far the 3 D drawing is progressed.

[Sixth embodiment of three-dimensional image display method and apparatus therefor of the invention]

In a sixth embodiment of the three-dimensional image display method and apparatus therefor of the invention, by manipulating the database storing 3 D objects, the objects can be read out in an optimum sequence.

Generally, when drawing a three-dimensional image, it looks natural when displayed to be seen sequentially from an object near to the viewpoint to an object far from the view-point. In the sixth embodiment, therefore, in principle, the distance between the viewpoint and each object is calculated in advance, and each object is drawn three-dimensionally sequentially from the one nearer to the view-point. Of course, depending on the circumstances for example, in order to obtain a special screen effect, it may be also possible to draw the objects three-dimensionally from the one remotest from the viewpoint.

More specifically, according to the viewpoint position information, the distance between each object in the database and the viewpoint position is calculated, and on the basis of the result of sorting in the ascending order (or descending order), the sequence of object data in the database is updated, or a sequence flag is set up. When the 3 D data is read out from the 3 D database, the data is read out sequentially from the beginning of the database or from the smaller sequence flag, and drawn three-dimensionally.

Figure 41:
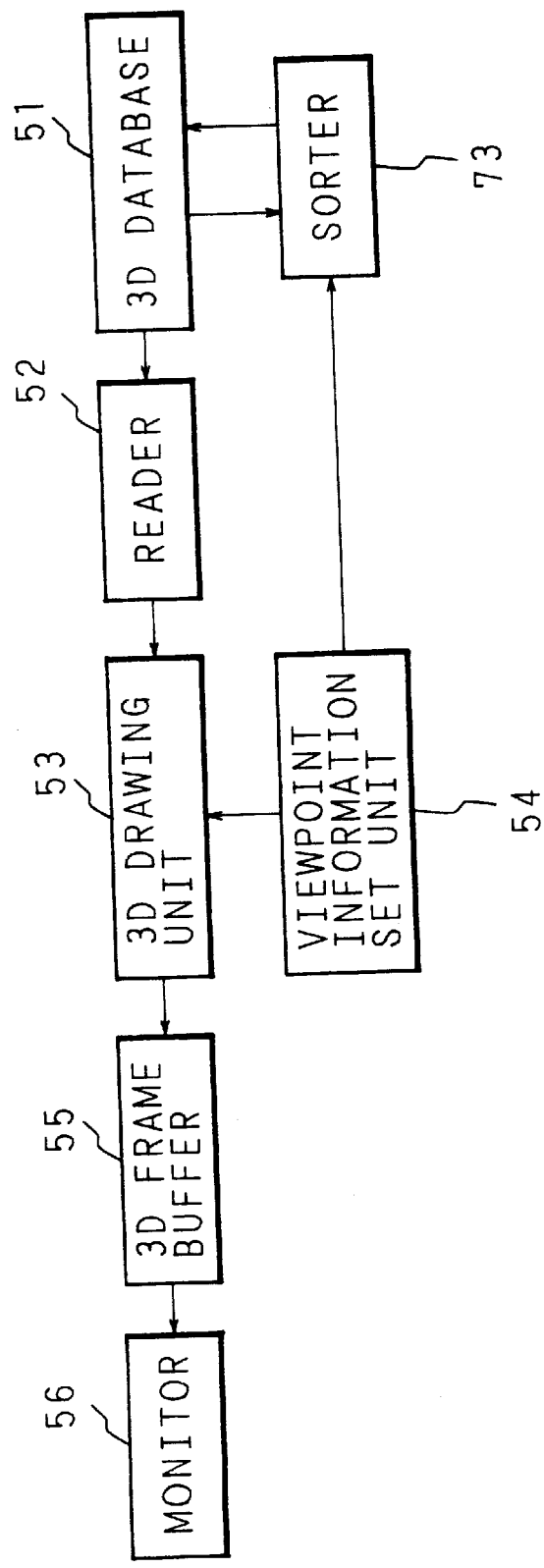
FIG. 41 is a block diagram showing a system configuration example of sixth embodiment of three-dimensional image display apparatus of the invention.
Figure 42A:
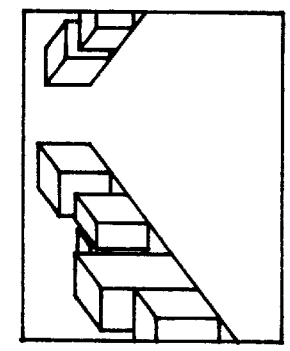
FIG. 42A, FIG. 42B and FIG. 42C are schematic diagrams of screen displaying states of the prior art.
Figure 42B:
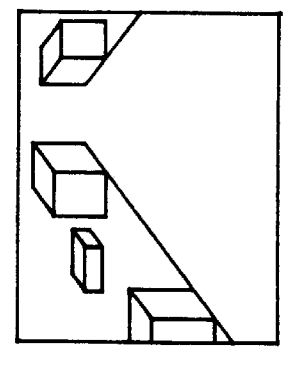
Figure 42C:
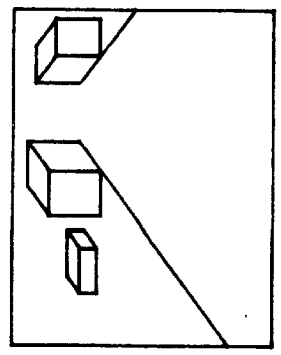
Figure 43C:
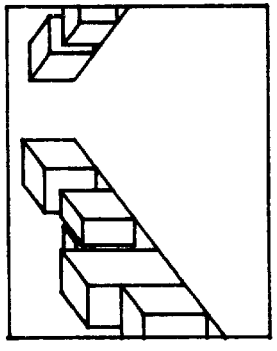
FIG. 43A, FIG. 43B and FIG. 43C are schematic diagrams of screen displaying states of the sixth embodiment of three-dimensional image display method and apparatus therefor of the invention.
Figure 43B:
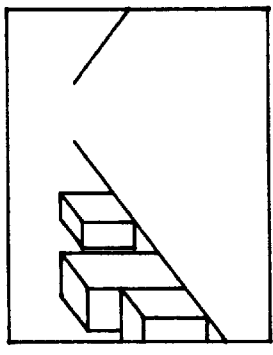
Figure 43A:
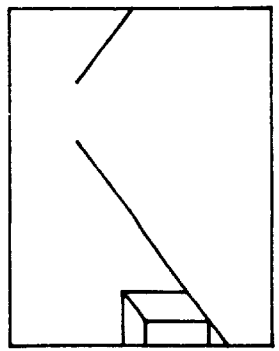

The sixth embodiment of the three-dimensional display apparatus of the invention is concretely described below while referring to a block diagram in FIG. 41 showing a system configuration example, schematic diagrams in FIG. 42A, FIG. 42B and FIG. 42C showing displaying states of the prior art, and schematic diagrams in FIG. 43A, FIG. 43B and FIG. 43C showing displaying states of the sixth embodiment.

In FIG. 41, reference numeral 51 is a three-dimensional database (3 D database), which stores data of solid matters of objects constructing the three-dimensional space, in the same way as in the first and second embodiments of the three-dimensional image display method and apparatus therefor of the invention. A sorter 73 described latter is connected to the 3 D database 51.

Reference numeral 52 is a reader for reading out data relating to the space in which the viewpoint is currently located from the 3 D database 51. The data read by this reader 52 from the 3 D database 51 is given to the 3 D drawing unit 53.

In the 3 D drawing unit 53, on the basis of the data read out by the reader 52, and according to the viewpoint information given from the viewpoint information set unit 54, that is, the information showing from which position one is seeing, geometrical calculation, color calculation and others are executed on each object, and the results are written into the 3 D frame buffer 55. The image written in the 3 D frame buffer 55 is sent and displayed in the monitor 56.

The sorter 73 functioning as sorting means is described. When the viewpoint position information is expressed by coordinates in a three-dimensional space such as (ex, ey, ez), the sorter 73 compares the viewpoint position information given from the viewpoint information set unit 54 and the data of each object in the 3 D database 51, and numbers sequentially from the one shortest in distance from the viewpoint position.

The detail is as follows. Individual objects in the 3 D database 51 are supposed to be Oj (j=1 to N). The point coordinates composing the object Oj are supposed to be (xi, yi, zi) (i is the point number), and the boundary box enclosing the object OJ, that is, the position of a virtual rectangular parallelepiped containing the object Oj is calculated. The boundary box can be expressed by two points a, b in the three-dimensional space, and supposing the coordinates to be (xa, ya, za), (xb, yb, zb), values of a and b are obtained as follows.

$$xa=\text{Min}(xi), ya=\text{Min}(yi), za=\text{Min}(zi)$$

$$xb=\text{Max}(xi), yb=\text{Max}(yi), zb=\text{Max}(zi)$$

Where Min operation and Max operation are calculations for determining the minimum value and maximum value over the whole point coordinates in the object Oj.

As for the center of gravity (xgj, ygj, zgj) of the boundary box, the middle point of point a and point b is determined. Therefore, the distance Dj from the viewpoint position to the center of gravity of each object Oj is determined as follows.

$$Dj=((xgj-ex)*(xgj-ex)-(ygj-ey)*(ygj-ey)-(zgj-ez)*(zgj-ez))^{\frac{1}{2}}$$

This value of Dj is calculated in all objects, and the object data in the 3 D database 51 are rearranged in the ascending order from the results. Rearranging may be easily done by employing well known technique such as quick sorting. After this processing, the reader 52 reads out the objects from the top of the 3 D database 51, and drawn out three-dimensionally, so that the objects are displayed on the screen sequentially from the position closest to the viewpoint.

The operation of the sixth embodiment of the three-dimensional image display apparatus of the invention is as follows. Suppose the viewpoint is located in a certain space, then, in the same way as in the prior art, the data read by the reader 52 from the 3 D database 51 is drawn by the 3 D drawing unit 53 in the 3 D frame buffer 55 according to the position information given from the viewpoint information set unit 54, and the image in the space is displayed on the screen of the monitor 56.

When the space is switched in this state, according to the viewpoint information given from the viewpoint information set unit 54, the sorter 73 arranges the object data in the 3 D database 51 in the sequence closer to the viewpoint position as mentioned above. After this process, the data for displaying the initial 3 D image is read out from the 3 D database 51 by the reader 52, and is drawn in the 3 D frame buffer 55 by the 3 D drawing unit 53, and is displayed on the screen of the monitor 56.

For example, in the prior art, as shown in FIG. 42A, FIG. 42B and FIG. 42C, it was not known which object is first displayed in the monitor 56, but in the sixth embodiment, as shown in FIG. 43A, FIG. 43B and FIG. 43C, the objects closer to the viewpoint position are sequentially displayed on the screen of the monitor 56.

When there is only one entrance connecting with a certain space, the viewpoint position of the initial 3 D image of that space is known, and hence the data of each object may be preliminarily arranged in the sequence closer to the viewpoint position (viewpoint position of initial 3 D image) by the sorter 73. In case of a space communicating with plural entrances, on every occasion of necessity of displaying the space, the data may be arranged by the sorter 73, or the data may be preliminarily arranged for each entrance.

Thus, according to the sixth embodiment of the three-dimensional image display method and apparatus therefor of the invention, when the viewpoint position is moved to other space and the space is switched, the initial 3 D image is gradually displayed from the edge closer to the viewpoint position, and the user knows how far the 3 D drawing is advanced, and the user feels the waiting time is short because the image is displayed in gradual steps from the near sight of the screen.

[Seventh Embodiment of Three-dimensional Image Display Method and apparatus therefor of the invention]

A seventh embodiment of the three-dimensional image display method and apparatus therefor of the invention is described. In the seventh embodiment, it is destined to display be reading out the 3 D objects sequentially from the rough shape data to fine shape data. It is therefore necessary to prepare data in multiple stages from rough shape to fine shape in each object, and register it in the database. The user knows approximate layout and shape of the 3 D world beforehand, and can enjoy to imagine the final shape from the rough shape.

Figure 44:
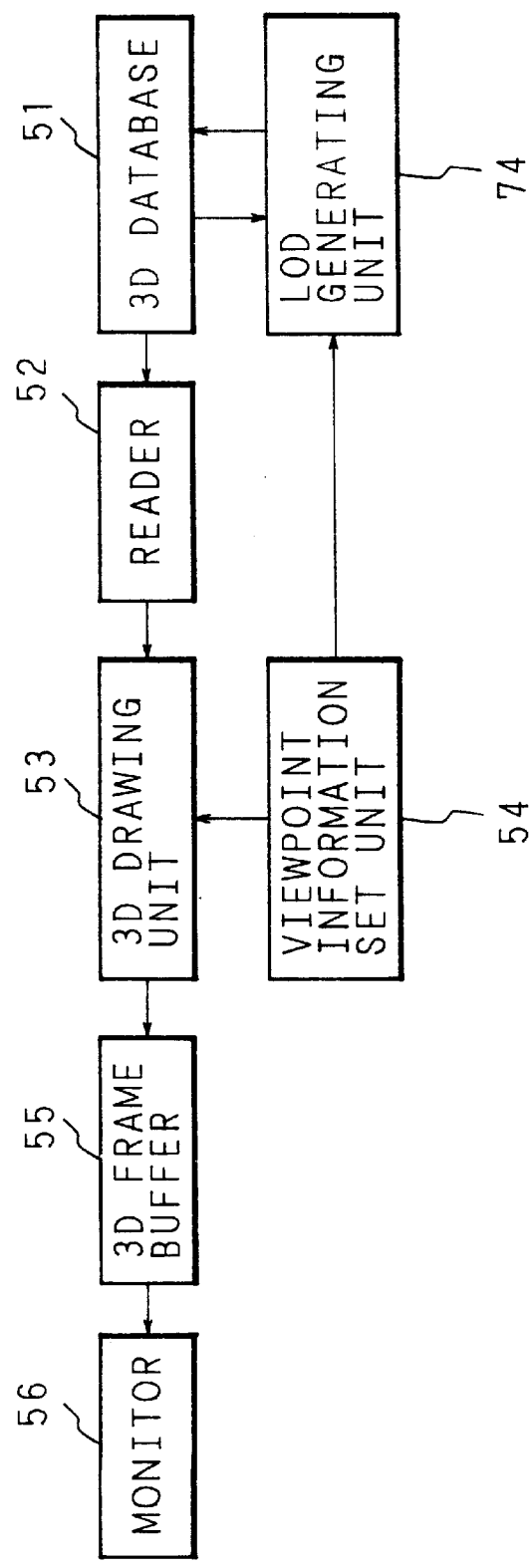
FIG. 44 is a block diagram showing a system configuration example of seventh embodiment of three-dimensional image display apparatus of the invention.

This is concretely described below by referring to a block diagram in FIG. 44 showing a system configuration example of the seventh embodiment of the three-dimensional image display apparatus of the invention, and a schematic diagram in FIG. 45 showing the displaying state.

In FIG. 44, reference numeral 51 is a three-dimensional database (3 D database), which stores data of solid matters or objects constructing the three-dimensional space, in the same way as in the first and second embodiments of the three-dimensional image display method and apparatus therefor of the invention. An LOD (Level-Of-Detail) generating unit 74 described below is connected to the 3 D database 51, as decimating means for preparing data in multiple stages from rough shape to fine shape for 3 D objects. This LOD generating unit 74 automatically prepares object data in multiple stages from rough solid data to fine solid data about each object in the 3 D database 41 before starting 3 D drawing.

Reference numeral 52 is a reader for reading out data relating to the space in which the viewpoint is currently located from the 3 D database 51. The data read by this reader 52 from the 3 D database 51 is given to the 3 D drawing unit 53.

In the 3 D drawing unit 53, on the basis of the data read out by the reader 52, and according to the viewpoint information given from the viewpoint information set unit 54, that is, the information showing from which position one is seeing, geometrical calculation, color calculation and others are executed on each object, and the results are written into the 3 D frame buffer 55. The image written in the 3 D frame buffer 55 is sent and displayed in the monitor 56.

Figure 46C:
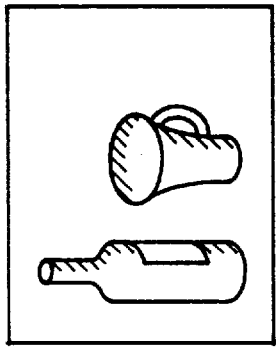
FIG. 46A, FIG. 46B and FIG. 46C are schematic diagrams of screen displaying states of the seventh and eight embodiments of three-dimensional image display method and apparatus therefor of the invention.
Figure 46B:
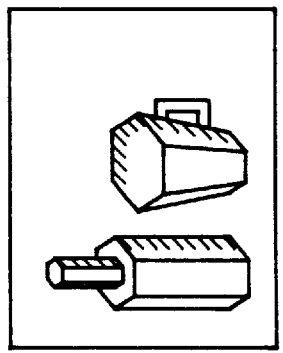
Figure 46A:
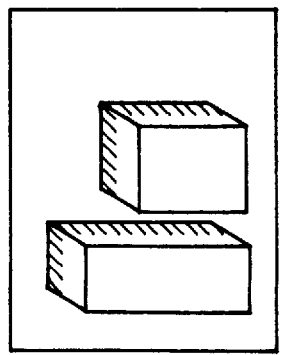

The operation of the seventh embodiment of the three-dimensional image display apparatus of the invention is described concretely below by reference to a schematic diagram showing a generating method of a table by the LOD generating unit 74 and schematic diagrams in FIG. 46A, FIG. 46B and FIG. 46C showing the displaying states.

Before starting 3 D drawing, the LOD generating unit 74 automatically prepares object data in multiple stages from rough solid data to fine solid data about each object in the 3 D database 51, and additionally registers them in the 3 D database 51 together with the original data.

Processing by the LOD generating unit 74 is as follows. The data constructing one object in the 3 D database 51 is supposed to be constructed in a format as shown in the schematic diagram in FIG. 45. Herein, suppose a hierarchical structure composed of a polygon table (L-TABLE) registering plane (polygon) data constructing the object, edge table (E-TABLE) registering edge data constructing plane data, and point table (P-TABLE) registering point data composing edge data.

Suppose the object is constructed by polygon 1, polygon 2, . . . , polygon P. The LOD generating unit 74 automatically decimates, for example, even-numbered polygons from the L-TABLE, and writes a series of polygon 1, polygon 3, . . . into other polygon table (L-TABLE 2). Next, the LOD generating unit 74 searches for corresponding edge data about each polygon data written in L-TABLE 2. For example, supposing the edges constructing polygon 1 to be e1, e2, e3, . . . , similarly decimating even-numbered edges, a new series of e1, e3, . . . is made, and written into the edge data region corresponding to polygon 1. Therefore, the terms of polygon 1 in L-TABLE 2 are e1, e3, . . . .

After completion of the above operation, only the edge data appearing in the L-TABLE 2 is registered in a new edge table E-TABLE 2. Then, further, only the point data appearing in E-TABLE 2 is registered in a new point table P-TABLE 2. By this procedure, the LOD generating unit 74 generates L-TABLE 2. E-TABLE 2, and P-TABLE 2, and a new object expressed by these three tables is a rough solid model expressing the original object by about half polygons.

To generate a model in multiple roughness stages automatically, by repeating the above process by appropriately setting the data decimating amount, for example, when rough model making is required (m−1) stages in total including the original model, the same process may be repeated by setting the data decimating amount at m initially, and setting sequentially to m−1, m−2, . . . , 2.

When plural steps of rough models of one object are newly created by processing in this way, the LOD generating unit 74 registers such data by inserting them into the top of the 3 D database 51. By processing in this manner, when reading out the data of each object, the reader 52 first reads out the data of the roughest model about each object, and displays each object as shown in FIG. 46A as rough image. Next, the reader 52 reads out the second roughest data about each model, and displays each object as shown in FIG. 46B as a slightly fine image. Similarly, thereafter model data is sequentially read out from roughest model and displayed in the monitor 56. In the latter half of the 3 D database 51, the original data of each object is stored, and in the final stage, as shown in FIG. 46C, the rough model on the monitor is overwritten on the original model.

Thus, according to the seventh embodiment of the three-dimensional image display method and apparatus therefor of the invention, when the viepoint position is moved to other space and the space is switched, each object constructing the initial 3 D image is first displayed as a very rough image, and fine images are sequentially overwritten and finally the original image is displayed, so that the user may feel the waiting time short.

[Eight embodiment of three-dimensional image display method and apparatus therefor of the invention]

In the seventh embodiment of the three-dimensional image display method and apparatus therefor of the invention, incidentally, a greater capacity is required in the 3 D database 51 which stores 3 D data intrinsically requiring a large quantity data. Therefore, when there is little allowance in the capacity of the 3 D database 51, an eighth embodiment as described below is preferred because nearly same effects as in the seventh embodiment of the three-dimensional image display method and apparatus therefor of the invention may be obtained.

In the eight embodiment of the three-dimensional image display method and apparatus therefor of the invention, after reading out the object data from the database, rough shape data is obtained by calculation, and is displayed sequentially. Therefore, it is not necessary to prepare rough shape data and store it in the database.

Figure 47:
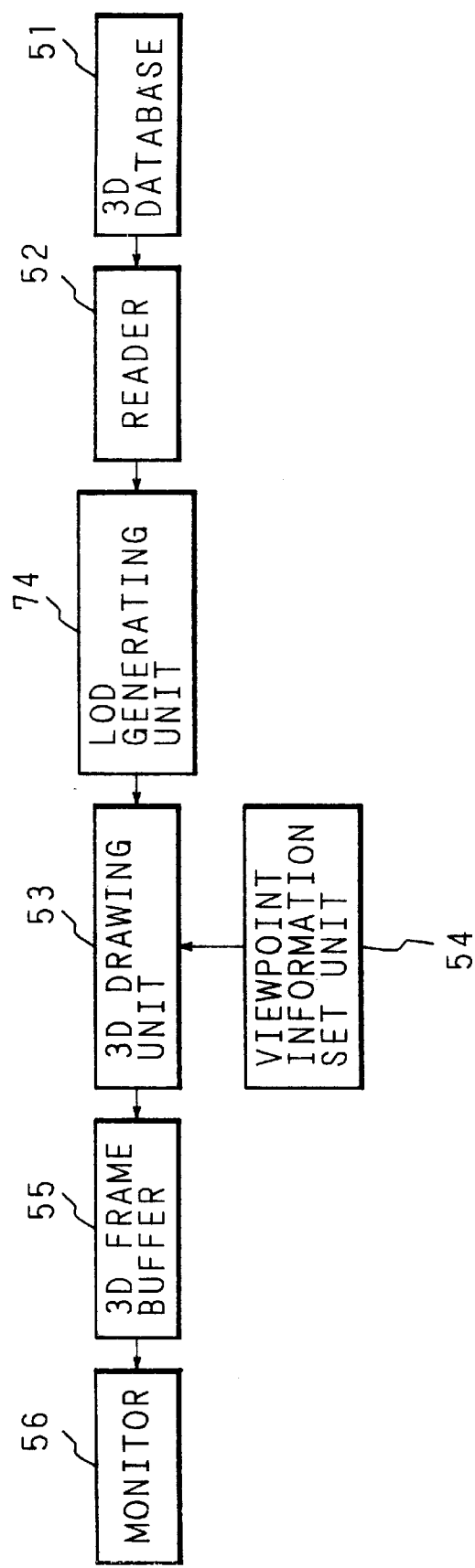
FIG. 47 is a block diagram showing a system configuration example of eighth embodiment of three-dimensional image display apparatus of the invention.

This is concretely described below by referring to a block diagram in FIG. 47 showing a system configuration example of the eighth embodiment of the three-dimensional image display apparatus of the invention. As shown in the block diagram in FIG. 47, in the eighth embodiment, the LOD generating unit 74 is not connected to the 3 D database 51, but is positioned between the reader 52 and the 3 D drawing unit 53. The other constitution is in the same way as in the seventh embodiment shown in FIG. 44.

The operation of such eighth embodiment of the three-dimensional image display apparatus of the invention is as follows. Suppose, for example, the rough model is expressed in a total of (m−1) stages.

At first, m is set as roughness parameter in the LOD generating unit 74. When the original data of one object read out by the reader 52 from the 3 D database 51 is inputted into the LOD generating unit 74, the LOD generating unit 74 automatically generates new rough object tables (L-TABLE 2, E-TABLE 2, and P-TABLE 2) in the same procedure as in the seventh embodiment, and transfers the data described in these tables to the 3 D drawing unit 53 as data of one object. The 3 D drawing unit 53 draws the model of roughness m in the 3 D frame buffer 55. When the reader 52 detects the final object from the 3 D database 51, the roughness parameter is set to m−1, and the same procedure is processed again. As a result, this time, a solid mode of roughness (m−1) is automatically generated by the LOD generating unit 74, and is three-dimensionally drawn in the 3 D frame buffer 55 and displayed in the monitor 56.

By repeating the same process, by making the model of roughness 0 at the last, the original image is displayed on the screen of the monitor 56. The displaying state in the eighth embodiment is in the same way as the displaying state in the seventh embodiment.

Thus, in the eighth embodiment of the three-dimensional image display method and apparatus therefor of the invention, in the same way as in the seventh embodiment, when the viewpoint position is moved to other space and the space is switched, each object constructing the initial 3 D image is first displayed as very rough image, and fine images are sequentially overwritten, and finally the original image is displayed, so that the user may feel the waiting time shorter.

The difference between the seventh embodiment and eighth embodiment of the three-dimensional image display method and apparatus therefor of the invention is whether the data of rough image is preliminarily stored in the database or generated on every occasion of actual display, and therefore either method may be preferably selected depending on the capacity of the database, image processing speed, and others.

As described herein, according to the three-dimensional image display method and apparatus therefor of the invention, in the event of possibility of move of viewpoint from one space to other space, by predictive reading process of reading out the data of new space predictively, the waiting time for witching the display when moving the space can be shortened.

Since the information of move of viewpoint is used in predictive reading, any particular burden is demanded to the user.

In addition, the user can obtain some information about the image to be drawing from the prepared screen until drawing of the three-dimensional image is completed. In particular, when the screen is a two-dimensional image of the final result of the image being currently calculated for drawing, the next screen may be known beforehand.

Moreover, by using the filtering processing for obtaining the screen effect such as gradual thinning of fog effect, the user may intuitively know how far the 3 D drawing is advanced. Further, as the background of other space appears gradually on the background of a certain space, the psychological burden of the user may be alleviated.

Still more, the information about what can be seen in which configuration in the next 3 D screen may be seen by priority.

As this invention may be embodied in several forms without departing from the spirit of essential characteristics thereof. the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A three-dimensional image display method for displaying a three-dimensional image seeing the inside of a space in which a viewpoint is located from said viewpoint, on the basis of data stored in storing means for displaying the inside of plural independent three-dimensional spaces having a connection point with at least one other, and information showing sight line orientation, comprising steps of:

a first processing for reading out from said storing means the data displaying the inside of the space in which said viewpoint is located, and displaying a three-dimensional image seen from said viewpoint corresponding to the move of the position of said viewpoint and sight line orientation;

a second processing for predicting a possibility of move of said viewpoint from the space in which it is located to other space through a connection point; and a third processing for preliminarily reading form said storing means the data expressing the inside of the space of the moving destination when it is predicted that said viewpoint may move to other space, wherein said second processing is executed on the basis of the distance from said viewpoint to a connection point possessed by the space in which said viewpoint is located, and presence or absence of the connection point included in the space in which said viewpoint is located within a predetermined visual field centered on an orientation of the sight line of said viewpoint.

2. A moving destination prediction method for, at the displaying a three-dimensional image seeing the inside of a space in which a viewpoint is located from said viewpoint, on the basis of data for displaying the inside of plural independent three-dimensional spaces each having at least one connection point with an other, and information showing the position of said viewpoint movable arbitrarily in said plural spaces, predicting a space which has possibility of moving next of said viewpoint from the space in which said viewpoint is located through a connection point, comprising steps of :

sequentially retrieving all connection points possessed by a space in which said viewpoint is located on the basis of the position of said viewpoint in a space in which said viewpoint is located;

calculating a distance between said viewpoint and each retrieved connection point;

obtaining a minimum value among calculated values less than a predetermined value; and predicting a space to which said viewpoint can move through the connection point corresponding to the obtained minimum value, as the space which has a possibility of moving next of said viewpoint from the space in which said viewpoint is located.

3. A moving destination prediction method for, at the displaying a three-dimensional image seeing the inside of a space in which a viewpoint is located from said viewpoint, on the basis of data for displaying the inside of plural independent three-dimensional spaces each having at least one connection point with an other, and information showing the position of said viewpoint movable arbitrarily in said plural spaces and information showing sight line orientation, predicting a space which has possibility of moving next of said viewpoint from the space in which said viewpoint is located through a connection point, comprising steps of:

setting a visual field of a cone which is set by a predetermined around the sight line orientation from said viewpoint as the central axis;

judging whether any of connection points exist or not in the visual field of said cone;

calculating a distance between said viewpoint and each connection point when any of connection points exist;

obtaining a minimum value among calculated values; and predicting a space to which said viewpoint can move through the connection point corresponding to the obtained minimum value, as the space which has a possibility of moving next of said viewpoint from the space in which said viewpoint is located.

4. A three-dimensional image display apparatus comprising:

storing means for storing data expressing the inside of plural independent three-dimensional spaces having a connection point with at least one other;

data reading means for reading out from said storing means the data expressing the inside of the space in which said viewpoint is located;

inputting means for inputting a position of the viewpoint arbitrarily movable in said plural spaces and an orientation of a sight line;

three-dimensional image storing means for storing three-dimensional images;

three-dimensional drawing means for making said three-dimensional image storing means draw and store a three-dimensional image seen from said viewpoint corresponding to the move of the position of said viewpoint and the orientation of the sight line, on the basis of the data being read out by said data reading means from said inputting means;

displaying means for displaying an image drawn in said three-dimensional image storing means;

predicting means for predicting a possibility of move of said viewpoint from the space in which said viewpoint is located to other space thorough the connection point; and temporary storing means for storing temporarily the data being read out by said reading means from said storing means;

wherein said reading means reads out, when said predicting means predicts possibility of move of said viewpoint to other space, the data displaying the inside of the space of the moving destination of the predicted result from said storing means, and stores it in said temporary storing means.

5. The three-dimensional image display apparatus as set forth in claim 4, wherein said predicting means predicts possibility of move of said viewpoint to other space when the distance from said viewpoint to the connection point possessed by the space in which said viewpoint is located is less than a predetermined value.

6. The three-dimensional image display apparatus as set forth in claim 4, wherein said predicting means predicts possibility of move of said viewpoint to other space when the distance from said viewpoint to the connection point possessed by the space in which said viewpoint is located is less than a predetermined value, and the connection point possessed by the space in which said viewpoint is located is present in a predetermined visual field centered on the orientation of the sight line of said viewpoint.

7. A moving destination predicting apparatus for, at the displaying a three-dimensional image seeing the inside of a space in which a viewpoint is located from said viewpoint, on the basis of data for displaying the inside of plural independent three-dimensional spaces each having at least one connection point with an other, and information showing the position of said viewpoint movable arbitrarily in said plural spaces, predicting a space which has possibility of moving next of said viewpoint from the space in which said viewpoint is located through a connection point, comprising:

means for sequentially retrieving all connection points possessed by a space in which said viewpoint is located on the basis of the position of said viewpoint in a space in which said viewpoint is located;

means for calculating a distance between said viewpoint and each retrieved connection point;

means for obtaining a minimum value among calculated values less than a predetermined value; and means for predicting a space to which said viewpoint can move through the connection point corresponding to the obtained minimum value, as the space which has a possibility of moving next of said viewpoint from the space in which said viewpoint is located.

8. A moving destination prediction apparatus for, at the displaying a three-dimensional image seeing the inside of a space in which a viewpoint is located from said viewpoint, on the basis of data for displaying the inside of plural independent three-dimensional spaces each having at least one connection point with an other, and information showing the position of said viewpoint movable arbitrarily in said plural spaces and information showing sight line orientation, predicting a space which has possibility of moving next of said viewpoint from the space in which said viewpoint is located through a connection point, comprising:

means for setting a visual field of a cone which is set by a predetermined around the sigh line orientation from said viewpoint as the central axis;

means for judging whether any of connection points exist or not in the visual field of said cone;

means for calculating a distance between said viewpoint and each connection point when any of connection points exist;

means for obtaining a minimum value among calculated values; and means for predicting a space to which said viewpoint can move through the connection point corresponding to the obtained minimum value, as the space which has a possibility of moving next of said viewpoint from the space in which said viewpoint is located.

* * * * *

UNITED STATES PATENT AND TRADEMARK OFFICE
CERTIFICATE OF CORRECTION

PATENT NO. : 6,437,778 B1
DATED : August 20, 2002
INVENTOR(S) : Kazuki Matsui et al.

It is certified that error appears in the above-identified patent and that said Letters Patent is hereby corrected as shown below:

Title page,
Item [57], ABSTRACT,
Line 1, change "manipulates" to -- manipulated --.

Column 36,
Line 54, after "showing" insert -- viewpoint position movable arbitrarily in said plural spaces and information --.
Line 64, change "form" to -- from --.

Column 38,
Line 8, after "means" insert -- from said storing means and the information inputted --.
Line 15, change "thorough" to -- through --.

Column 39,
Line 13, change "sigh" to -- sight --.

Signed and Sealed this

Twenty-eighth Day of January, 2003

JAMES E. ROGAN
*Director of the United States Patent and Trademark Office*